United States Patent
Segawa et al.

(10) Patent No.: US 7,360,467 B2
(45) Date of Patent: Apr. 22, 2008

(54) WORM REDUCTION GEAR AND ELECTRIC POWER STEERING APPARATUS

(75) Inventors: Toru Segawa, Maebashi (JP); Kazuo Chikaraishi, Maebashi (JP)

(73) Assignees: NSK, Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 166 days.

(21) Appl. No.: 10/540,625

(22) PCT Filed: Jun. 24, 2004

(86) PCT No.: PCT/JP2004/008887

§ 371 (c)(1),
(2), (4) Date: Jun. 24, 2005

(87) PCT Pub. No.: WO2005/001309

PCT Pub. Date: Jan. 6, 2005

(65) Prior Publication Data

US 2006/0117889 A1    Jun. 8, 2006

(30) Foreign Application Priority Data

Jun. 25, 2003  (JP) ............................. 2003-180959
Jul. 7, 2003   (JP) ............................. 2003-271418
Jun. 18, 2004  (JP) ............................. 2004-181600

(51) Int. Cl.
    *F16H 55/02*    (2006.01)
(52) U.S. Cl. ..................... 74/425; 180/444; 74/388 PS
(58) Field of Classification Search ................ 180/444, 180/446; 74/425, 388 PS
    See application file for complete search history.

(56) References Cited

U.S. PATENT DOCUMENTS

| 5,044,454 A | 9/1991 | Kanazawa et al. |
| 5,433,294 A * | 7/1995 | Walker ........................ 187/254 |
| 6,044,723 A | 4/2000 | Eda et al. |
| 6,357,313 B1 | 3/2002 | Appleyard |

(Continued)

FOREIGN PATENT DOCUMENTS

JP    35-34102    12/1960

(Continued)

OTHER PUBLICATIONS

The Nikkan Kogyo Shinbun Ltd. "Gears" vol. 5.

(Continued)

*Primary Examiner*—Kevin Hurley
(74) *Attorney, Agent, or Firm*—Crowell & Moring LLP

(57) ABSTRACT

A torsion coil spring 30 applies an elastic force to a worm shaft 29 in a direction towards a worm wheel, via a pre-load pad 70. The pre-load pad 70 restricts displacement in relation to the widthwise direction, by one side face portion of a holder 61 fixed to a gear housing 22. Due to the elastic deformation of the pre-load pad 70 itself based on the elastic force of the torsion coil spring 30, the side face of the pre-load pad 70 is abutted against the one side face portion of the holder 61, so that a gap between the pre-load pad 70 and the one side face portion is minimized. As a result, the occurrence of a teeth fitting noise in the worm reduction gear 16 is suppressed.

5 Claims, 43 Drawing Sheets

U.S. PATENT DOCUMENTS

| | | |
|---|---|---|
| 6,390,230 B1 * | 5/2002 | Shimizu et al. ............. 180/444 |
| 6,491,131 B1 | 12/2002 | Appleyard |
| 6,550,567 B2 | 4/2003 | Murakami et al. |
| 6,705,176 B2 | 3/2004 | Ishii et al. |
| 6,708,796 B2 | 3/2004 | Kiame et al. |
| 6,761,244 B2 | 7/2004 | Sano et al. |
| 6,763,738 B1 | 7/2004 | Tsutsui et al. |
| 6,769,507 B2 | 8/2004 | Murakami et al. |
| 7,077,235 B2 * | 7/2006 | Eda et al. ................... 180/444 |
| 7,100,734 B2 * | 9/2006 | Segawa ...................... 180/444 |
| 7,188,700 B2 * | 3/2007 | Eda et al. ................... 180/444 |
| 2004/0029671 A1 | 2/2004 | Bock et al. |

FOREIGN PATENT DOCUMENTS

| | | |
|---|---|---|
| JP | 59-34069 A | 2/1984 |
| JP | 59-47152 U | 3/1984 |
| JP | 60-191758 U | 12/1985 |
| JP | 2-103980 A | 4/1990 |
| JP | 3-112784 A | 5/1991 |
| JP | 63-46281 U | 12/1994 |
| JP | 7-158647 A | 6/1995 |
| JP | 10-281235 A | 10/1998 |
| JP | 11-308805 A | 11/1999 |
| JP | 2001-108025 A | 4/2001 |
| JP | 2001-233224 A | 8/2001 |
| JP | 2001-233225 A | 8/2001 |
| JP | 2001-270448 A | 10/2001 |
| JP | 2001-315653 A | 11/2001 |
| JP | 2002-37094 A | 2/2002 |
| JP | 2002-87295 A | 3/2002 |
| JP | 2002-98198 A | 4/2002 |
| JP | 2002-211421 A | 7/2002 |
| JP | 2002-313340 A | 10/2002 |
| JP | 2002-323059 A | 11/2002 |
| WO | WO 03/047948 A1 | 6/2003 |
| WO | WO 03047948 A1 * | 6/2003 |
| WO | WO 2004/074071 A3 | 9/2004 |

OTHER PUBLICATIONS

International Preliminary Report on Patentability dated May 1, 2006 including translation of Form PCT/ISA/237 (Nine (9) pages).

* cited by examiner (a)  (b)

WORM REDUCTION GEAR AND ELECTRIC POWER STEERING APPARATUS

TECHNICAL FIELD

The worm reduction gear and electric power steering apparatus according to the present invention is assembled for example in a vehicle steering system, and is used for reducing the force necessary for a driver to operate a steering wheel, by using the output from an electric motor as auxiliary power source. Other than the electric power steering apparatus, the worm reduction gear according to the present invention, can also be used in combination with an electric linear actuator assembled into various types of mechanical equipment such as an electric bed, an electric table, an electric chair, a lifter and so on.

BACKGROUND ART

As an apparatus for reducing the force necessary for a driver to operate a steering wheel when applying a steering angle to the steering wheels (normally the front wheels, except for special-purpose vehicles such as a fork lift), a power steering apparatus is widely used. For such a power steering apparatus, an electric power steering apparatus which uses an electric motor as the auxiliary power source is recently becoming popular. The electric power steering apparatus has the advantage that it can be smaller and lighter compared to a hydraulic power steering, control of the magnitude (torque) of the auxiliary power is easy, and there is minimum power loss for the engine. FIG. 46 is a schematic diagram showing heretofore known basic components of such an electric power steering apparatus.

Provided on an intermediate portion of a steering shaft 2 which rotates based on the operation of a steering wheel 1 is a torque sensor 3 which detects the direction and magnitude of a torque applied from the steering wheel 1 to the steering shaft 2, and a reduction gear 4. The input side of the reduction gear 4 is connected to the intermediate portion of the steering shaft 2, and the output side of the reduction gear 4 is connected to a rotation shaft of an electric motor 5. Furthermore, a detection signal from the torque sensor 3, together with a signal indicating vehicle speed, are input to a controller 6 for controlling the power to the electric motor 5. For the reduction gear 4, conventionally a worm reduction gear having a large lead angle and having reversibility in relation to the transmission direction of the drive force, is generally used. That is to say, a worm wheel serving as a rotation output receiving member is fixed to an intermediate portion of the steering shaft 2, and a worm of a worm shaft being the rotation force applying member, connected to the rotation shaft of the electric motor 5, is meshed with the worm wheel.

When in order to apply a steering angle to steering wheels 14, the steering wheel 1 is operated and the steering shaft 2 rotates, the torque sensor 3 detects the rotation direction and torque of the steering shaft 2 and outputs a signal indicating this detection value to the controller 6. In consequence, the controller 6 supplies power to the electric motor 5 so that the steering shaft 2 is rotated in the same direction as the rotation direction based on the steering wheel 1, via the reduction gear 4. As a result, the tip end portion (the bottom end portion in FIG. 46) of the steering shaft 2 is rotated with a torque which is larger than the torque based on the force applied from the steering wheel 1.

The rotation of the tip end portion of the steering shaft 2 is transmitted to an output shaft 10 of a steering gear 9 via universal joints 7 and an intermediate shaft 8. The input shaft 10 then rotates a pinion 11 constituting the steering gear 9, and moves a tie rod 13 back and forth via a rack 12, to thereby apply a desired steering to the steering wheels 14. As will be apparent from the above description, the torque transmitted from the tip end poriton of the steering shaft 2 via the universal joint 7 to the intermediate shaft 8 is greater than the torque applied from the steering wheel 1 to the base end portion (the top end portion in FIG. 46) of the steering shaft 2, by the amount of the auxiliary power which is applied from the electric motor 5 via the reduction gear 4. Consequently, the force necessary for the driver to operate the steering wheel when applying a steering angle to the steering wheels 14 is reduced by this auxiliary power amount.

In the case of the electric power steering apparatus as described above which has generally been used up to now, as the reduction gear 4 provided between the electric motor 5 and the steering shaft 2, a worm reduction gear is used. However, in this worm reduction gear, there is unavoidable backlash. This backlash becomes larger with increase in dimensional errors and assembly errors of the worm shaft, the worm wheel, and the bearings etc. for supporting these members, being the components of the worm reduction gear. Furthermore, if a large backlash exists, the teeth surfaces of the worm wheel and the worm strongly collide with each other, with the likelihood of generation of a grating teeth hitting noise.

For example, if the vibrational load due to roughness of the road is transmitted from the vehicle wheel side to the steering shaft 2, then due to the presence of this backlash, a grating teeth hitting noise is generated. Moreover, due to the collision of the teeth surfaces of the worm wheel and the worm, the operating feeling when steering the steering wheel is impaired.

In order to address this, it has been considered to reduce the backlash by appropriate assembly, taking into consideration the dimensional accuracy of the components of the worm reduction gear. However, if backlash is reduced in this way, management of dimensional accuracy, and the assembly operation becomes troublesome, and leads to increased cost. Furthermore, recently there has been a trend to increase the auxiliary power. Therefore the friction between the teeth surfaces of the worm wheel and the worm is increased so that backlash is more likely to occur. If the teeth hitting noise based on this backlash leaks into the cabin space of the vehicle, it is annoying to the occupants.

The following Patent Documents 1 to 4 are prior art documents related to the present invention.

[Patent Document 1] Japanese Unexamined Patent Publication No. 2000-43739.

[Patent Document :2] Japanese Unexamined Patent Publication No. 2002-37094

[Patent Document 3] Japanese Unexamined Patent Publication No. 2001-322554

[Patent Document 4] Japanese Unexamined Patent Publication No. 2002-67992

DISCLOSURE OF THE INVENTION

In view of the above problems, the present invention has been invented so as to suppress the generation of the grating teeth hitting noise at the meshing parts between the worm wheel and the worm shaft, with a low cost construction.

The worm reduction gear of the present invention comprises: a worm wheel, a worm shaft and an elastic body, wherein the elastic body applies an elastic force to the worm shaft in a direction towards the worm wheel.

In the case of the worm reduction gear and the electric power steering apparatus incorporating this worm reduction gear of the present invention, as described above, the elastic body applies an elastic force to the worm shaft in a direction towards the worm wheel. Therefore, a pre-load can be applied to the meshing parts between the worm wheel and the worm shaft with a low cost construction, and the generation of the grating teeth hitting noise at these meshing parts can be suppressed.

BEST MODE FOR CARRYING OUT THE INVENTION

Figure 1:
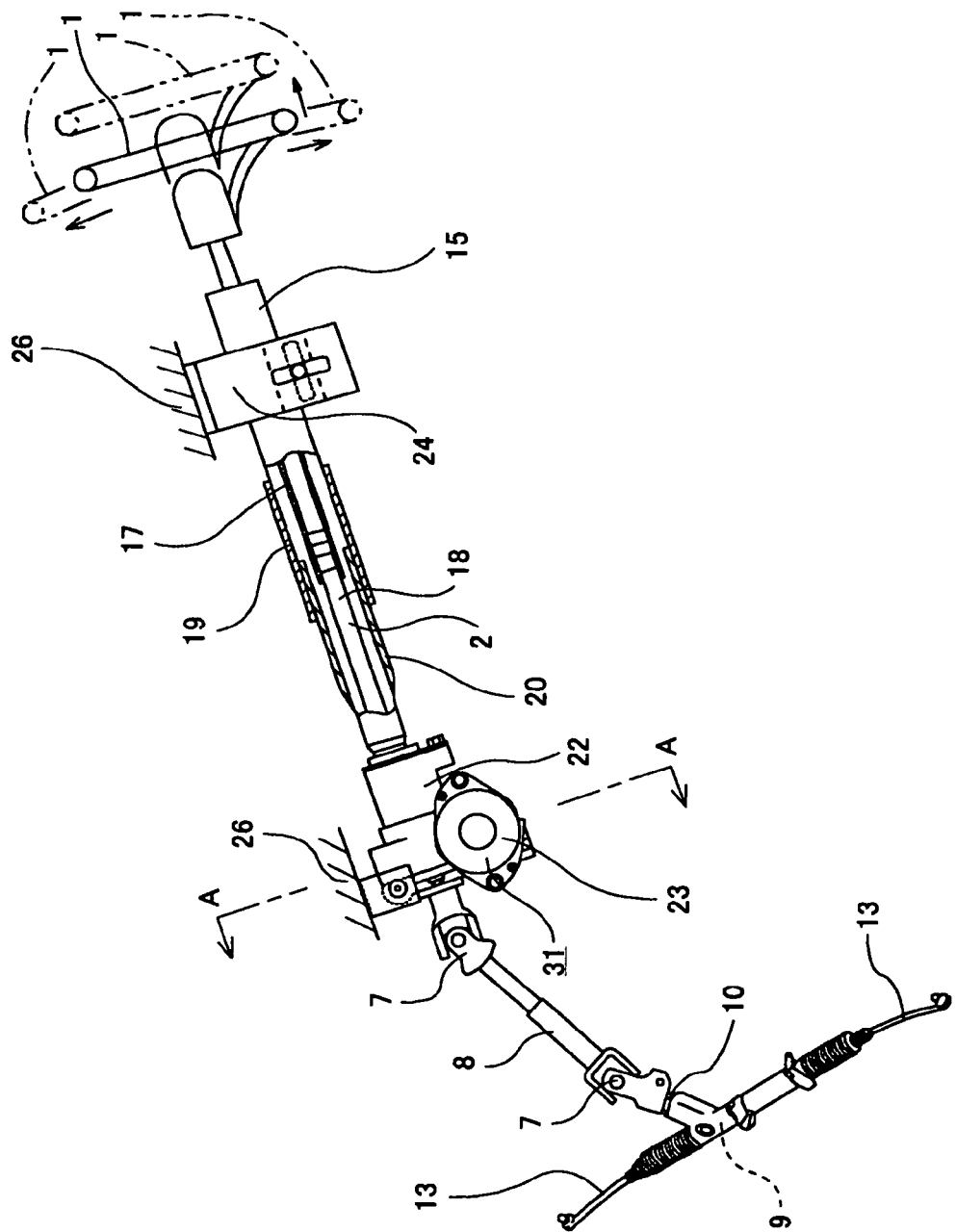
FIG. 1 shows a first example of the present invention partially sectioned.

A worm reduction gear of the present invention comprises: a worm wheel, a worm shaft, and an elastic body. The elastic body applies an elastic force to the worm shaft in a direction towards the worm wheel.

When implementing the worm reduction gear of the present invention, preferably the elastic body applies an elastic force to the worm shaft in a direction towards the worm wheel via a pre-load pad. The worm wheel is freely fixed to an assist shaft. Moreover, opposite ends of the worm shaft are supported on the inside of a gear housing by a pair of bearings, and a worm provided in an intermediate portion meshes with the worm wheel. Displacement of a pre-load pad with respect to a predetermined direction, is regulated by a guide face provided on the gear housing or on a member fixed to this gear housing, and a clearance between the pre-load pad and the guide face is either eliminated or reduced by elastic deformation of the pre-load pad itself based on an elastic force of the elastic body.

Moreover, when implementing the worm reduction gear of the present invention, preferably the elastic body applies an elastic force to the worm shaft in the direction towards the worm wheel via the pre-load pad. The worm wheel is freely fixed to an assist worm shaft. Moreover, the pre-load pad comprises a pair of elements, and its displacement with respect to a predetermined direction, is restricted by a guide face provided on the gear housing or on a member fixed to this gear housing, and a clearance between the pre-load pad and the guide face is either eliminated or reduced by movement of the pair of elements in a direction to separate from each other, based on an elastic force of the elastic body.

This configuration suppresses the generation of a grating abnormal noise (collision noise) due to collision of the pre-load pad with the guide face due to the reaction force applied from the worm wheel to the worm shaft when driven by the electric motor, without loss of the aforementioned teeth hitting noise suppression effect.

That is to say, the object of the configuration is the solution of the following problems.

Firstly, as conventional technology, Patent Document 1 discloses a worm reduction gear in which consideration is given to reduction of backlash at the meshing parts of the worm wheel and the worm shaft. This worm reduction gear is assembled in an electric power steering apparatus together with an electric motor and the like, and rotation of the electric motor generated in response to a steering torque applied to the steering shaft, and auxiliary torque obtained due to reduction in the worm reduction gear, are applied to the steering shaft. Therefore the worm wheel constituting the worm reduction gear is fixed onto part of the steering shaft, and the worm of the worm shaft is meshed with the worm wheel. Opposite end portions of the worm shaft are rotatably supported on the inside of the gear housing by a pair of rolling bearings. Moreover, an electric motor is joined to the gear housing. Of the two ends of the worm shaft, the end on the electric motor side is spline-connected to one end of the electric motor rotating shaft.

In part of the gear housing, a threaded hole is provided in a direction perpendicular to the worm shaft in the part on the opposite side to the electric motor, and a nut member is connected to an outer end portion of this threaded hole. Moreover, a spring retainer member is provided inside this threaded hole to allow freedom of displacement in the axial direction, and one end face of the spring retainer member is abutted against the outer peripheral face of one rolling bearing of the pair of rolling bearings on the side opposite to the electric motor. An elastic force is then applied to the other end portion of the worm shaft in the direction towards the worm wheel, by a coil spring provided between the other end face of the spring retainer member and the nut member, by the spring retainer member and by the one of the pair of rolling bearings.

According to the worm reduction gear disclosed in Patent Document 1, backlash at the meshing parts of the worm reduction gear can be reduced to a certain extent. Therefore generation of the teeth hitting noise in the worm reduction gear can be suppressed to a certain extent. In addition to the structure for suppression of generation of the teeth hitting noise in the worm reduction gear part disclosed in Patent Document 1, the structure disclosed in Patent Document 2 is also known.

In the case of the worm reduction gear disclosed in Patent Document 1, as also described in Patent Document 2, the spring retainer is on the inside of the threaded hole and is freely displaced in the radial direction of the worm shaft. However, the teeth surfaces of the worm of the worm shaft and the worm wheel are each twisted in relation to the direction of rotation. Therefore, when the drive force of the electric motor is transmitted from the worm shaft to the worm wheel, a reaction force is applied from the worm wheel to the worm shaft in the twisted direction in relation to the radial direction of the worm shaft at the meshing portion between the worm wheel and the worm. Based on this reaction force, the spring retainer member is displaced in the radial direction of the threaded hole by the force applied to the spring retainer member from the one of a pair of rolling bearings, and there is a possibility of a strong collision with the inner peripheral face of the threaded hole. A grating abnormal noise (collision noise) is readily generated when the spring retainer member strongly collides with the threaded hole in this manner.

Figure 47:
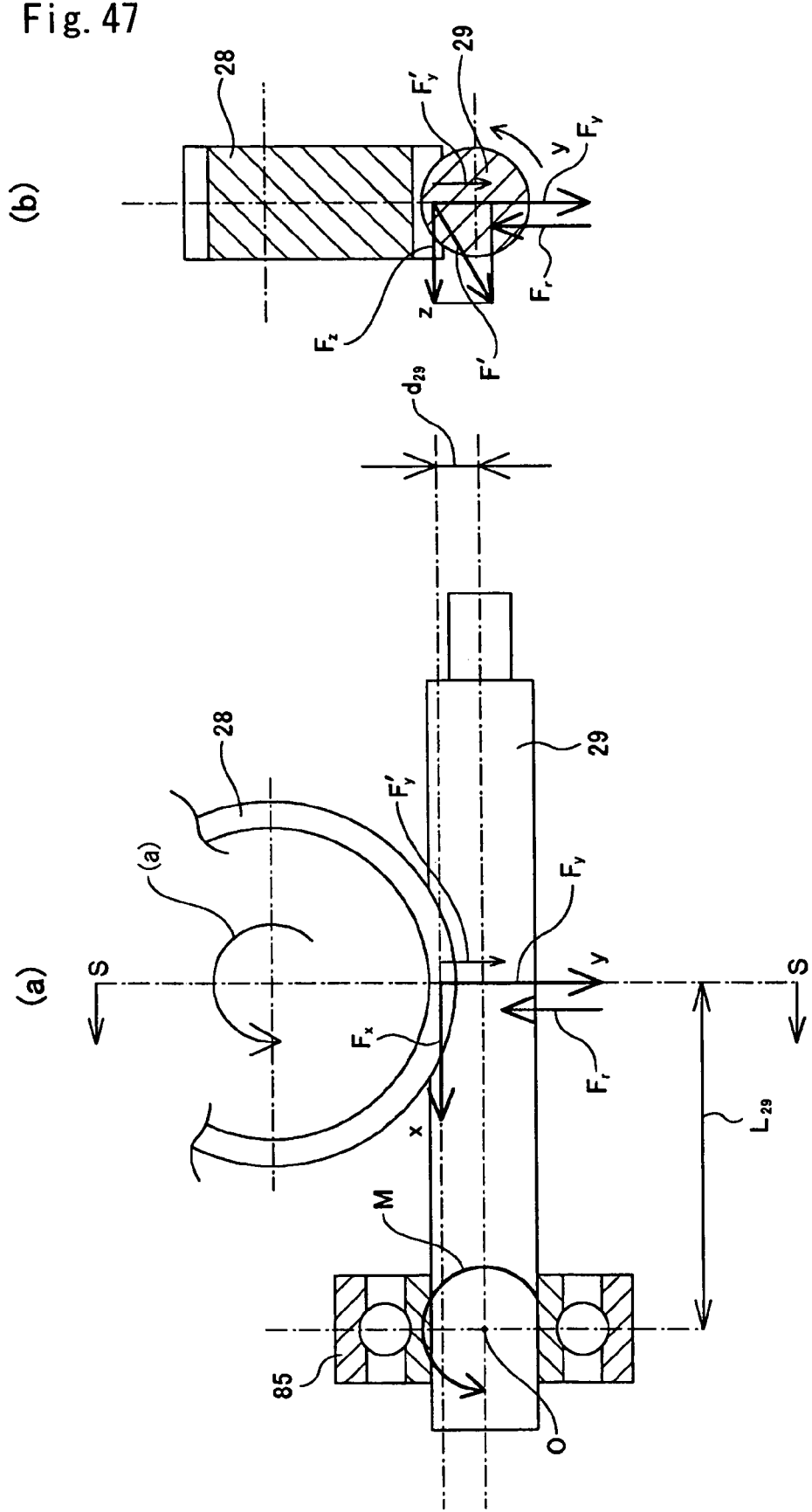
FIG. 47($a$) is a schematic cross-sectional view, and ($b$) is a cross-sectional view taken along the line S-S of (a), for explaining the direction of a reaction force applied from a worm wheel to a worm shaft at the time of rotating drive of an electric motor in a predetermined direction.
Figure 48:
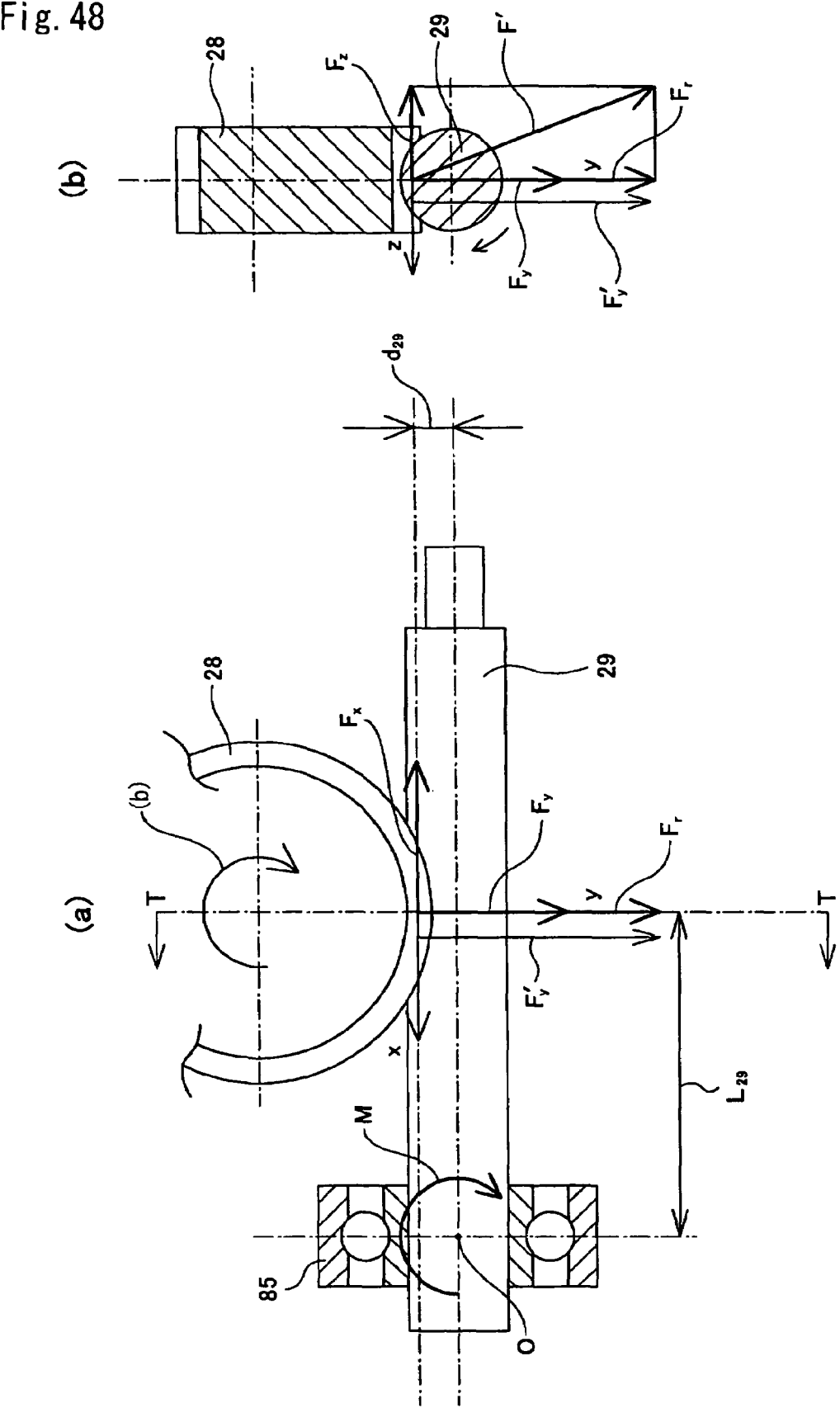
FIG. 48($a$) is a schematic cross-sectional view, and ($b$) is a cross-sectional view taken along the line T-T of (a), for explaining the direction of a reaction force applied from the worm wheel to the worm shaft at the time of rotating drive of the electric motor in the opposite direction to the predetermined direction.

Furthermore, this abnormal noise is generated more readily when the worm wheel rotates in a predetermined direction. This reason for this is explained below. Consider the case as shown in FIG. 47 and FIG. 48, wherein one end portion of the worm shaft 29 (left end portion in FIG. 47(*a*) and FIG. 48(*a*)) is freely supported by the rolling bearing 85 to allow rotation and some oscillating displacement with respect to a fixed part (not shown in drawings). Moreover, the worm provided in the intermediate portion of the worm shaft 29 is meshed with the worm wheel 28. In this condition, when the drive force is transmitted from the worm shaft 29 to the worm wheel 28 by rotating drive of the worm shaft 29, a reaction force is applied from the worm wheel 28 to the worm shaft 29. This same drive force is applied to the worm shaft 29 in mutually opposite directions in the cases shown in FIG. 47 and FIG. 48. The worm wheel 28 therefore rotates in mutually opposite directions in the cases shown in FIG. 47 and FIG. 48. In this condition, an apparent reaction force each having force components Fx, Fy, and Fz in the three directions x, y, and z in FIGS. 47 and 48 is applied from the worm wheel 28 to the worm shaft 29 at the meshing parts between the worm wheel 28 and the worm. Of these force components Fx, Fy, and Fz, Fx and Fz in the directions perpendicular to the radial direction of the worm wheel 28 are in mutually opposite directions as in the case shown in FIG. 47 wherein the worm wheel 28 rotates in one direction (the direction indicated by the arrow (a) in FIG. 47($a$)), and the case shown in FIG. 48 wherein the worm wheel 28 rotates in the other direction (the direction indicated by the arrow (b) in FIG. 48($a$)).

Figure 49:
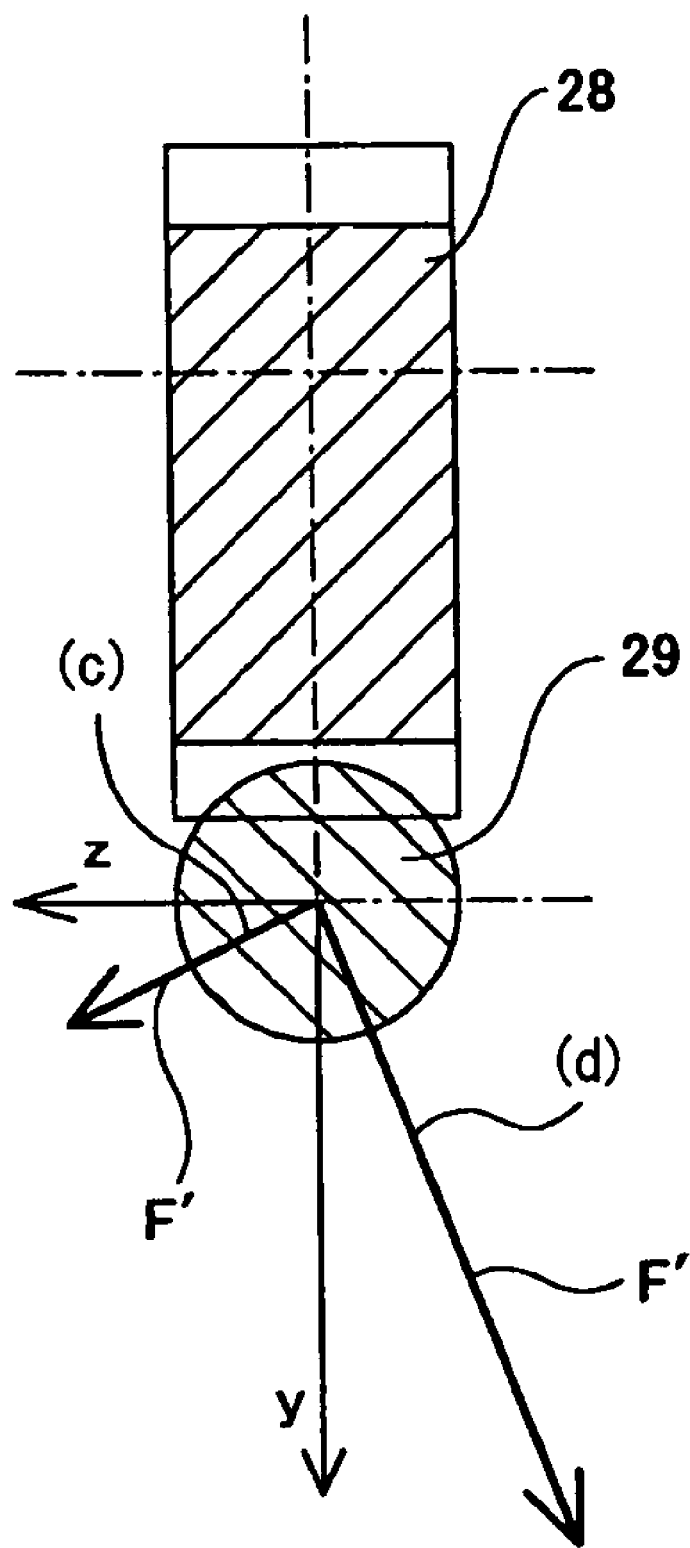
FIG. 49 is a view similar to FIG. 47($b$), showing reaction forces in two directions applied from the worm wheel to the worm shaft at the time of rotating drive of the electric motor in the both directions.

On the other hand, when the distance between the meshing portion and the oscillating center o of the worm shaft 29 in the radial direction of the worm shaft 29 is assumed as $d_{29}$, a moment M of magnitude $d_{29}$·Fx acts upon the worm shaft 29. Therefore, when the distance between the meshing portion and the oscillating center o of the worm shaft 29 in the axial direction of the worm shaft 29 is assumed as $L_{29}$, a force Fr of magnitude $M/L_{29}$ based on the moment M acts in the radial direction of the worm shaft 29. This force Fr is in mutually opposite directions in the case shown in FIG. 47 and the case shown in FIG. 48. The magnitude of the actual force F'y in the y direction in consideration of the moment M acting on the worm shaft 29 from the worm wheel 28 at the meshing portion of the worm shaft 29 is therefore reduced (F'y=Fy−Fr) when the worm wheel 28 rotates in one direction as shown in FIG. 47, and increased (F'y=Fy+Fr) when the worm wheel 28 rotates in the other direction as shown in FIG. 48. Consequently, the magnitude of the actual resultant force F' of the force components in the x and y directions acting on the meshing portion of the worm shaft 29 is reduced as shown by the arrow (c) in FIG. 49 when the worm wheel 28 rotates in one direction, and is increased as shown by the arrow (d) in the same figure when the worm wheel 28 rotates in the other direction. In this manner, when the worm wheel 28 rotates in the other direction and the force F' acting on the worm shaft 29 from the worm wheel 28 at the meshing portion increases, the force acting on the spring retainer member (not shown in drawings) which applies the elastic force to the other end portion (right end portion in FIG. 47($a$) and FIG. 48($a$)) of the worm shaft 29 via a rolling bearing (not shown in drawings), is also increased. Moreover, the spring retainer member strongly collides with parts such as the inner peripheral face of the threaded hole (not shown in drawings) and the like which restrict displacement of the spring retainer member, and an abnormal noise is readily generated.

Furthermore, in Patent Document 2, a structure is disclosed for suppressing generation of the abnormal noise, by providing an elastic body between the outer peripheral face of a pressing body and the inner peripheral face of the housing. However, the structure disclosed in Patent Document 2 is such that resistance in relation to displacement in the axial direction of the pressing body increases, and there is a possibility that the effect of suppressing the abnormal noise due to backlash at the meshing portion may be lost.

The worm reduction gear and the electric power steering apparatus incorporating this worm reduction gear of the present invention, according to the aforementioned configuration, addresses this situation, and is a structure which applies an elastic force to the worm shaft with an elastic member via a separate member to suppress the generation of the teeth hitting noise in the worm reduction gear, and has been invented to suppress the generation of the abnormal noise due to collision of the separate member with parts which restrict the displacement of the separate member.

According to the configuration of the present invention, of the reaction forces applied from the worm wheel to the worm shaft, when the reaction force is applied in the case where the contact portion of the worm shaft and the pre-load pad is provided in a symmetrical position in relation to the acting direction perpendicular to the central axis of the worm shaft, the pre-load pad can be readily and greatly elastically deformed. Therefore, the collision force applied to the guide face from the pre-load pad can be reduced. Consequently, the abnormal noise generated due to collision of the pre-load pad with the guide face can be more effectively suppressed.

When implementing the worm reduction gear according to the aforementioned configuration of the present invention, preferably the direction of possible displacement of the pre-load pad along the guide face is inclined with respect to a virtual plane containing the central axis of the worm shaft and meshing portion between the worm provided on the worm shaft and the worm wheel.

According to this more preferred configuration, the angle between the direction of the reaction force applied from the worm wheel to the worm shaft during electric motor drive, which differs with the direction of rotation of the worm wheel, and the direction of displacement of the pre-load pad along the guide face, becomes approximately equal irrespective of the directions of the reaction force. Hence the difference in the amount of elastic deformation of the pre-load pad based on the reaction force due to this difference in direction can be readily reduced. Therefore, the difference in the collision force when the pre-load pad collides with the guide face, due to the difference in the aforementioned directions, can be readily reduced, and generation of the abnormal noise can be more effectively suppressed.

Furthermore, the electric power steering apparatus of the present invention comprises: a steering shaft provided at a rear end portion thereof with a steering wheel; a pinion provided at a front end side of the steering shaft, a rack meshed with the pinion or with a member supported on the pinion; a worm reduction gear of any of the aforementioned configurations according to the present invention; an electric motor for rotatably driving the worm shaft; a torque sensor for detecting the direction and magnitude of a torque applied to the steering shaft or pinion; and a controller for controlling a drive status of the electric motor based on a signal input from the torque sensor. Moreover, the assist shaft is a member being the steering shaft, the pinion, or a sub-pinion meshing with the rack at a position separated from the pinion.

Furthermore, when implementing the worm reduction gear of the present invention, preferably the elastic body is an elestic force applying device, the worm shaft is supported such as to permit rotation and oscillating displacement with respect to a gear housing, and a worm provided at an intermediate portion is meshed with the worm wheel, and a oscillating central axis of the worm shaft is provided parallel to the central axis of the worm wheel at a position displaced towards the worm wheel side from the central axis of the worm shaft.

According to this preferred configuration, the difference in power necessary to rotate the steering wheel with the electric power steering apparatus incorporated in the worm reduction gear, and the difference in steering wheel return performance, between the two directions of rotation, can be suppressed.

That is to say, in the case of the aforementioned configuration, the object is the solution of the following problems.

Figure 50:
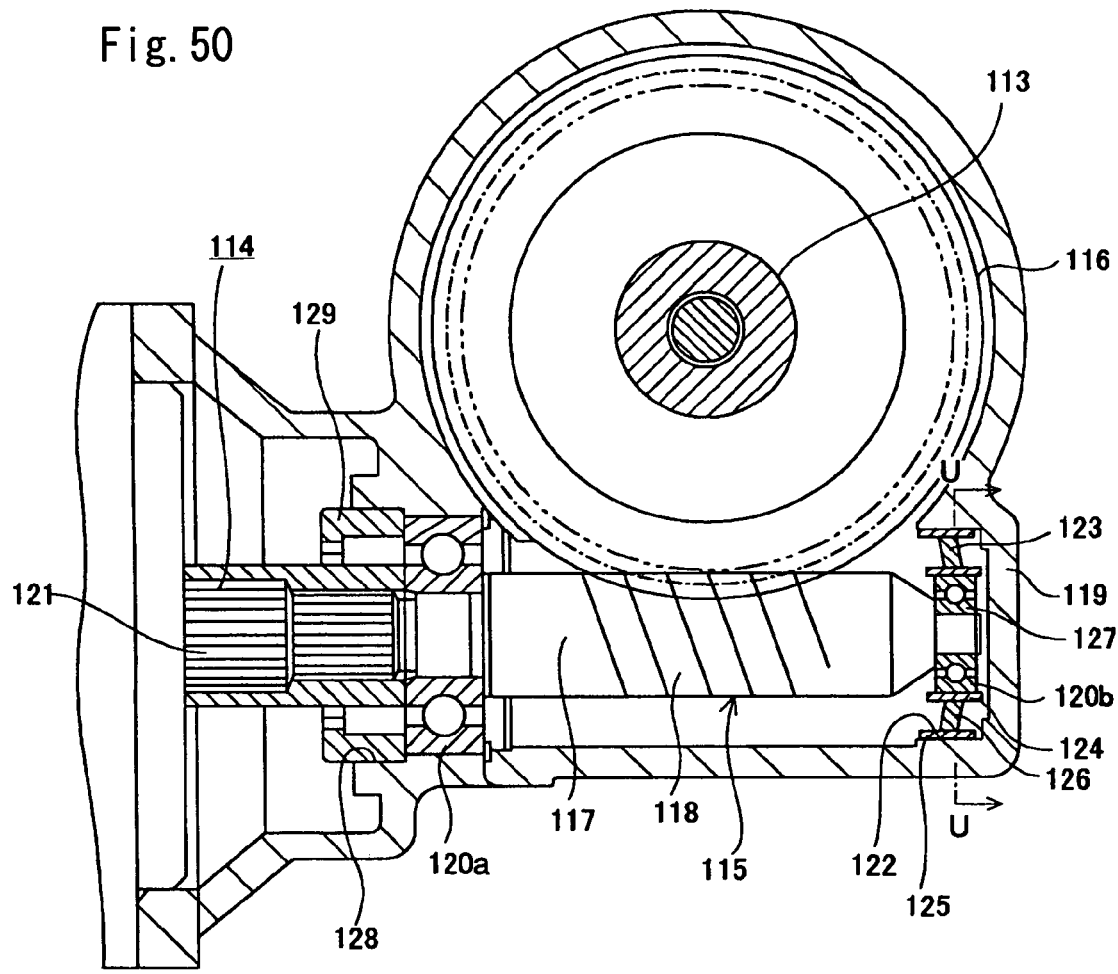
FIG. 50 is a cross-sectional view showing an example of a conventional construction of a worm reduction gear.
Figure 51:
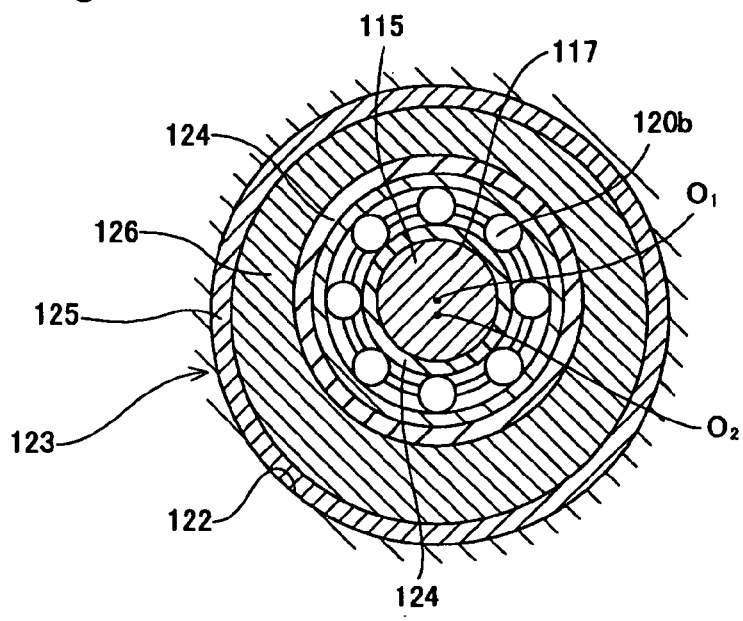
FIG. 51 is a cross-sectional view taken along the line U-U of FIG. 50.

Firstly, as conventional technology, Patent Document 3 discloses a worm reduction gear in which consideration is given to reduction of backlash at the meshing portion of the worm wheel and the worm shaft. As shown in FIGS. 50 and 51, this worm reduction gear is assembled in a power steering apparatus together with an electric motor 114, and rotation of the electric motor 114 generated in response to steering torque applied to the steering shaft 113, and auxiliary torque obtained due to reduction in the worm reduction gear 115 are applied to the steering shaft 113. Therefore, the worm wheel 116 constituting the worm reduction gear 115 is fixed onto part of the steering shaft 113, and a worm 118 on a worm shaft 117 is meshed with the worm wheel 116. Both end portions of the worm shaft 117 are rotatably supported on the inside of the gear housing 119 by a pair of rolling bearings 120*a* and 120*b*. Moreover, the base end portion of the worm shaft 117 (left end portion in FIG. 50) is connected to one end of the rotating shaft 121 of the electric motor 114 (the right end portion in FIG. 51).

Furthermore, the rolling bearing 120*b* of the pair of rolling bearings 120*a* and 120*b* and an elestic force applying device 123 are provided between the outer peripheral face of the tip end portion of the worm shaft 117 (right end portion in FIG. 50) and the inner peripheral face of a recessed hole 122 provided in the gear housing 119. The elestic force applying device 123 comprises an inner cylinder portion 124 and an outer cylinder portion 125 each being made of metal, and a rubber or synthetic resin circular ring portion 126 connecting these cylinder portions 124 and 125. Moreover, the inner cylinder portion 124 is made eccentric with respect to the outer cylinder portion 125 on the worm wheel 116 side. The outer cylinder portion 125 of the elestic force applying device 123 is fixed into the recessed hole 122, and the tip end portion of the worm shaft 117 is fixed into the inner ring 127 of the rolling bearing 120*b* fixed inside the inner cylinder portion 124. An elastic force is applied towards the worm wheel 116 (upwards in FIG. 50 and FIG. 51) at the tip end portion of the worm shaft 117 by this configuration, and the worm shaft 117 is oscillating-displaced towards the worm wheel 116 side. A face of the other rolling bearing 120*a* (left end face in FIG. 50) of the pair of rolling bearings 120*a* and 120*b* which supports the base end portion of the worm shaft 117 is pressed by the tip end face of a threaded ring 129 which is mounted in a threaded hole 128 of the gear housing 119. This configuration reduces the internal clearance in the axial direction of the pair of rolling bearings 120*a* and 120*b*, and suppresses rattling of the rolling bearings 120*a* and 120*b*.

According to the worm reduction gear disclosed in Patent Document 3, backlash at the meshing portion between the worm 118 of the worm shaft 117 and the worm wheel 116 can be reduced to a certain extent. Therefore, generation of the teeth-hitting noise at the meshing portion can be suppressed to a certain extent.

In the case of the worm reduction gear disclosed in the Patent Document 3, the worm shaft 117 is supported such as to permit oscillating displacement with respect to the gear housing 119. However, when the central axis of oscillating axis displacement of the worm shaft 117 is provided at a position passing through a point on the central axis of the worm shaft 117 such as the center of the rolling bearing 120*a* supporting the base end portion of the worm shaft 117, there is a problem in that a difference occurs in returning between the two directions of rotation of the steering wheel (not shown in drawings). Furthermore, there is also a problem in that the difference between the forces in the two directions of rotation required for the driver to operate the steering wheel increases. This reason is explained below.

Figure 52:
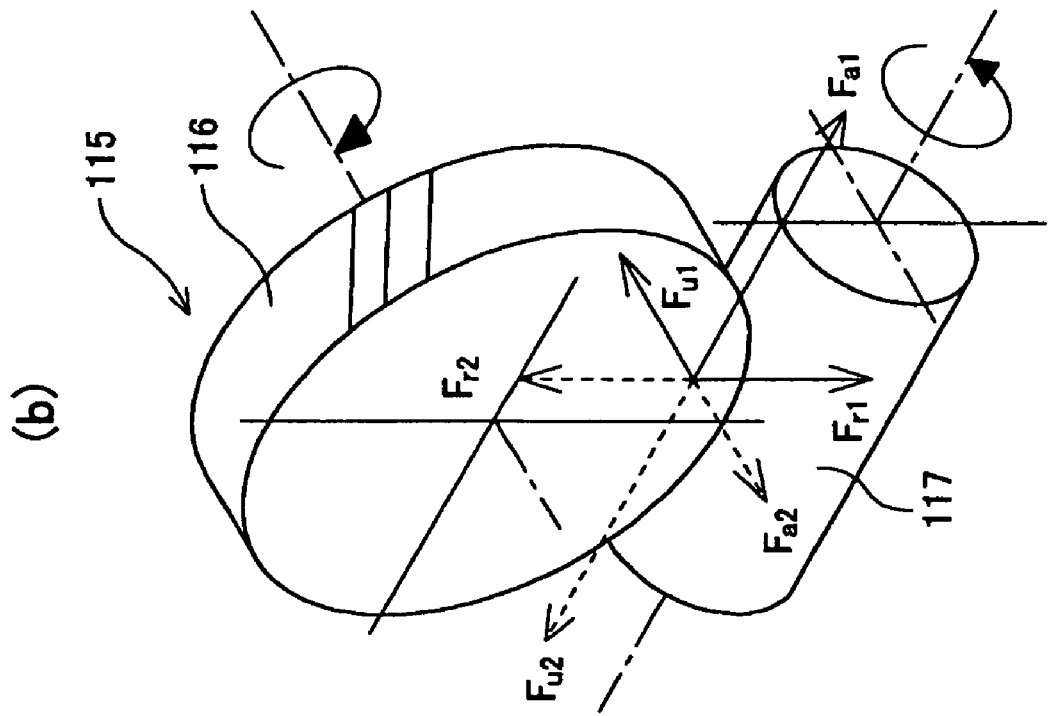
FIG. 52 is a schematic perspective view showing components of a force applied to the worm shaft and the worm wheel when transmitting a drive force therebetween.
Figure 52:
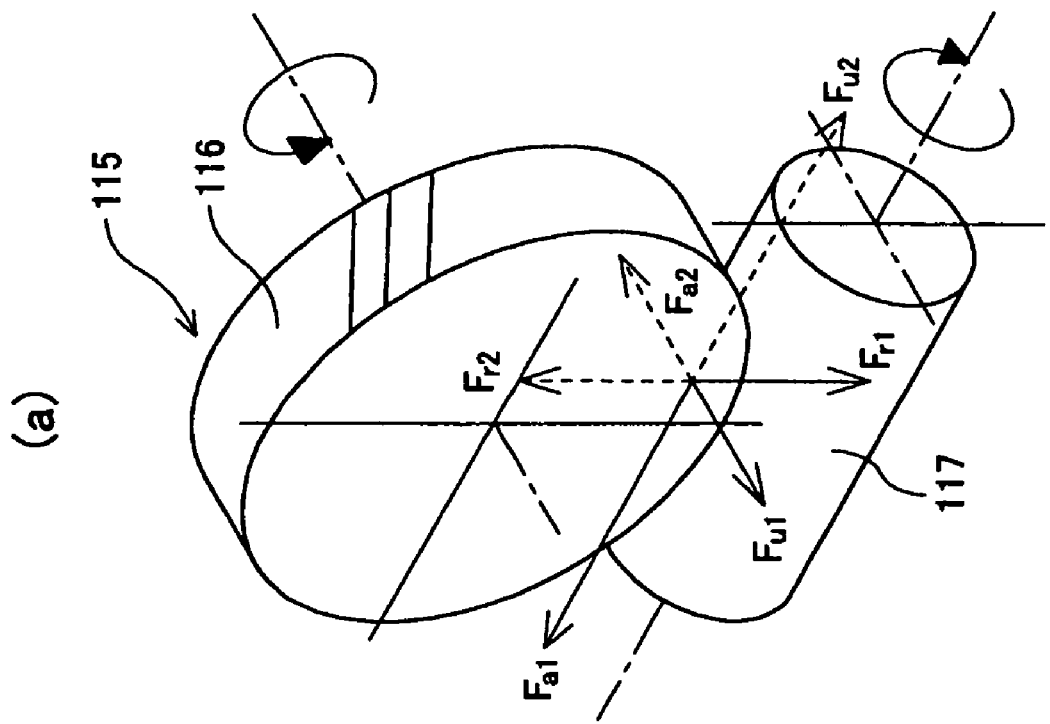

Firstly, consider the case of rotary drive of the worm shaft 117 by the electric motor 114, and transmission of the drive force from the worm shaft 117 to the worm wheel 116 as shown in the schematic drawing in FIG. 52(*a*) and (*b*). In FIG. 52(*a*) and (*b*), the electric motor 114 rotates in opposite directions with the same magnitude of rotation. Moreover, in FIG. 52(*a*) and (*b*), the axial angle of the worm shaft 117 and the worm wheel 116 is assumed to be 90°. In this condition, the teeth faces of the worm on the worm shaft 117 and the worm wheel 116 are twisted with respect to the central axis of the worm shaft 117 and worm wheel 116, and a pressure angle exists on these teeth faces. Therefore, a reactive force comprising components of force $Fa_1$, $Fr_1$, and $Fu_1$ in three directions, namely the axial and radial directions of the worm shaft 117 and the tangential direction on the pitch circle of the worm, is applied from the worm wheel 116 to the worm shaft 117.

Furthermore, of these components $Fa_1$, $Fr_1$, and $Fu_1$, the component $Fa_1$ in the axial direction of the worm shaft 117 becomes the same magnitude in the opposite direction as the component $Fu_2$ applied in the tangential direction on the pitch circle of the worm wheel 116 from the worm shaft 117 to the worm wheel 116. Moreover, the component $Fr_1$ in the radial direction of the worm shaft 117 becomes the same magnitude in the opposite direction as the component $Fr_2$ applied in the radial direction of the worm wheel 116 from the worm shaft 117 to the worm wheel 116. Furthermore, the component $Fu_1$ in the tangential direction of the worm becomes the same magnitude in the opposite direction as the component $Fa_2$ applied in the axial direction of the worm wheel 116 from the worm shaft 117 to the worm wheel 116. Therefore, in the case of the structure shown in FIG. 50 and FIG. 51, even when the component $Fr_1$ in the radial direction is applied to the worm shaft 117, an elastic force of appropriate magnitude is applied to the worm shaft 117 towards the worm wheel 116 by the elestic force applying device 123 (FIG. 50, FIG. 51), such that the teeth faces of the worm of the worm shaft 117 and of the worm wheel 116 are not separated.

Moreover, the reaction force applied from the worm wheel 116 to the worm shaft 117 acts on the meshing portion between the worm of the worm shaft 117 and the worm wheel 116 which is displaced from the central axis of the worm shaft 117 towards the worm wheel 116. Therefore, if the oscillating center of the worm shaft 117 is provided at a position passing through the central axis of the worm shaft 117, a moment acts on the worm shaft 117 with the oscillating center as the center due to the force component $Fa_1$ in the axial direction. Furthermore, the direction of this moment reverses by the relation direction of the worm shaft 117. This is explained in more detail using FIG. 53 and FIG. 54.

Figure 53:
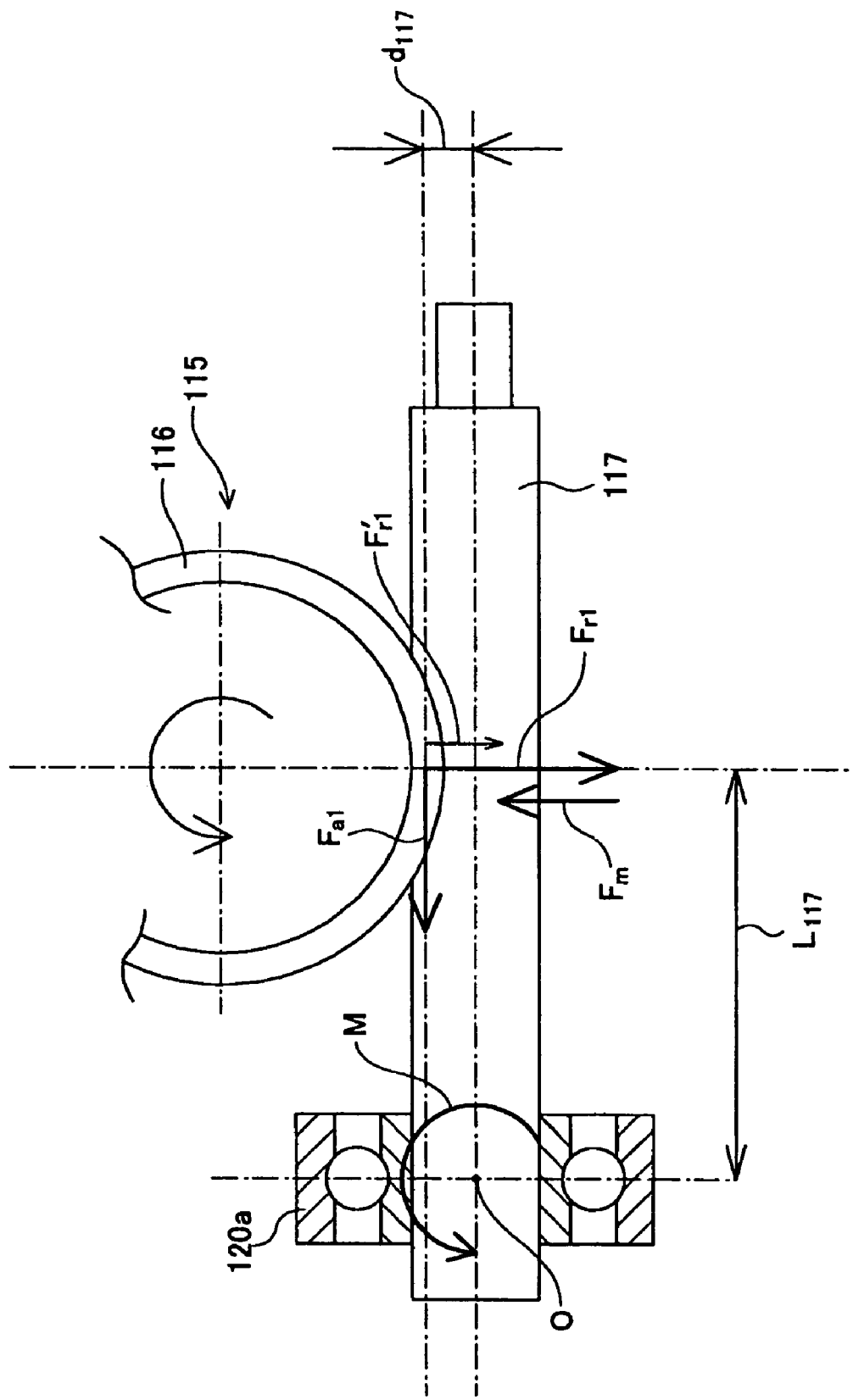
FIG. 53 is a schematic cross-sectional view for explaining the direction of a reaction force applied from the worm wheel to the worm shaft at the time of rotating drive of the electric motor in a predetermined direction.
Figure 54:
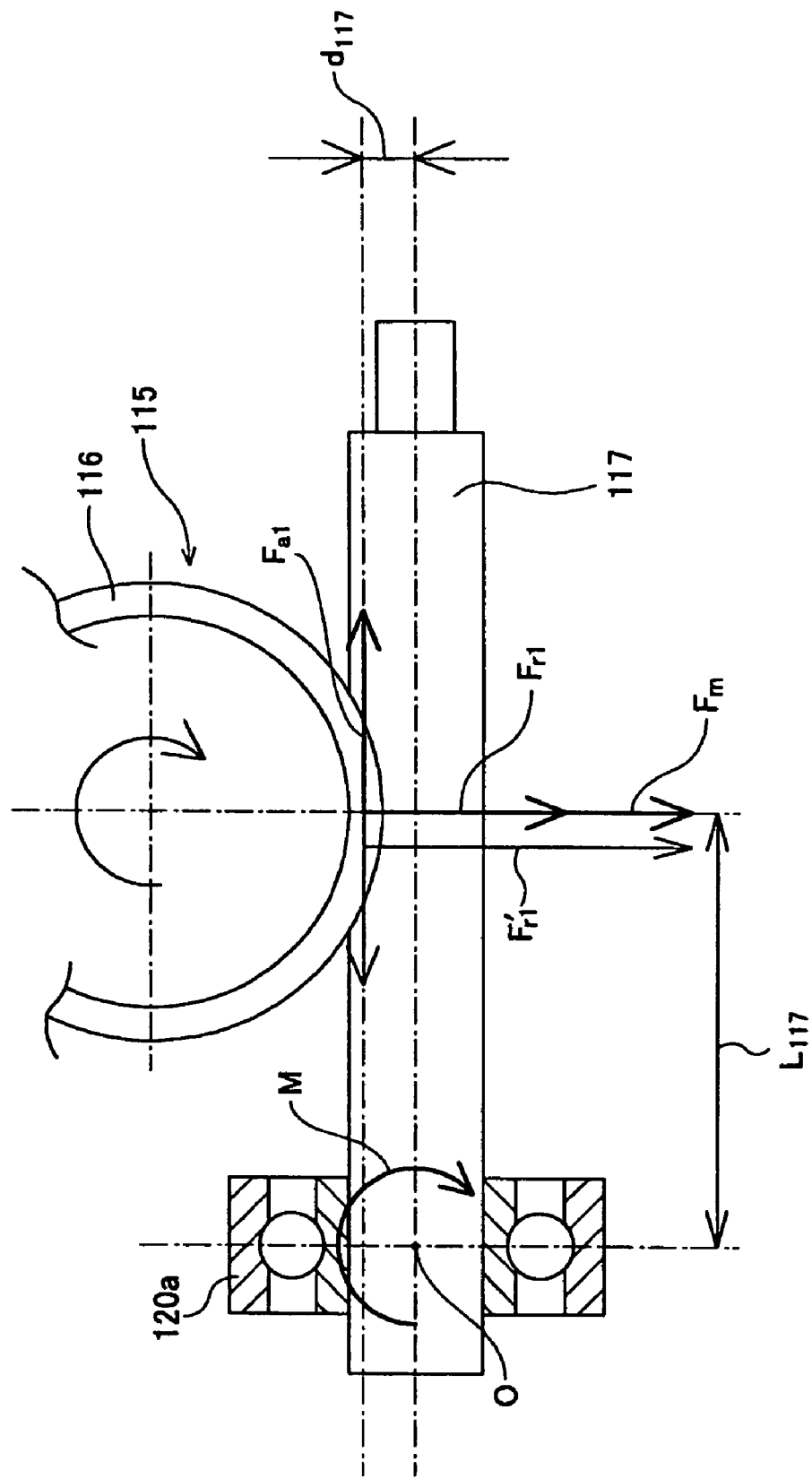
FIG. 54 is a schematic cross-sectional view for explaining the direction of a reaction force applied from the worm wheel to the worm shaft at the time of rotating drive of the electric motor in the opposite direction to the predetermined direction.

In FIG. 53 and FIG. 54, the base end portion of the worm shaft 117 (left end portion in FIG. 53 and FIG. 54) is supported by the rolling bearing 120*a* to permit rotation and some oscillating displacement with the center o of the rolling bearing 120*a* as the center in a fixed part (not shown in drawings). Moreover, in the case shown in FIG. 53 and the case shown in FIG. 54, the worm shaft 117 is rotated to the same magnitude in mutually opposite directions. Under these conditions, the reaction force $Fa_1$ in the axial direction of the worm shaft 117 is applied in opposite directions in the case shown in FIG. 53 and the case shown in FIG. 54, from the worm wheel 116 to the worm shaft 117 at the meshing portion between the worm of the worm shaft 117 and the worm wheel 116. Furthermore, if the distance between the meshing portion and the oscillating center o of the worm shaft 117 in the radial direction of the worm shaft 117 is assumed as $d_{117}$, a moment M of magnitude $d_{117} \cdot Fa_1$ acts upon the worm shaft 117. The direction of this moment M is opposite in the case shown in FIG. 53 and the case shown in FIG. 54. If the distance between the meshing portion and the worm shaft 117 oscillating center o in the axial direction of the worm shaft 117 is assumed as $L_{117}$, a force Fm of magnitude $M/L_{117}$ acts on the meshing portion in the radial direction of the worm shaft 117. Moreover, this force Fm acts in mutually opposite directions in the case shown in FIG. 53 and the case shown in FIG. 54. Therefore the magnitude of the axial force $Fr_1'$ considering the moment M, acting in the radial direction on the worm shaft 117 from the worm wheel 116 at the meshing portion is reduced ($Fr_1'=Fr_1-Fm$) when the worm wheel 116 rotates in one direction as shown in FIG. 53, and increased ($Fr_1'=Fr_1+Fm$) when the worm wheel 116 rotates in the other direction as shown in FIG. 54.

In this manner, when the worm wheel 116 rotates in the other direction (the case shown in FIG. 54), where the magnitude of the axial force $Fr_1'$ acting in the radial direction on the worm shaft 117 at the meshing portion increases, the teeth faces of the worm of the worm shaft 117 are readily separated from the teeth faces of the worm wheel 116. On the other hand, when the force pressing the teeth faces together is increased, the rotational torque of the worm wheel 116 and the worm shaft 117 increases. For this reason, when the worm wheel 116 rotates in the other direction, it is necessary to set an appropriate predetermined value for the elastic force provided by the elestic force applying device to the worm shaft 117, in consideration of the need to accommodate both the need to prevent separation of the teeth faces, and to prevent excessive force pressing teeth faces together. However, even when the elastic force is set in this manner, when the worm wheel 116 rotates in one direction, an excessive increase in the force with which the teeth faces are pressed into mutual contact is unavoidable. Therefore, a problem arises in that when a motor vehicle returns from travelling in a turn to travelling directly ahead, the steering wheel returns to the neutral condition, but return performance deteriorates in one direction and the force required by the driver to turn the steering wheel becomes excessive in one direction, so that the difference in return performance and force, in turning the steering wheel in the two directions increases.

The worm reduction gear and the electric power steering apparatus incorporating this worm reduction gear of the present invention, according to the aforementioned configuration, address this situation, and is a structure which applies an elastic force to the worm shaft in a direction towards the worm wheel to suppress the generation of the teeth hitting noise at the meshing portion between the worm of the worm shaft and the worm wheel, and has been invented to suppress the force required to rotate the member fixed with the worm wheel, and to reduce the difference in the return performance of rotating this member to the neutral condition between the two directions of rotation.

In the case of the worm reduction gear of the aforementioned configuration, the oscillating central axis of the worm shaft is provided parallel to the central axis of the worm wheel at a position displaced towards the worm wheel from the central axis of the worm shaft. Therefore, when the drive force is transmitted from the worm shaft to the worm wheel, irrespective of the reaction force applied in the axial direction of the worm shaft from the worm wheel to the worm shaft, the moment generated in the worm shaft based on the reaction force in the axial direction can be reduced or made zero. Consequently, variations in the reaction force applied in the radial direction to the worm shaft from the worm wheel due to the effect of this moment can be suppressed. Moreover, by means of this the force required to rotate the member fixed with the worm wheel, and the difference in the return performance of rotating this member to the neutral condition between the two directions of rotation can be suppressed. As a result, in the case of the electric power steering apparatus incorporating the worm reduction gear of the present invention, the force required to rotate the steering wheel, and the difference in the return performance of the steering wheel between the two directions of rotation, can be suppressed.

Furthermore, when implementing the worm reduction gear according to the aforementioned configuration, more preferably an axis parallel with the central axis of the worm wheel and passing through one point on a straight line which is parallel with the central axis of the worm shaft and includes an intersection point of pitch circles of the worm of the worm shaft and the worm wheel, is made the oscillating central axis of the worm shaft.

According to this more preferable configuration, when the drive force is transmitted from the worm shaft to the worm wheel, irrespective of application of the reaction force in the axial direction of the worm shaft from the worm wheel to the worm shaft, generation of a moment on the worm shaft based on the reaction force in the axial direction can be eliminated (made zero). Therefore, the force required to rotate the member fixed with the worm wheel, and the difference in the return performance of rotating the member to the neutral condition between the two directions of rotation can be eliminated.

More preferably a bearing holder for supporting at least one of the pair of bearings which rotatably support opposite end portions of the worm shaft, is supported such as to permit oscillating displacement with respect to the gear housing.

According to this more preferable configuration, a conventional bearing in general use can be used as one of the bearings, and this bearing can be supported such as to permit oscillating displacement with respect to the gear housing, and cost increases can be suppressed.

More preferably an oscillating central axis of the worm shaft is provided in relation to the axial direction of the worm shaft, between a bearing on an electric motor side of the pair of bearings rotatably supporting opposite end portions of the worm shaft and the meshing portion of a worm of the worm shaft and the worm wheel.

According to this more preferred configuration, a large pre-load can be applied to the meshing portion of the worm of the worm shaft and the worm wheel while keeping the oscillating displacement amount of the end portion on the electric motor side of the worm shaft small, to more effectively suppress the generation of a grating teeth hitting noise at the meshing portion.

More preferably, in any of the worm reduction gears in the aforementioned configurations, there is provided an elestic force applying device for applying an elastic force to the worm shaft in a direction towards the worm wheel, on an opposite side to the oscillating central axis of the worm shaft in relation to the meshing portion of the worm of the worm shaft and the worm wheel.

According to this more preferred configuration, the elastic deformation amount of the elastic body constituting the elestic force applying device can be increased, and the magnitude of the elastic force applied to the worm shaft can be readily regulated.

More preferably, in any of the worm reduction gears in the aforementioned configurations, a bearing holder for supporting a bearing for rotatably supporting one end portion of the worm shaft is supported in the gear housing such as to permit oscillating displacement by an oscillating axis, and an elastic member is provided between the gear housing and the oscillating axis, or between the bearing holder and the oscillating axis.

According to this more preferred configuration, generation of the teeth hitting noise at the meshing portion can be suppressed without needlessly increasing the rotational torque of the worm shaft. That is to say, when the worm shaft is supported such that axial displacement with respect to the gear housing is impossible, the worm shaft is readily able to rotate when a rotational vibration is input to the worm wheel. Furthermore, since a large inertial moment electric motor rotating shaft is connected to this worm shaft, the force transmitted between the teeth faces of the worm of the worm shaft and the worm wheel increases, based on this rotational vibration of the worm wheel. Consequently it is necessary to increase the elastic force applied by the elestic force applying device so that even when this force is applied, the both teeth faces do not separate. However if this elastic force becomes excessive, the rotational torque of the worm shaft becomes needlessly large. On the other hand, according to the worm reduction gear of the aforementioned configuration of the present invention, when a rotational vibration is input to the worm wheel, the worm shaft is readily displaced in the axial direction, and rotation of the worm shaft becomes difficult. Therefore, the force transmitted between the both teeth faces can be made small. As a result, separation of the teeth faces can be prevented without needlessly increasing the rotational torque of the worm shaft, and generation of the teeth hitting noise can be suppressed. Moreover, transmission of vibration based on collision of the teeth faces, to the gear housing can be made more difficult, and generation of an abnormal noise based on this vibration can be suppressed.

Furthermore, when implementing the worm reduction gear according to the aforementioned configuration of the present invention, preferably a bearing holder for supporting a bearing for rotatably supporting one end portion of the worm shaft, is supported in the gear housing such as to permit oscillating displacement by the oscillating axis, and an elastic ring with at least one part being of an elastic member is provided between the gear housing and the oscillating axis, or between the bearing holder and the oscillating axis, and the rigidity of the elastic ring with respect to the radial direction of the oscillating axis of the worm shaft is made different in the circumferential direction.

According to this preferred configuration, by reducing the rigidity of the elastic ring with respect to the axial direction of the worm shaft, the worm shaft can be readily displaced in the axial direction with respect to the gear housing while maintaining the rigidity required of the entire elastic ring. Therefore the increase in rotational torque of the worm shaft can be more effectively suppressed.

Moreover, when implementing any of the worm reduction gears according to the configurations of the present invention, preferably an elestic force applying device for applying an elastic force in a direction towards the worm wheel to the worm shaft, is provided between the worm shaft and an electric motor rotating shaft.

According to this preferred configuration, while suppressing the abnormal noise, a deep groove ball bearing having a comparatively large internal clearance in the axial direction can be used as one of the bearings for supporting the end portion of the worm shaft on the electric motor side, and hence costs can be reduced.

Furthermore, when implementing any of the worm reduction gears according to the configurations of the present invention, preferably an elestic force applying device for applying an elastic force in a direction towards the worm wheel to the worm shaft, is provided between a bearing holder for supporting at least one of the pair of bearings rotatably supporting the opposite end portions of the worm shaft, and the gear housing.

According to this preferred configuration, a pre-load can be applied to the meshing portion of the worm of the worm shaft and the worm wheel without increasing the total length of the part formed by connecting the worm shaft and the electric motor rotating shaft.

Moreover, when implementing any of the worm reduction gears according to the configurations of the present invention, preferably an elastic member is provided between one of the pair of bearings supporting the opposite end portions of the worm shaft, and which is separated from the oscillating central axis, and the gear housing, to thereby enable oscillating displacement of the worm shaft with respect to the gear housing.

According to this preferred configuration, generation of an abnormal noise due to collision between the end portion of the worm shaft on the opposite side to the electric motor, and the one bearing supporting this end portion can be prevented, without losing the effect of suppressing the generation of the teeth hitting noise at the meshing portion of the worm of the worm shaft and the worm wheel.

Furthermore, when implementing any of the worm reduction gears according to the configurations of the present invention, preferably a second elastic ring with at least one part being of an elastic member is provided between one of the pair of bearings supporting the opposite end portions of the worm shaft, and which is separated from the worm shaft oscillating central axis, and the gear housing, to thereby enable oscillating displacement of the worm shaft with respect to the gear housing, and the rigidity of the second elastic ring in relation to the direction of oscillating displacement of the worm shaft is made different to that in another direction.

According to this preferred configuration, displacement of the worm shaft towards the worm wheel side can be more readily performed while preventing displacement of the worm shaft in an unintended direction, and generation of the teeth hitting noise at the meshing portion of the worm of the worm shaft and the worm wheel can be more effectively suppressed.

Moreover, when implementing the worm reduction gear of the aforementioned configuration, preferably a stopper portion for restricting oscillating displacement of the worm shaft, is provided in the elastic member or the second elastic ring provided between the one bearing and the gear housing. According to this desirable configuration, excessive oscillating displacement of the worm shaft can be prevented.

Furthermore, when implementing any of the worm reduction gears according to the configurations of the present invention, preferably the rotating shaft of the electric motor and the worm shaft are connected via an elastic member. According to this preferred configuration, transmission of rotational vibration between the rotating shaft of the electric motor and the worm shaft can be inhibited.

Moreover, when implementing any of the worm reduction gears according to the configurations of the present invention, preferably grease is filled between the gear housing and a bearing holder for supporting at least one bearing of the pair of bearings which rotatably support the opposite end portions of the worm shaft.

According to this preferred configuration, when transmitting the drive force between the worm shaft and the worm wheel, if a tendency occurs for separation of the worm shaft from the worm wheel based on the reaction force applied from the worm wheel to the worm shaft, oscillating displacement of the bearing holder can be inhibited. When the drive force increases, the reaction force increases, and a tendency occurs for the speed of separation of the worm shaft from the worm wheel to increase. In this case, since the viscous resistance of the grease also increases, oscillating displacement of the bearing holder can be suppressed. Separation of the teeth faces of the worm of the worm shaft and the worm wheel can therefore be readily prevented.

Furthermore, when implementing any of the worm reduction gears according to the configurations of the present invention, preferably a bearing holder for supporting at least one bearing of the pair of bearings which rotatably support the opposite end portions of the worm shaft is made of magnesium alloy.

According to this preferred configuration, vibration generated in the worm shaft due to collision of the teeth faces of the worm of the worm shaft and the worm wheel can be readily absorbed by the bearing holder. Therefore transmission of this vibration to the gear housing can be inhibited.

Moreover, the electric power steering apparatus of the present invention comprises: a steering shaft provided at a rear end thereof with a steering wheel; a pinion provided at a front end of the steering shaft, a rack meshed with the pinion or with a member supported on the pinion; any of the worm reduction gears according to the aforementioned configuration of the present invention; an electric motor for rotatably driving the worm shaft; a torque sensor for detecting the direction and magnitude of a torque applied to the steering shaft or pinion; and a controller for controlling a drive status of the electric motor based on a signal input from the torque sensor. Furthermore, the worm wheel is fixed to a member being the steering shaft, the pinion, or a sub-pinion meshing with the rack at a position separated from this pinion.

Moreover, when implementing the worm reduction gear of the present invention, preferably the elastic body applies an elastic force to the worm shaft in a direction towards the worm wheel via a pre-load pad. Furthermore, the worm wheel is freely fixed to an assist shaft. Moreover, one end portion of the worm shaft is supported by a first bearing, and the other end portion is supported by a second bearing, inside a gear housing, and a worm provided in an intermediate portion meshes with the worm wheel, and is able to oscillate around the first bearing. Furthermore, an outer peripheral face and at least part of both axial side faces of the second bearing are covered by a synthetic resin shock-absorbing member fixed to the gear housing, and axial displacement of the second bearing with respect to the shock-absorbing member is restricted. Moreover, axial displacement of the worm shaft with respect to the pre-load pad and the second bearing is permitted.

According to this preferred configuration, irrespective of the force applied from the worm wheel to the worm shaft in the axial direction, the pre-load applied to the meshing portion of the worm of the worm shaft and the worm wheel can be readily maintained within a limited narrow range. Therefore generation of the teeth hitting noise at the meshing portion can be effectively suppressed.

That is to say, in the case of the aforementioned configuration, it is also an object to solve the following problems.

Figure 55:
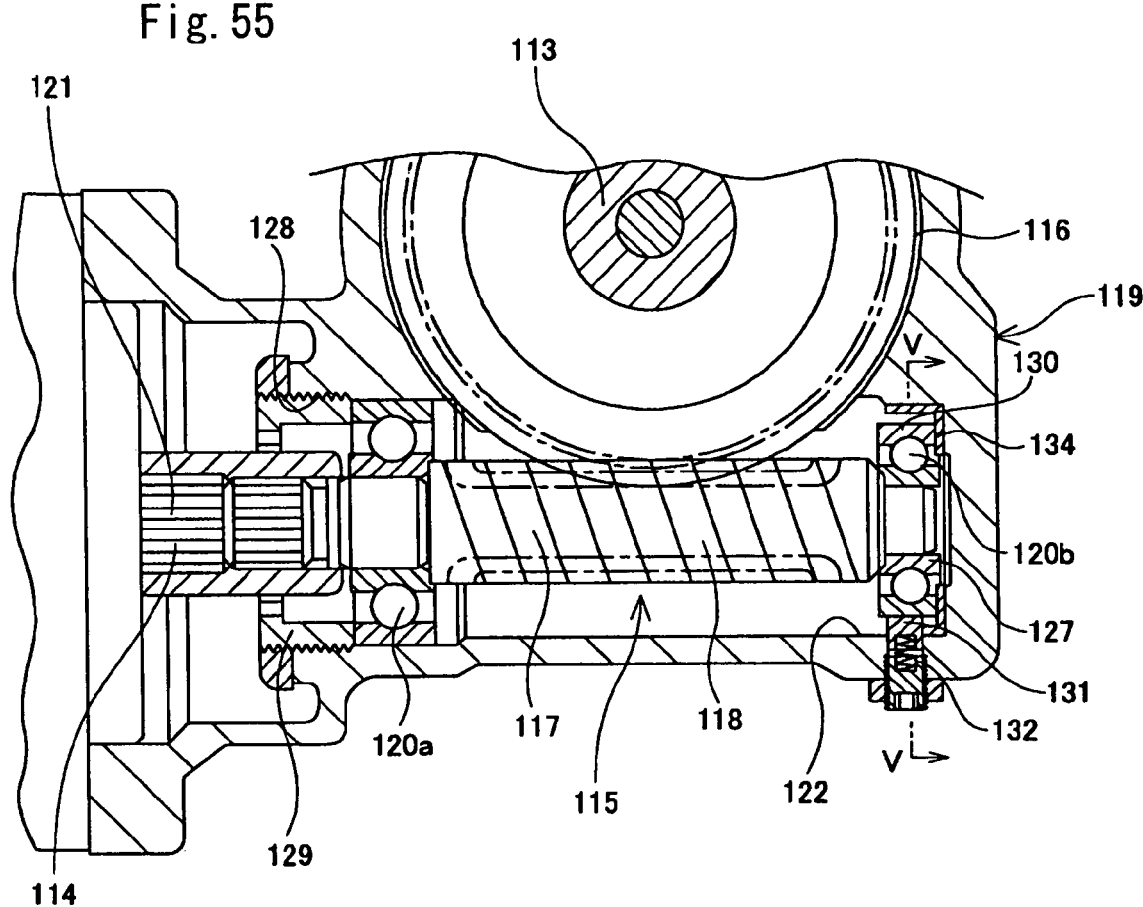
FIG. 55 is a cross-sectional view showing another example of a conventional construction of a worm reduction gear.
Figure 56:
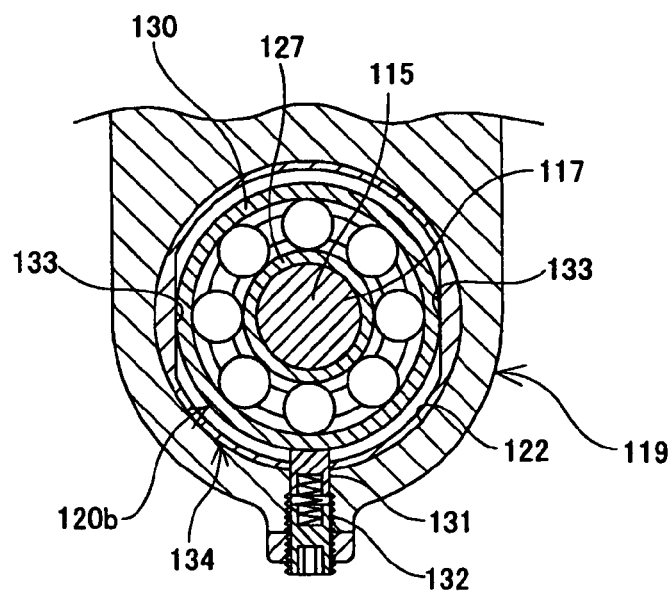
FIG. 56 is a cross-sectional view taken along the line V-V of FIG. 55.

Firstly, as conventional technology, Patent Document 4 discloses a worm reduction gear in which consideration is given to reduction of backlash at the meshing portion of the worm wheel and the worm of the worm shaft. As shown in FIGS. 55 and 56, opposite end portions of the worm shaft 117 of this worm reduction gear, are rotatably supported with respect to a gear housing 119 by a pair of rolling bearings 120*a* and 120*b*. A pushing body 131 is pressed elastically against the peripheral face of an outer ring 130 of the rolling bearing 120*b* (right in FIG. 55) being one of the pair of rolling bearings 120*a* and 120*b*, by a spring 132 supported in the gear housing 119. This configuration applies an elastic force in the direction towards the worm wheel 116, to the tip end portion of the worm shaft 117. Furthermore, a cylindrical guide member 134 provided with a pair of side wall faces 133 with mutually parallel inner faces is provided surrounding the one rolling bearing 120*b*, to restrict displacement of the one rolling bearing 120*b* in the radial direction and axial direction. Moreover, by pressing the tip end portion of a threaded ring 129 which is engaged in a threaded hole formed in the gear housing 119, against one face of the other rolling bearing 120*a* (left in FIG. 55) of the pair of rolling bearings 120*a* and 120*b*, the internal clearance of the other rolling bearing 120*a* is reduced, the worm shaft 117 is pressed against the one rolling bearing 120*b*, and the internal clearance of this one rolling bearing 120*b* is reduced. This configuration suppresses play in the one rolling bearing 120*b* and the other rolling bearing 120*a*. Other configurations are similar to the structure disclosed in Patent Document 3 shown in FIG. 48 through FIG. 49.

According to the worm reduction gear disclosed in Patent Document 4, as with the structure disclosed in Patent Document 3, pre-load can be applied to the meshing portion of the worm 118 of the worm shaft 117 and the worm wheel 116, and backlash at the meshing portion can be reduced to a certain extent. Therefore generation of the teeth hitting noise at the meshing portion can be suppressed to a certain extent.

In the case of the structure disclosed in Patent Document 4, play in the rolling bearings 120*a* and 120*b* can be suppressed by tightening the threaded ring 129. However, as the threaded ring 129 is increasingly tightened, the end face of the outer ring 130 constituting the one rolling bearing 120*b* for supporting the tip end portion of the worm shaft 117 is pressed strongly against the bottom face of the guide member 134. As a result, a large frictional force is generated between the end face of the outer ring 130 and the bottom face of the guide member 134. This increase in the frictional force becomes a cause of a reduction in the pre-load applied to the meshing portion by the spring 132 pressing against the outer peripheral face of the outer ring 130. Furthermore, a reduction in this pre-load becomes a cause of the teeth hitting noise being readily generated at the meshing portion.

To address this situation, it is considered to increase the elastic force applied to the outer ring 130 by the spring 132, so that even when the frictional force acting between the end face of the outer ring 130 and the end face of the guide member 134 increases, the pre-load applied to the meshing portion is maintained equal to or greater than a predetermined value. However, if this pre-load is excessively large, the return performance of the steering wheel deteriorates. That is to say, the pre-load is applied to suppress generation of the teeth hitting noise at the meshing portion, however, if this pre-load becomes equal to or greater than a predetermined value, when a motor vehicle returns from travelling in a turn to travelling directly ahead, the steering wheel return performance to restore the steering wheel to the neutral condition deteriorates. Therefore the pre-load must be set within a narrow range. Consequently, the frictional force acting between the end face of the outer ring 130 and the end face of the guide member 134 which significantly affects this pre-load, must be sufficiently suppressed. However, the operation in finely adjusting the tightness of the threaded ring 129 in order to sufficiently reduce this frictional force is difficult.

Moreover, when the electric motor 114 is rotated in association with the driver steering the steering wheel, a large reaction force is applied in the axial direction of the worm shaft 117 from the worm wheel 116 to the worm shaft 117. When the worm shaft 117 is displaced to the guide member 134 side in relation to the axial direction by this reaction force, the outer ring 130 of the one rolling bearing 120*b* for supporting the tip end portion of the worm shaft 117 is pressed strongly against the bottom face of the guide member 134, so that there is a possibility that the frictional force generated between the outer ring 130 and the bottom face of the guide member 134 will increase. That is to say, it is difficult to maintain this frictional force at a constant value over a long period of time, and when this frictional force increases, the teeth hitting noise is readily generated at the meshing portion. On the other hand, if this frictional force is reduced, the return performance of the steering wheel readily deteriorates.

The worm reduction gear and the electric power steering apparatus incorporating this worm reduction gear address this situation, and have been invented to effectively suppress the generation of the teeth hitting noise at the meshing portion by ensuring that the pre-load applied to the meshing portion is readily and stably maintained within a limited narrow range, irrespective of the force applied from the worm wheel to the worm shaft in the axial direction.

In the case of the aforementioned configuration, axial displacement of the worm shaft with respect to the pre-load pad for applying an elastic force to the worm shaft, and the second bearing for supporting the tip end portion of the worm shaft is permitted. Therefore, even when a large reaction force is applied from the worm wheel to the worm shaft in the axial direction, the pre-load pad and the second bearing are not pressed strongly against other members in the axial direction of the worm shaft by the reaction force. Consequently, by applying an elastic force to the worm shaft with the elastic body via the pre-load pad, the pre-load applied to the meshing portion of the worm wheel and the worm of the worm shaft can be prevented from fluctuating on a grand scale due to the effect of the reaction force. As a result, the pre-load can be readily and stably maintained within a limited narrow range for a long period of time, and generation of the teeth hitting noise at the meshing portion can be effectively suppressed. Furthermore, since the shock-absorbing member which restricts displacement of the second bearing is made from synthetic resin, the frictional force acting between the second bearing and the shock-absorbing member can be reduced, and the second bearing can be readily displaced in the radial direction. Therefore, generation of the teeth hitting noise at the meshing portion can be more effectively suppressed. Moreover, the outer peripheral face and at least part of both axial side faces of the second bearing are covered by the shock-absorbing member, and axial displacement of the second bearing with respect to the shock-absorbing member is restricted. Therefore, play in the second bearing can be readily suppressed without pressing the worm shaft against the second bearing in the axial direction.

Furthermore, when implementing the aforementioned worm reduction gear, more preferably the shock-absorbing member is one where notches are provided along the entire axial length in a part in the circumferential direction.

In the case of this more preferable configuration, the diameter of the shock-absorbing member can be elastically widely expanded, so that the operation of assembling the second bearing into the shock-absorbing member to restrict axial displacement of the second bearing can be readily performed. Moreover, dimensional errors and assembly errors in parts provided surrounding the shock-absorbing member can be readily absorbed by the shock-absorbing member. Furthermore, even if the ambient temperature varies, dimensional changes are absorbed by the notched part provided in the shock-absorbing member, and dimensional changes other than at the notch of the shock-absorbing member can be suppressed.

More preferably for the second bearing, axial displacement of the second bearing with respect to the shock-absorbing member is prevented, and radial displacement of the second bearing with respect to the shock-absorbing member is permitted.

According to this more preferred configuration, in the case where the worm shaft is displaced with oscillating while relatively displacing the worm shaft and the second bearing in the axial direction, sliding friction between the worm shaft and second bearing can be readily reduced, and the oscillating displacement can be readily performed in a smooth manner. Therefore, overall frictional losses can be reduced, and an appropriate pre-load can be readily applied to the meshing portion of the worm of the worm shaft and the worm wheel.

Furthermore, more preferably an elastic member is provided between the shock-absorbing member and the gear housing, or between the shock-absorbing member and the second bearing.

According to this more preferred configuration, play in the shock-absorbing member with respect to the gear housing, or play in the second bearing with respect to the shock-absorbing member, can be readily suppressed. Therefore dimensional control of each part can be readily performed, and meshing at the meshing portion of the worm of the worm shaft and the worm wheel can be readily maintained in an appropriate condition. Moreover, when assembling the shock-absorbing member into the gear housing, and assembling the second bearing into the shock-absorbing member, the elastic member can be compressed between these members. Therefore the operation of assembling the shock-absorbing member and the second bearing can be performed with respect to the gear housing and shock-absorbing member while preventing falling out of the shock-absorbing member or the second bearing, and hence the assembly operation can be readily performed.

Furthermore, more preferably the shock-absorbing member comprises a pair of elements having a shape obtained by dividing the shock-absorbing member into two by a virtual plane containing the central axis of the shock-absorbing member. According to this more preferable configuration, the fabrication operation to obtain the shock-absorbing member is simplified, and the operation for assembling the second bearing inside the shock-absorbing member is more readily performed.

Moreover, when implementing the aforementioned configuration, preferably the directions of the matching faces of the pair of elements are aligned with the direction wherein the elastic force is applied by the elastic body to the worm shaft. According to this preferred configuration, oscillating displacement of the worm shaft can be more readily performed.

Furthermore, in this case of the aforementioned electric power steering apparatus, this comprises: a steering shaft provided at a rear end portion thereof with a steering wheel; a pinion provided at a front end side of the steering shaft; a rack meshed with the pinion or with a member supported on the pinion; any of the worm reduction gears according to the aforementioned configurations of the present invention; an electric motor for rotatably driving the worm shaft; a torque sensor for detecting the direction and magnitude of a torque applied to the steering shaft or pinion; and a controller for controlling a drive status of the electric motor based on a signal input from the torque sensor, and an assist shaft is a member being the steering shaft, the pinion, or a sub-pinion meshing with the rack at a position separated from the pinion.

EXAMPLE 1

Figure 46:
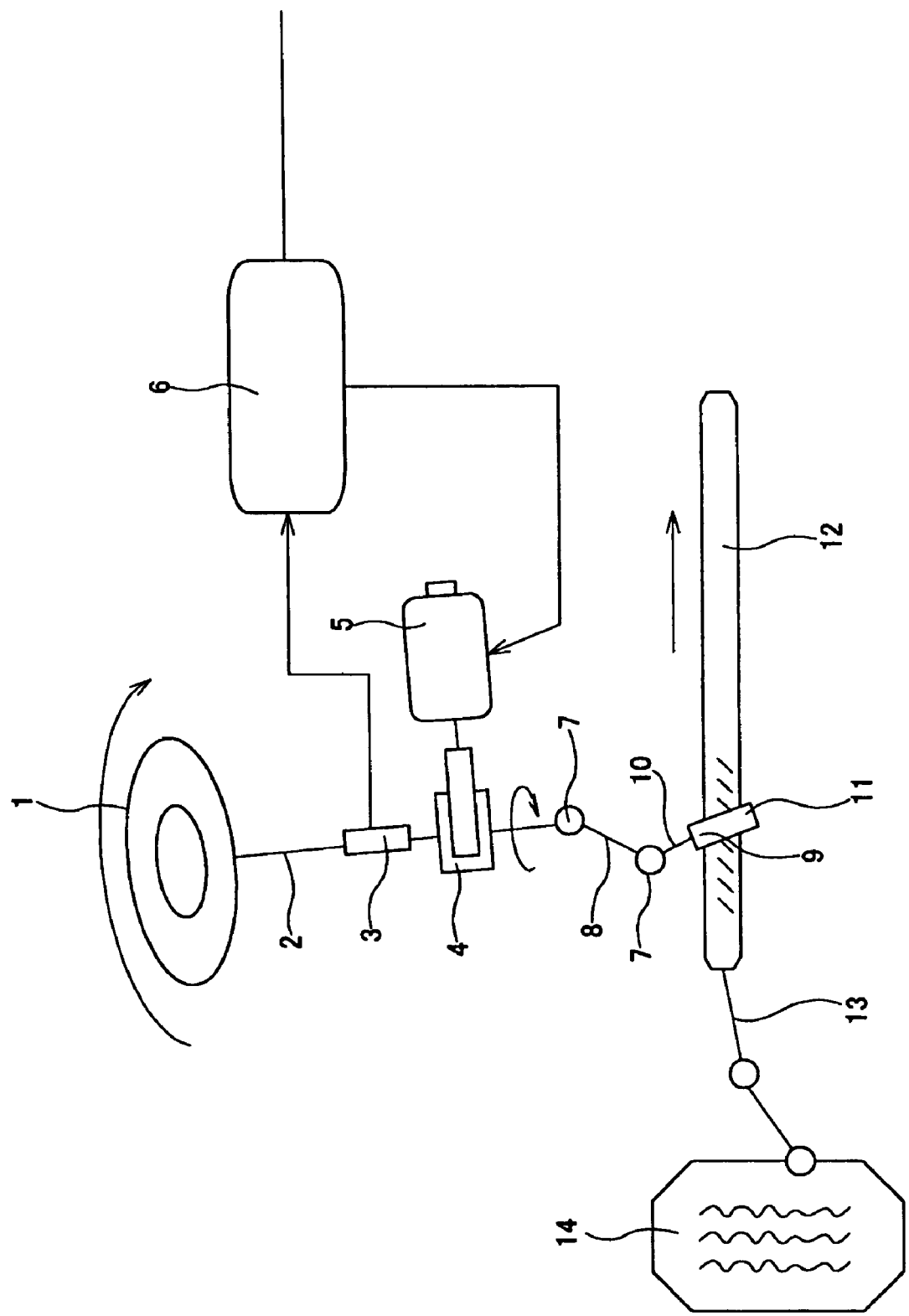
FIG. 46 is a schematic diagram of an overall construction of an electric power steering apparatus being an object of the present invention.

FIGS. 1 to 9 show a first example of the present invention. The electric power steering apparatus of this example comprises: a steering shaft 2 being an assist shaft which is secured at a rear end portion to a steering wheel 1; a steering column 15 through which the steering shaft 2 passes freely; a worm reduction gear 16 for applying a supplementary torque to the steering shaft 2; a pinion 11 (refer to FIG. 46) provided on the front end of the steering shaft 2; a rack 12 (refer to FIG. 46) which is meshed with the pinion 11 or with a member supported on the pinion 11; a torque sensor 3 (refer to FIG. 46); an electric motor 31; and a controller 6 (refer to FIG. 46).

The steering shaft 2 is made by assembling an outer shaft 17 and an inner shaft 18 by a spline engaging section so as to freely transmit a rotation force and enable axial movement. Moreover, in the case of this example, the front end portion of the outer shaft 17 and the rear end portion of the inner shaft 18 are engaged by a spline, and connected via synthetic resin. Consequently, for the outer shaft 17 and the inner shaft 18, at the time of a collision this synthetic resin is broken so that the total length can be shortened.

Furthermore, the cylindrical steering column 15 through which the steering shaft 2 passes, is made by assembling an outer column 19 and an inner column 20 in telescopic form; so that in the case where an axial impact is applied, the energy due to this impact is absorbed and the total length shortened, giving a so called collapsible construction. Moreover, the front end portion of the inner column 20 is securely connected to the rear end face of a gear housing 22. The inner shaft 18 passes through the inside of this gear housing 22, and the front end portion of the inner shaft 18 protrudes from the front end face of the gear housing 22.

Regarding the steering column 15, the central portion is supported by a support bracket 24 on one part of a car body 26 such as the lower face of the dash board. Furthermore, between the support bracket 24 and the car body 26 there is provided an engaging section (not shown in the figure) so that in the case where the support bracket 24 is subjected to an impact in the forward direction, the support bracket 24 comes away from the engaging section. The upper end portion of the gear housing 22 also is supported on one part of the car body 26. By providing a tilt mechanism and a telescopic mechanism, adjustment of the front and rear position and the height position of the steering wheel 1 can be freely made. Such a tilt mechanism and telescopic mechanism is heretofore known, and are not a characteristic part of this example, and hence detailed description is omitted.

At the front end portion of the inner shaft 2, the part which protrudes from the front end face of the gear housing 22 is connected to the rear end portion of an intermediate shaft 8 via a universal joint 7. Furthermore, the front end portion of the intermediate shaft 8 is connected to an input shaft 10 of a steering gear 9 via another universal joint 7. The pinion 11 is joined to the input shaft 10. Furthermore, the rack 12 is meshed with the pinion 11. In order to prevent vibration applied to the intermediate shaft 8 from the ground via the wheels, from being transmitted to the steering wheel 1, a vibration absorber may be provided in each of the universal joints 7.

The worm reduction gear 16 comprises a worm wheel 28 which can be externally fixed onto one part of the inner shaft 18, a worm shaft 29, a torsion coil spring 30, and a pre-load pad 70. Moreover, the worm reduction gear 16 comprises first through fourth ball bearings 34 through 37, being single row deep groove type.

The torque sensor 3 is provided surrounding the intermediate portion of the steering shaft 2, and detects the direction and magnitude of a torque applied to the steering shaft 2 from the steering wheel 1, and sends a signal (detection signal) representing the detection value to the controller 6. Then the controller 6 sends a drive signal to the electric motor 31 corresponding to this detection signal, so that an auxiliary torque is produced of a predetermined magnitude in a predetermined direction.

The worm wheel 28 and the worm shaft 29 are provided on the inside of the gear housing 22, and the worm wheel 28 and a worm 27 provided on an intermediate portion of the worm shaft 29 are meshed together. The electric motor 31 comprises; a case 23 which is securely connected to the gear housing 22, a stator 39 of a permanent magnet type which is provided on the inner peripheral face of the case 23, a rotation shaft 32 provided on the inside of the case 23, and a rotor 38 provided on the intermediate portion of the rotation shaft 32 in a condition facing the stator 39.

The first ball bearing 34 is provided between the inner peripheral face of a concavity 41 provided in the central portion of a bottom plate 40 constituting the case 23, and the outer peripheral face of the base end portion of the rotation shaft 32, and rotatably supports the base end portion (left end poriton in FIGS. 2 and 3) of the rotation shaft 32 with respect to the case 23. The second ball bearing 35 is provided between an inner peripheral edge of a partition 42 provided on the inner peripheral face of an intermediate portion of the case 23, and the outer peripheral face of an intermediate portion of the rotation shaft 32, and rotatably supports the intermediate portion of the rotation shaft 32 with respect to the partition 42. The rotor 38 is formed by winding a coil 45 in slots 44 provided at a plurality of locations around the circumferential direction of the outer peripheral face of a laminated steel plate type core 43 which is provided on the intermediate portion of the rotation shaft 32. Moreover, at the tip end portion of the rotation shaft 32 (the right end portion in FIGS. 2 and 3), on a portion between the rotor 38 and the partition 42, there is provided a commutator 46 for energizing the coil 45.

On the other hand, at the inner peripheral face of the case 23, a brush holder 47 is secured to a portion facing the commutator 46. Furthermore, a brush 48 is accommodated inside the brush holder 47 so as to be freely displaced in the radial direction of the case 23. The brush 48 is electrically connected to a terminal of a coupler (not shown in the figure) provided on the outer peripheral face of the case 23. An elastic force directed radially inwards of the case 23 is applied to the brush 48 by means of a spring 49 supported inside of the brush holder 47. Consequently, the inner end face of the brush 48 is elastically and slidingly contacted against the outer peripheral face of the commutator 46. The commutator 46 and the brush 48 constitute a rotor phase detector for switching the direction of the exciting current to the coil 45.

Furthermore, by means of a spline engaging section 33 which is made up by spline engagement of a female spline 50 provided in the inner peripheral face of the base end portion (left end portion in FIGS. 2 and 4) of the worm shaft 29, and a male spline 51 provided on the tip end portion of the rotation shaft 32, the end portion pairs of the two shafts 29 and 32 are connected. Due to this construction, the worm shaft 29 rotates together with the rotation shaft 32.

The third ball bearing 36 rotatably supports the base end portion of the worm shaft 29 on the inside of the gear housing 22. Therefore an outer ring 57 constituting the third ball bearing 36 is internally fixed into the inner peripheral face of a support bore 59 provided on one part of the gear housing 22. Furthermore, one axial end face (the right end face in FIGS. 2 and 4) of the outer ring 57 is abutted against a step portion 58 provided on the inner peripheral face of the support bore 59, and the other axial end face (the left end face in FIGS. 2 and 4) of the outer ring 57 is held by a lock ring 88 which is locked in an inner peripheral face of the support bore 59. Moreover, an inner ring 52 constituting the third ball bearing 36 is externally fitted on the outer peripheral face of the base end portion of the worm shaft 29, to a portion axially corresponding to the spline engaging section 33. Furthermore, the axial central position of the spline engaging section 33, and the axial central position of the third ball bearing 36 are made to approximately coincide. A small gap is provided between the inner peripheral face of the inner ring 52 and the outer peripheral face of the worm shaft 29, so that it is possible to incline the worm shaft 29 with respect to the third ball bearing 36 within a predetermined range. Moreover, between the axial opposite end faces of the inner ring 52 and the inner end face of a nut 55 which is threadedly secured to a male thread portion 54 provided on the base end portion of the worm shaft 29, and the side face of a flange 53 provided on the outer peripheral face of the base end side portion of the worm shaft 29, there is respectively provided a plurality of disc springs 56. Between the side face of the flange 53 and the inner end face (the left end face in FIGS. 2 and 4) of the nut 55, the inner ring 52 is elastically sandwiched. By means of this construction, the worm shaft 29 can be elastically displaced with respect to the third ball bearing 36, within a predetermined range in the axial direction. Preferably, a ball bearing of a four point contact type is used for the third ball bearing 36.

On the other hand, the fourth ball bearing 37 rotatably supports the tip end portion (the right end portion in FIGS. 2, 4 and 5) of the worm shaft 29 on the inside of the gear housing 22. Therefore an outer ring 60 constituting the fourth ball bearing 37 is fixed into a holder 61 which is secured inside the gear housing 22. The holder 61 is an overall annular shape of L-shape in cross-section, and the outer ring 60 is internally fixed into a large diameter portion 62 provided on an inner peripheral face of one half portion (the left half portion in FIGS. 2, 4 and 5) of the holder 61. Furthermore, on the outer peripheral face of the tip end side portion of the worm shaft 29, a bush 64 made of an elastic material is externally fitted onto the large diameter portion 63 provided on the portion away from the worm 27. The bush 64 is formed in an overall annular shape of L-shape in cross-section. Moreover, the large diameter portion 63 of the worm shaft 29 is loosely inserted on the inside of the bush 64, and the tip end portion of the worm shaft 29 protrudes from the axial end face (the right end face in FIGS. 2, 4 and 5) of the bush 64. On the axial intermediate portion of the bush 64, an inner ring 65 constituting the fourth ball bearing 37 is externally secured. Furthermore, one axial end face (the left end face in FIGS. 2, 4 and 5) of the inner ring 65 abuts against the inside face of an outwardly directed flange 67 provided on the other axial end portion (the left end portion in FIGS. 2, 4 and 5) of the bush 64, to thereby provide axial positioning of the inner ring 65. A small gap is provided between the inner peripheral face of the bush 64 and the outer peripheral face of the large diameter portion 63, so that it is possible to incline (radially displace) the worm shaft 29 with respect to the bush 64 within a predetermined range.

Figure 7:
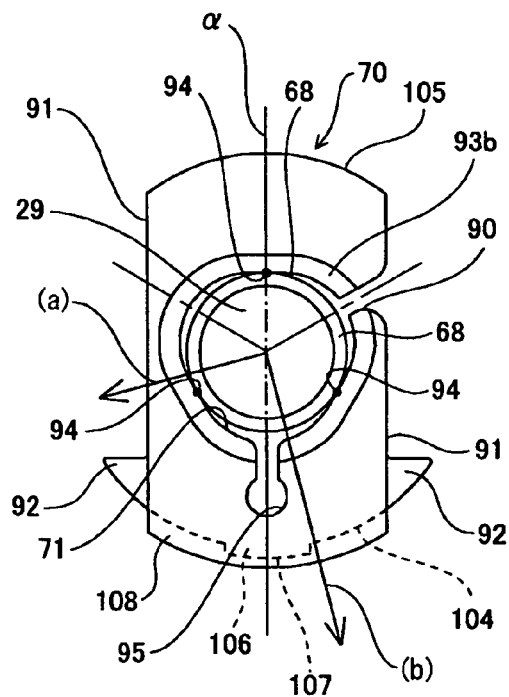
FIG. 7 shows a demounted combination of a pre-load pad and a worm shaft viewed from the tip end side of the worm shaft.
Figure 8:
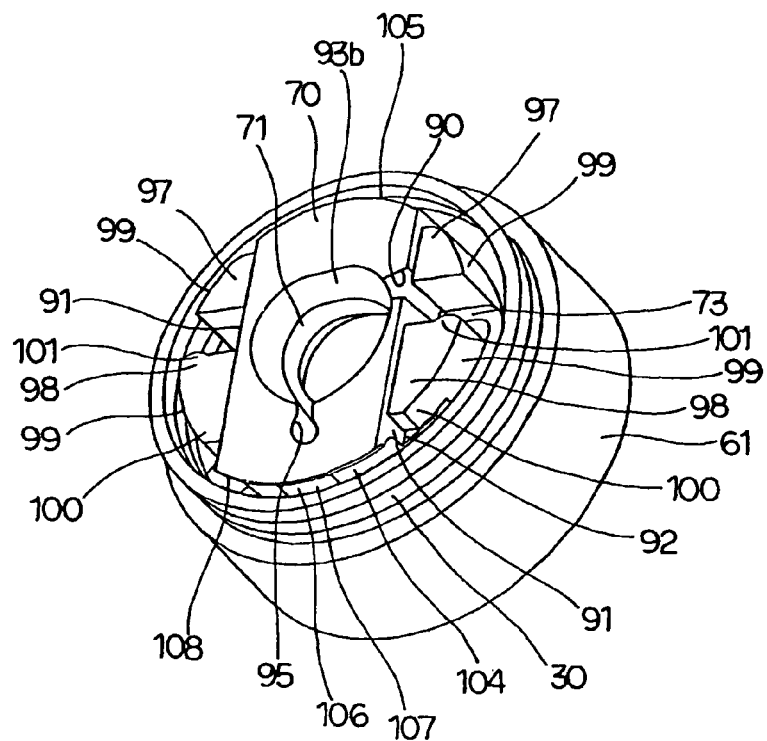
FIG. 8 is a perspective view of a demounted combination of a holder, the pre-load pad, and a torsion coil spring viewed from the right side of FIG. 5.
Figure 9:
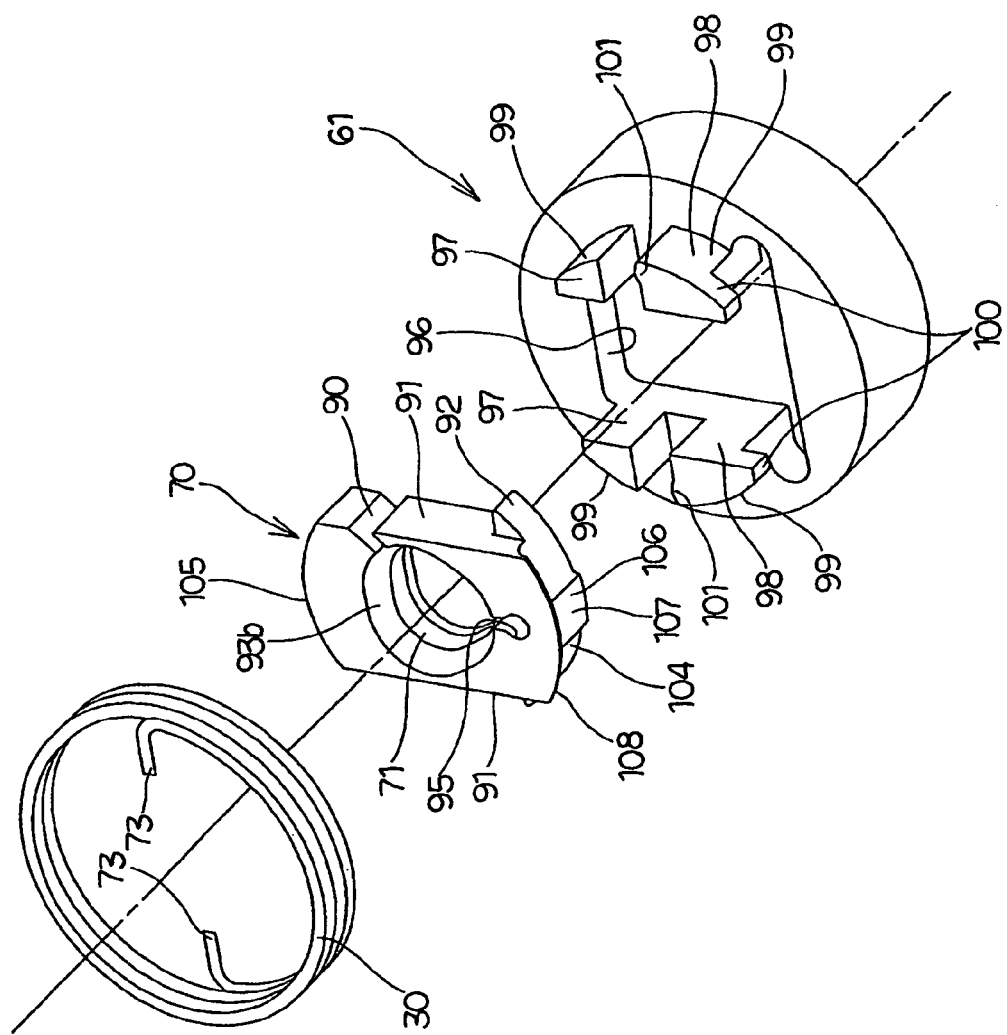
FIG. 9 is an exploded perspective view of FIG. 8.

A taper face 89 is provided between the large diameter portion 63 provided on the worm shaft 29 and a small diameter portion 68 provided on a portion further to the tip end side from the large diameter portion 63. Moreover, on a continuous portion between the small diameter portion 68 and the tip end face of the worm shaft 29 there is provided a taper face 109. Furthermore, the small diameter portion 68 is inserted without play in one part of a pre-load pad 70 which is positioned between the other end face (the right end face in FIGS. 2, 4 and 5) of the holder 61 secured to the gear housing 22, and the bottom face of a concavity 72 provided in the gear housing 22. The pre-load pad 70, as shown in detail in FIGS. 7 through 9 is made by injection molding a synthetic resin which is mixed with a solid lubricant, and forming into a notched cylindrical shape with one side part removed at each of two locations on diametrically opposite sides situated nearer the outer periphery. Furthermore, of planar portions 91 provided on the diametrically opposite sides in the radial direction of the outer peripheral face of the pre-load pad 70, arm portions 92 are provided on the portion to one side (the portion towards the back side in FIGS. 7 to 9) on one end portion in the lengthwise direction (the bottom end portion in FIGS. 7 to 9). The worm shaft 29 is freely inserted without play on the inside of a through hole 71 which is provided in a condition passing axially through the widthwise (left to right direction in FIGS. 6 to 9) central portion of the pre-load pad 70.

On both axial end portions of the through hole 71 is respectively provided taper faces 93a and 93b with diameters increasing towards the opening end. In a free condition, the cross-section shape of the inner peripheral face of the axial intermediate portion of the through hole 71 is shaped like an approximate equilateral triangle with the adjacent straight line portions respectively connected by a curve portion. Three locations equally spaced around the circumferential direction of the inner peripheral face of the intermediate portion of the through hole 71, which locate the intermediate portions of the straight line portions, are made contact portions 94 which elastically abut with the outer peripheral face of the small diameter portion 68 of the worm shaft 29. In the case of this example, the respective contact portions 94 exist at symmetric positions in relation to a virtual plane a (FIG. 7) which passes through the widthwise central portion containing the central axis of the pre-load pad 70. In a portion located on the opposite side of the central axis of the through hole 71 to the one contact portion 94 located on the widthwise central portion of the pre-load pad 70, a recess portion 95 is formed. By means of this construction, the rigidity of the portion corresponding to the recess portion 95 at one part around the circumferential direction of the pre-load pad 70 is reduced, so that this portion can be readily elastically deformed. Moreover, a discontinuous portion 90 which passes through both the inner and outer peripheral faces of the pre-load pad 70 is provided at a position on one side (the right side in FIGS. 7 to 9) off the virtual plane α.

On the other hand, on the outer peripheral face of the pre-load pad 70, is respectively provided a first portion cylindrical face 104 on a portion on the opposite side (the lower side in FIGS. 7 to 9) to the worm wheel 28, and a second portion cylindrical portion 105 concentric with the first portion cylindrical face 104 on a portion on the worm wheel 28 side (the upper side in FIGS. 7 to 9). A narrow protrusion 106 is provided on a circumferential intermediate portion of the first portion cylindrical face 104, and the tip end face of this protrusion 106 is made a third portion cylindrical face 107 concentric with the first portion cylindrical face 104. Furthermore, on the outer peripheral face of the pre-load pad 70 on one axial end portion (left end portion in FIG. 5, front end portion in FIGS. 7 to 9) on the opposite side to the holder 61, and on the opposite side portion to the worm wheel 28, is provided an engaging protrusion 108 which protrudes radially outwards.

Such a pre-load pad 70 is assembled as shown in detail in FIGS. 8 and 9 to the holder 61 which is freely and internally fixed into the gear housing 22 (FIGS. 2, and 4 to 6). On the other axial face (the front face in FIG. 9) of the holder 61 is formed first and second protrusions 97 and 98 in pairs giving a total of four, distributed at four locations on the surrounding portion of the opening of a through hole 96. The first protrusions 97 exist on the worm wheel 28 side (the upper side in FIGS. 2, 4 and 5), and the second protrusions 97 exist on the opposite side (lower side in FIGS. 2, 4 and 5) to the worm wheel. Moreover, on the outer diameter side face of each of the first and second protrusions 97 and 98 is respectively provided partially cylindrical face portions 99 which are mutually concentric. Towards the tip end portion of each of the second protrusions 98 is provided a first engaging protrusion 100 on the side face on the opposite side to the worm wheel 28.

The holder 61 and the pre-load pad 70 of the construction described above are assembled together, and a torsion coil spring 30 is provided surrounding these two members 61 and 70. That is to say, the pre-load pad 70 is positioned on the inside of the first and second protrusions 97 and 98 provided on the holder 61, and each of the arm portions 92 provided on the pre-load pad 70 are engaged with one side (the bottom side in FIGS. 8 and 9) of the respective second protrusions 98. One side face (the rear side face in FIGS. 8 and 9) of the first engaging protrusion 100 provided on each of the second protrusions 98, and each of the arm portions 92 are opposed via a small gap. While positioning a pair of engaging portions 73 provided at opposite end portions of the torsion coil spring 30 at two locations on diametrically opposite sides, between the mutually adjacent first and second protrusions 97 and 98 provided on one part of the holder 61, the main portion (the coil portion) of the torsion coil spring 30 is externally fitted around the outer diameter side side faces of the respective first and second protrusions 97 and 98 and the outer peripheral face of the pre-load pad 70. The engaging portions 73 of the torsion coil spring 30 are engaged with the other side face (the upper side face in FIGS. 6, 8 and 9) of the second protrusions 98 provided on the holder 61. By means of second engaging protruberances 101 provided on the tip end portions of the other side faces of the second protrusions 98, slipping-out of the respective engaging portions 73 is prevented. Moreover, the inner peripheral rim of the main portion of the torsion coil spring 30 is elastically pressed against the third portion cylindrical face 106 provided on the opposite side (the bottom side in FIGS. 2 and 4 to 9) to the worm wheel 28.

In the case of this example, the planar portions 91 provided on the pre-load pad 70, face the inner diameter side side faces of the first and second protrusions 97 and 98 provided on the holder 61, with a small gap therebetween. Due to this construction, the pre-load pad 70 is restricted from moving in relation to the widthwise direction (the front and rear direction in FIGS. 2, 4 and 5; the left and right direction in FIGS. 6 to 9) of the pre-load pad 70 by means of the inner diameter side side faces. In the case of this example, the inner diameter side side faces of the first and second protrusions 97 and 98 correspondence to the guide faces.

Then in a condition with the holder 61, the pre-load pad 70, and the torsion coil spring 30 assembled in this manner, the holder 61 is internally secured to one part of the gear housing 22. After securing the holder 61 to the gear housing 22, the small diameter portion 68 provided on the tip end portion of the worm shaft 29 is inserted into the through hole 71 provided in the pre-load pad 70. By means of this construction, an elastic force is applied to the tip end portion of the worm shaft 29, in a direction towards the worm wheel 28 (upwards in FIGS. 2, 4 and 5) from the torsion coil spring 30 via the pre-load pad 70. That is to say, in a condition before the tip end portion of the worm shaft 29 is inserted into the through hole 71 provided in the pre-load pad 70, the central axis of the through hole 71 is deviated to one side (the upper side in FIGS. 4 to 9) with respect to the central axis of the holder 61. Then, when the tip end portion of the worm shaft 29 is inserted into the inside of the through hole 71 provided in the pre-load pad 70, the diameter of the torsion coil spring 30 is elastically pressed and widened by means of the third portion cylindrical face 107 provided in the pre-load pad 70. Then, the torsion coil spring 30 tends to elastically return in the winding direction (the diameter is contracted), so that an elastic force is applied to the tip end portion of the worm shaft 29 from the torsion coil spring 30 in a direction towards the worm wheel 28 via the pre-load pad 70. Due to this construction, the distance between the central axis of the inner shaft 18 to which the worm wheel 28 is externally secured, and the worm shaft 29, is elastically contracted. As a result, the teeth faces of the worm 27 of the worm shaft 29 and the worm wheel 28 are abutted together in a pre-loaded condition.

Figure 6:
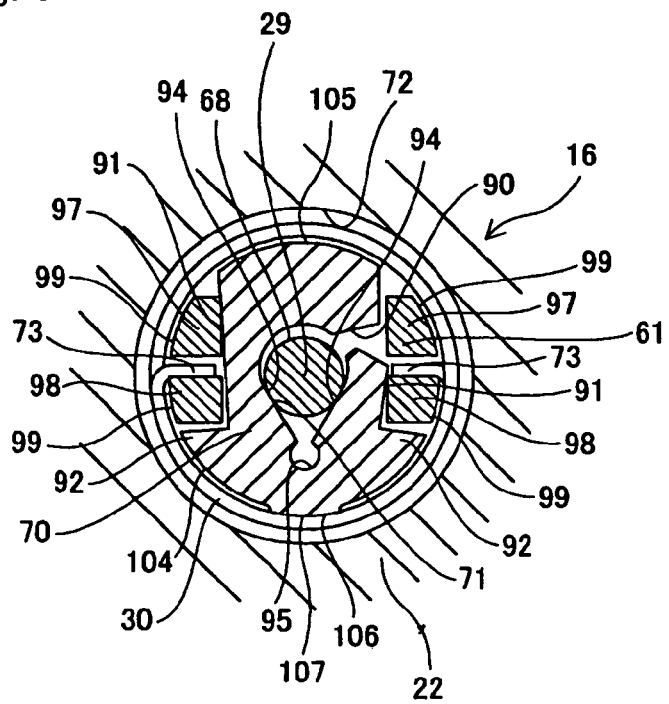
FIG. 6 is a cross-sectional view taken along the line B-B of FIG. 5.

Furthermore, based on the elastic force of the torsion coil spring 30, the tip end portion of the worm shaft 29 is moved to the recess portion 95 side on the inside of the through hole 71 provided in the pre-load pad 70, so that the pre-load pad 70 itself, as shown in FIG. 6, is elastically deformed so as to widen the space between the both side face portions of the pre-load pad 70 facing each other across the recess portion 95. Then, the planar portions 91 of the pre-load pad 70 are elastically expanded to give a turned V-shape, so that these planar faces 91 are elastically abutted with the inner diameter side side faces of the first and second protrusions 97 and 98 provided on the holder 61, and the gap between the planar faces 91 and the inner diameter side side faces is reduced.

In the case of this example, the portion of the outer peripheral face of the pre-load pad 70 abutting the inner peripheral rim of the torsion coil spring 30 is formed with a partial circular arc shape, and the length of the abutting portion is made sufficiently smaller than the length of one turn of the torsion coil spring 30. In a condition with the torsion coil spring 30 provided around the pre-load pad 70, a gap in the axial direction (intermediate space between wires) is provided between the surfaces facing each other of the adjacent wire elements for each of one return constituting the torsion coil spring 30. In the above manner, in the case of the worm reduction gear of this example and the electric power steering apparatus equipped with this, by means of the torsion coil spring 30, an elastic force in the direction towards the worm wheel 28 is applied to the tip end portion of the worm shaft 29 via the pre-load pad 70. Therefore, a pre-load can be applied to the meshing portion between the worm wheel 28 and the worm shaft 29 with a low cost construction, and the generation of the teeth hitting noise at the meshing portion can be suppressed. Furthermore, in the case of this example, by means of the inner diameter side side faces of the first and second protrusions 97 and 98 provided on the holder 61 secured to the gear housing 22, displacement in the widthwise direction of the pre-load pad 70 can be restricted. Moreover, based on the elastic force of the torsion coil spring 30, the tip end portion of the worm shaft 29 is displaced to the recess portion 95 side on the inside of the through hole 71 provided in the pre-load pad 70, so that the pre-load pad 70 itself is elastically deformed. Then, by elastically abutting the planar portions 91 of the pre-load pad 70 against the inner diameter side side faces, the gap between the planar portions 91 and the inner diameter side side faces is reduced. Consequently, at the time of driving the electric motor 31 (FIGS. 1 to 4), irrespective of the reaction force in the direction shown by arrows (a) and (b) in FIG. 7 applied from the worm wheel 28 to the worm shaft 29, the strong collision of the pre-load pad 70 with the inner diameter side side faces of the first and second protrusions 97 and 98 can be prevented, so that the generation of a grating abnormal noise (collision noise) can be suppressed. Furthermore, suppressing the occurrence of this abnormal noise, does not impair the aforementioned effect of suppressing the teeth hitting noise.

In the case of this example, since the pre-load pad 70 is made of synthetic resin, when the end portion of the worm shaft 29 is inserted into the inside of the through hole 71 provided in the pre-load pad 70, the pre-load pad 70 can be readily elastically deformed, and hence the insertion operation can be performed easily. Furthermore, in the case where the surfaces of the adjacent wire elements for each of one return constituting the torsion coil spring 30 are mutually contacted in the axial direction (constituting a tight coil spring), the occurrence of friction at the contacting portions becomes the cause of inappropriate changing of the elastic force applied to the worm shaft 29 by the torsion coil spring 30. To counter this, in the case of the present example, a gap in the axial direction is provided between the surfaces of the adjacent wire elements for each of one return of the torsion coil spring 30 (it is not a tight coil spring). Therefore a predetermined elastic force can be more stably applied to the worm shaft 29.

In the case of this example, the engaging protrusion 108 protruding to the outer diameter side is provided on the end portion outer peripheral face of the pre-load pad 70. Therefore the torsion coil spring 30 can be kept from falling off from the outer peripheral face of the pre-load pad 70, and displacement of the torsion coil spring 30 in relation to the axial direction of the pre-load pad 70 can be restrained.

EXAMPLE 2

Figure 10:
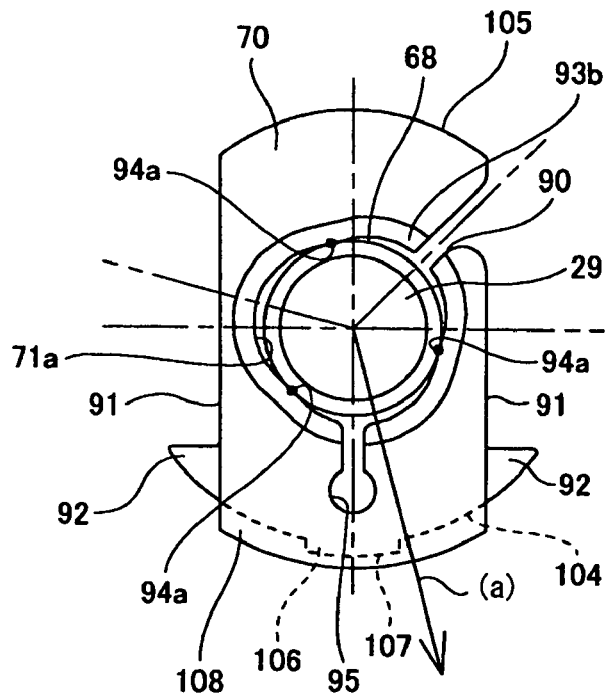
FIG. 10 is a view similar to FIG. 7 showing a second example of the present invention.

Next, FIG. 10 shows a second example of the present invention. In the case of this example, the position of contact portions 94*a* between an inner peripheral face of a through hole 71*a* provided in a pre-load pad 70, and an outer peripheral face of a small diameter portion 68 provided on the tip end portion of a worm shaft 29 is different to the case of the aforementioned first example. That is to say, in the case of this example, the contact portions 94*a* between the worm shaft 29 and the pre-load pad 70 are provided at three locations evenly spaced around the circumferential direction, being symmetric in relation to the direction of arrow (a) in FIG. 10 being the direction of action of the reaction force in a direction perpendicular to the central axis of the worm shaft 29, for a predetermined rotation direction of the worm wheel 28 where the reaction force applied from the worm wheel 28 (refer to FIGS. 4 and 5) to the worm shaft 29 tends to be large.

In the case of this example, at the time of driving the electric motor 31 (refer to FIGS. 1 to 3), when a reaction force in the direction of arrow (a) is applied from the worm wheel 28 to the worm shaft 29, the pre-load pad 70 can be elastically deformed with ease to open approximately evenly and widely to both sides with respect to the direction of arrow (a). Therefore, even in the case where a gap exists between the inner diameter side side faces of the first and second protrusions 97 and 98 (refer to FIGS. 6, 8 and 9) provided on the holder 61, and the planar portions 91 of the pre-load pad 70, the elastic deformation amount of the pre-load pad 70 can be made large, so that a large movement of the pre-load pad 70 to the arrow (a) side based on the reaction force applied to the worm shaft 29 can be prevented. Consequently, one part of the pre-load pad 70 being strongly abutted against the inner diameter side side face of the first and second protrusions 97 and 98 can be prevented, so that the impact force applied to the inner diameter side side faces from the pre-load pad 70 can be alleviated, and the occurrence of noise due to the pre-load pad 70 abutting against these inner diameter side side faces can be more effectively suppressed. Other construction and operation is the same as for the case of the first example, and hence the same parts are denoted by the same reference symbols and repeated description is omitted.

EXAMPLE 3

Figure 11:
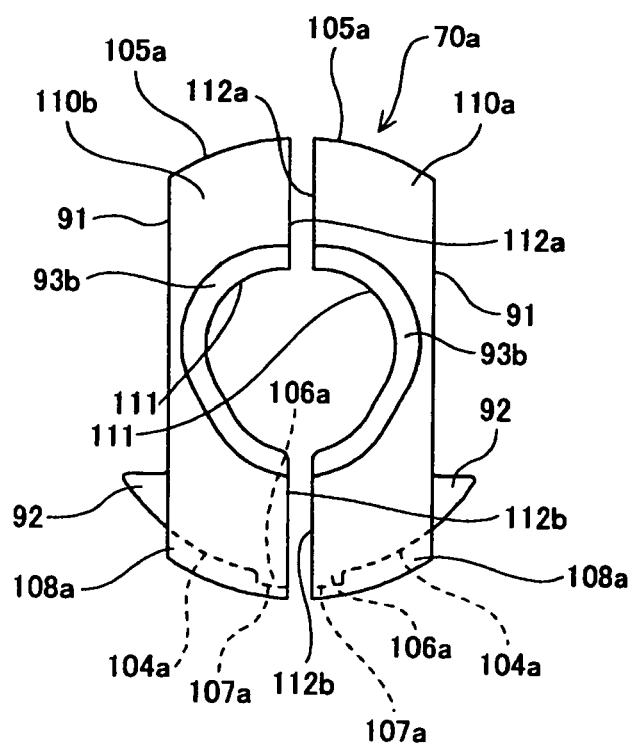
FIG. 11 shows a pre-load pad used in a third example of the present invention.
Figure 12:
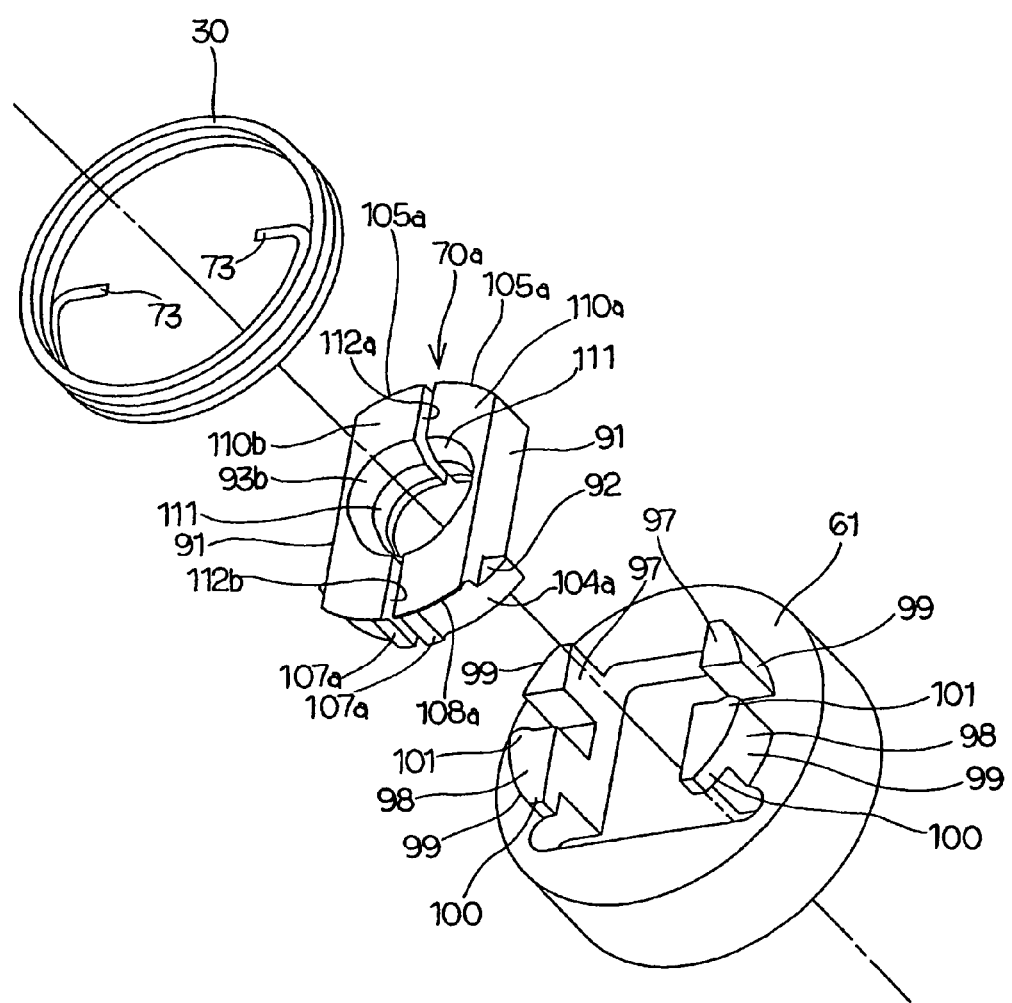
FIG. 12 is an exploded perspective view of the holder, pre-load pad, and torsion coil spring.

Next, FIGS. 11 and 12 show a third example of the present invention. In the case of this example, a pre-load pad 70*a* is constructed by assembling together two different elements 110*a* and 100*b*. These two elements 110*a* and 110*b* have the discontinuous portion 90 of the pre-load pad 70 which constitutes the construction of the first example shown in FIGS. 1 to 9, provided centrally in the widthwise direction, and have a shape obtained by cutting the pre-load pad 70 at a position on the opposite side to the discontinuous portion 90 in relation to the central axis of the through hole 71 (refer to FIG. 7). That is to say, each of the elements 110*a* and 110*b* are respectively provided with concave portions 111 of an approximately half cylindrical shape in an intermediate portion in the length direction (the up and down direction in FIGS. 11 and 12) of one side face facing each other, and planar portions 112*a* and 112*b* on portions at both ends in the length direction. Furthermore, on the other side faces being mutually opposite sides of these elements 110a and 110b are respectively provided planar sections 91 and arms 92. Furthermore, with these elements 110a and 110b assembled with the planar portions 112a and 112b provided on each of the side faces confronting each other, a through hole having the same shape as the through hole 71 provided in the pre-load pad 70 which constitutes the construction of the first example, is formed by means of the portions where the respective concave portions 111 face each other.

On the outer peripheral face of each of the elements 110a and 110b, is respectively provided a first portion cylindrical face 104a on the portion on the opposite side (the lower side in FIGS. 11 and 12) to the worm wheel 28 (refer to FIGS. 2, 4 and 5), and a second portion cylindrical face 105a of a circular arc shape concentric with the first portion cylindrical face 104a. Moreover, on end portions in the mutually facing widthwise direction of the respective first portion cylindrical faces 104a, is provided narrow protrusions 106a, and the tip end faces of these protrusions 106a are made third portion cylindrical faces 107a concentric with each of the first portion cylindrical faces 104a. Furthermore, on the outer peripheral face of each of the elements 110a and 110b, on one axial end portion 61 (front end portion in FIGS. 11 and 12), on the opposite side portion to the worm wheel 28, is provided engaging protrusions 108a which protrudes radially outwards.

These pair of elements 110a and 110b and the holder 61 of the construction described above are assembled together, and a torsion coil spring 30 is provided surrounding the respective members 110a, 110b and the holder 61. That is to say, the pair of elements 110a and 110b are positioned on the inside of the first and second protrusions 97 and 98 provided on the holder 61, and the arm portion 92 provided on the elements 110a and 110b are engaged with one side (the bottom side in FIG. 12) of the respective second protrusions 98. Moreover, one side face (the rear side face in FIG. 12) of the first engaging protrusion 100 provided on each of the second protrusions 98, and each of the arm portion 92 are opposed via a small gap.

With a pair of engaging portions 73 provided at opposite end portions of the torsion coil spring 30 at two locations on diametrically opposite sides, positioned between the mutually adjacent first and second protrusions 97 and 98 provided on one part of the holder 61, the main portion of the torsion coil spring 30 is externally fitted over the outer diameter side side faces of the respective first and second protrusions 97 and 98 and the outer peripheral face of the elements 110a and 110b. The engaging portions 73 of the torsion coil spring 30 are engaged with the other side face (the upper side face in FIG. 12) of the second protrusions 98 provided on the holder 61. Moreover, the inner peripheral rim of the main portion of the torsion coil spring 30 is elastically pressed against the third portion cylindrical faces 107a provided on the elements 110a and 110b.

In the case of this example, the planar portions 91 provided on each of the elements 110a and 110b, face the inner diameter side side faces of the first and second protrusions 97 and 98 provided on the holder 61, with a small gap therebetween. Due to this construction, the elements 110a and 110b are restricted from moving in relation to the widthwise direction (the left and right direction in FIGS. 11 and 12) of the elements 110a and 110b by means of the inner diameter side side faces.

Figure 2:
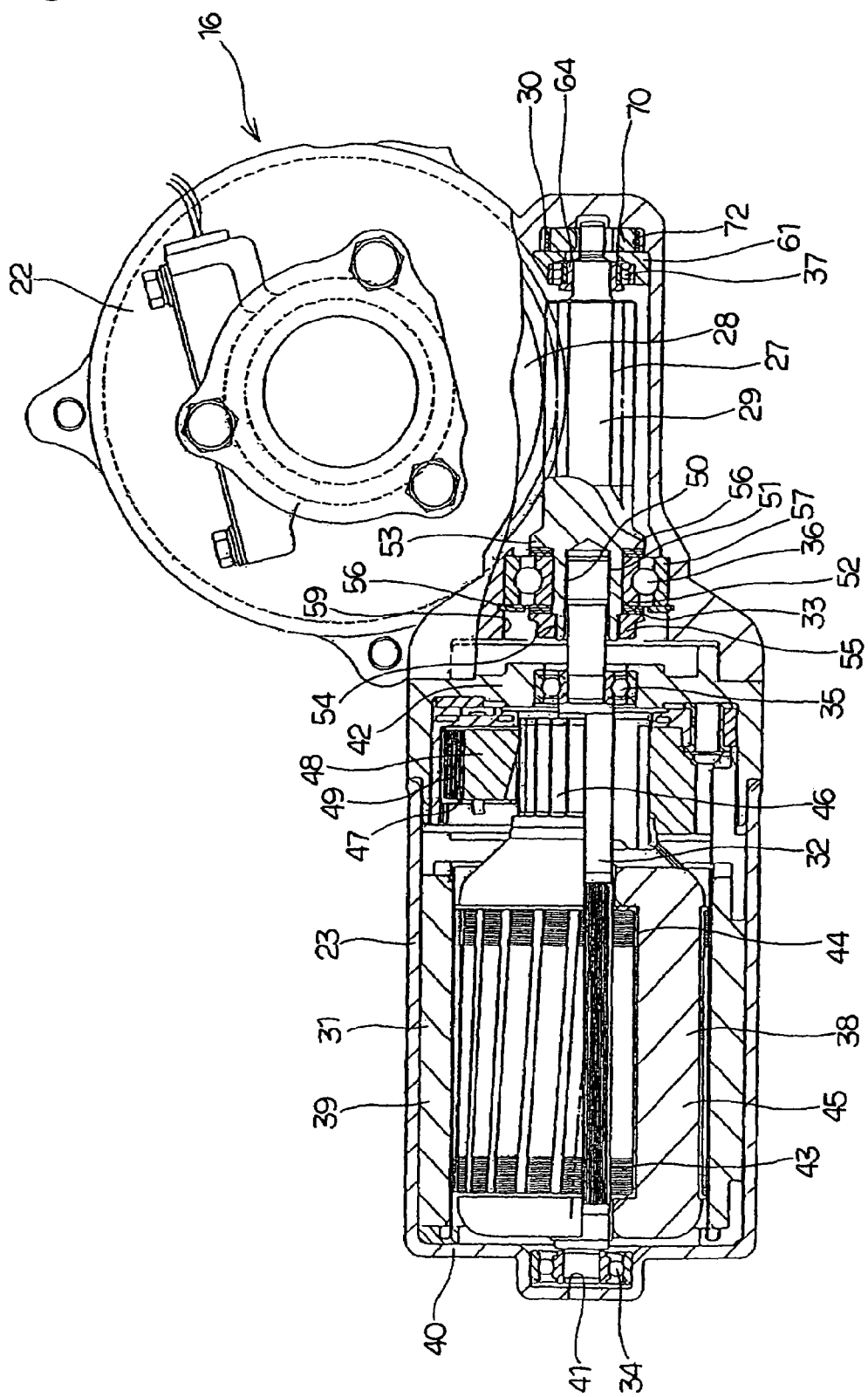
FIG. 2 is a cross-sectional view taken along the line A-A of FIG. 1 with some parts omitted.

Then in a condition with the holder 61, the elements 110a and 110b, and the torsion coil spring 30 assembled in this manner, the holder 61 is internally secured to one part of the gear housing 22 (refer to FIGS. 1 and 2). After securing the holder 61 to the gear housing 22, the small diameter portion 68 (refer to FIGS. 4 to 7) provided on the tip end portion of the worm shaft 29 is inserted into the through hole formed by assembling the concave portions 111 of the elements 110a and 110b. By means of this construction, an elastic force is applied to the tip end portion of the worm shaft 29, in a direction towards the worm wheel 28 from the torsion coil spring 30 via the elements 110a and 110b. Then the teeth faces of the worm 27 of the worm shaft 29 (refer to FIGS. 2, 4 and 5) and the worm wheel 28 are abutted in a pre-loaded condition.

Furthermore, based on the elastic force of the torsion coil spring 30, the tip end portion of the worm shaft 29 is displaced to the opposite side to the worm wheel 28 on the inside of the through hole 71, so that the planar portions 91 provided on the other side faces of the elements 110a and 110b are elastically expanded to give an inverted V-shape. Then by elastically abutting these planar faces 91 with the inner diameter side side faces of the first and second protrusions 97 and 98 provided on the holder 61, the gap between the planar faces 91 and the inner diameter side side faces is reduced.

In the case of this example also constructed as described above, at the time of driving the electric motor 31 (refer to FIGS. 1 to 3), irrespective of the reaction force applied from the worm wheel 28 to the worm shaft 29, the strong collision of the elements 110a and 110b with the inner diameter side side faces of the first and second protrusions 97 and 98 can be prevented, so that the generation of a grating abnormal noise (collision noise) can be suppressed. Other construction and operation is the same as for the case of the first example illustrated in FIGS. 1 to 9, and hence the same parts are denoted by the same reference symbols and repeated description is omitted.

EXAMPLE 4

Figure 13:
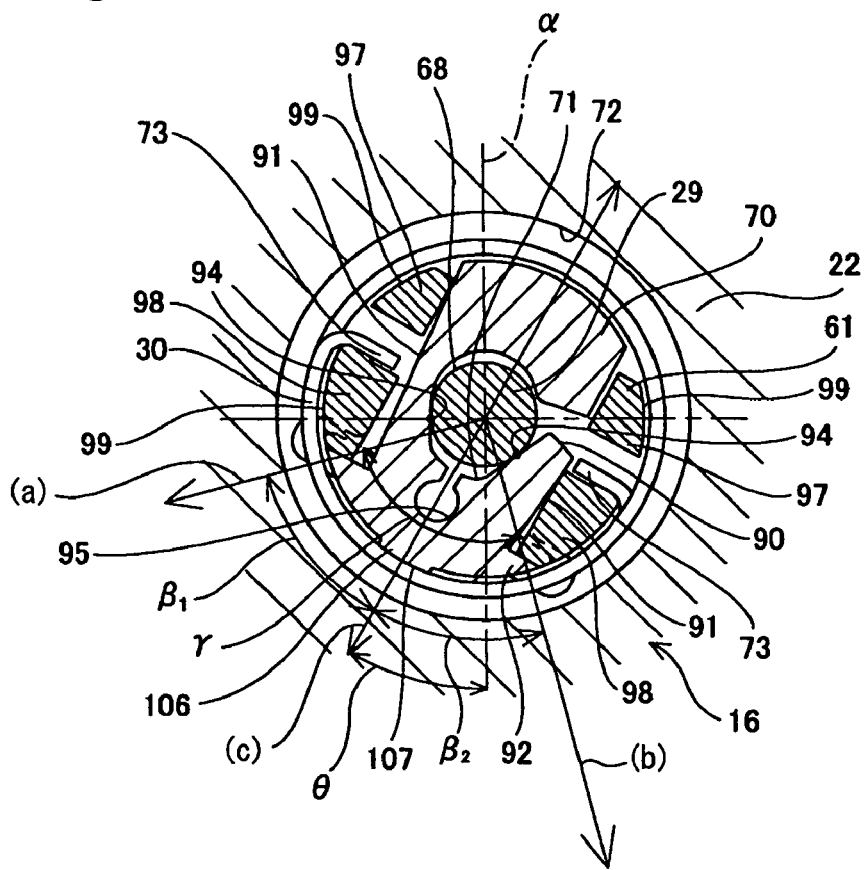
FIG. 13 is a view similar to FIG. 6, showing a fourth example of the present invention.
Figure 14:
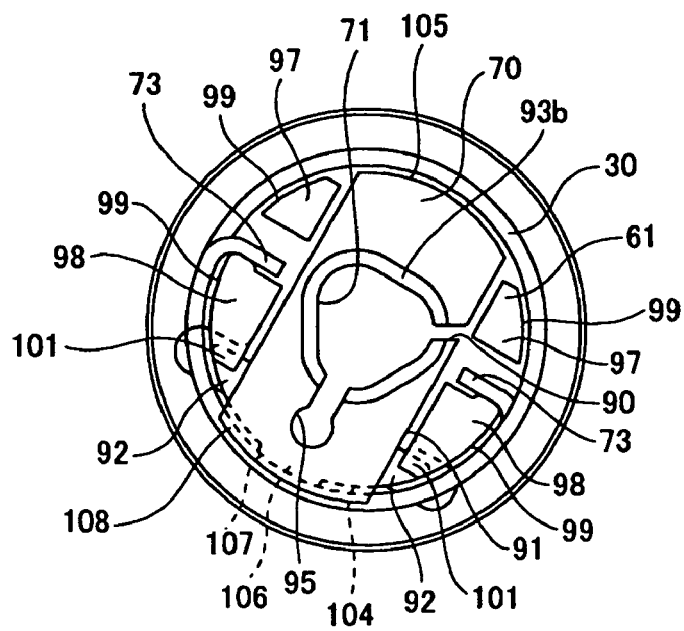
FIG. 14 shows a demounted combination of the holder, the pre-load pad, and the torsion coil spring used in the fourth example.

Next, FIGS. 13 and 14 show a fourth example of an example of the present invention. In the case of this example, the arrangement direction of the holder 61, the pre-load pad 70 and the torsion coil spring 30, in contrast to the case of example 1 illustrated in FIGS. 1 to 9, is displaced by an angle θ in FIG. 13. That is to say, the direction shown by the arrow (c) in FIG. 13 being the displacement direction of the pre-load pad 70 along the inner diameter side side face of the first and second protrusions 97 and 98 provided on the holder 61, is inclined at an angle θ with respect to a virtual plane α (FIG. 13) which contains the central axis of the worm shaft 29 and the meshing portion between the worm provided on the worm shaft 29 and the worm wheel 28 (refer to FIGS. 2, 4 and 5). In the case of this example, the angles $β_1$ and $β_2$ between the direction shown by the arrows (a) and (b) in FIG. 13, being the directions of the reaction force from the worm wheel 28 to the worm shaft 29 at the time of driving by the electric motor 31 (FIGS. 1 to 3) which differ depending on the rotation direction of the worm wheel 28, and the direction shown by the arrow (c) in FIG. 13 being the displacement direction of the pre-load pad 70 along the inner diameter side side face of the first and second protrusions 97 and 98, are approximately equal ($β_1 ≈ β_2$). In other words, an angle γ (FIG. 13) between the two directions shown by the arrows (a) and (b) is divided approximately in two by the direction shown by the arrow (c), being the displacement direction of the pre-load pad 70 along the inner diameter side side faces of the first and second protrusions 97 and 98.

In the case of this example constructed as described above, the difference in the elastic displacement amounts of the pre-load pad 70 based on the reaction forces in the directions of arrows (a) and (b) in FIG. 13 applied from the worm wheel 28 to the worm shaft 29 at the time of driving by the electric motor 31, due to the dissimilarity in these directions can be easily reduced. Therefore, even if a small gap exists between the planar portions 91 of the pre-load pad 70, and the inner diameter side side faces of the first and second protrusions 97 and 98 provided on the holder 61, differences in the impact force when the pre-load pad 70 abuts with these inner diameter side side faces, due to the abovementioned differences in directions, can also be readily reduced. Other construction and operation is the same as for the case of the first example illustrated in FIGS. 1 to 9, and hence the same parts are denoted by the same reference symbols and repeated description is omitted.

While omitted from the figures, different to the case of this example, in the construction of the aforementioned first example shown in FIGS. 1 to 9, if it is assumed that the drive force of the electric motor 31 is the same, then the magnitude of the reaction force applied from the worm wheel 28 to the worm shaft 29 is made approximately the same irrespective of the direction of this reaction force, so that the difference in the elastic displacement amount of the pre-load pad 70 based on this reaction force, due to the abovementioned differences in directions, can also be readily reduced. If such a construction is adopted, the angles between the directions of these reaction forces (the directions shown by arrows (a) and (b) in FIG. 7), and the virtual plane α (FIG. 7) which contains the central axis of the worm shaft 29 and the meshing portion between the worm provided on the worm shaft 29 and the worm wheel 28, are approximately equal. Therefore, different to the aforementioned case of the fourth example shown in FIGS. 13 and 14, the direction in which the pre-load pad 70 can be displaced along the inner diameter side side face of the first and second protrusions 97 and 98 provided on the holder 61 need not be inclined with respect to the virtual plane a connecting the central axis of the worm shaft 29 and the meshing portion. For example, in the aforementioned case shown in FIGS. 47 and 48, if the ratio $d_{29}/L_{29}$ of the distance $d_{29}$ in the radial direction of the worm shaft 29, between the meshing portion and the oscillating center o of the worm shaft 29, and the distance $L_{29}$ in the axial direction of the worm shaft 29, between the meshing portion and the oscillating center o, is sufficiently small, then the magnitude of Fr can be made sufficiently small. Therefore, irrespective of the direction of the reaction force applied from the worm wheel 28 to the worm shaft 29, the magnitude of these reaction forces can be made approximately equal. Consequently, with the construction of the first example shown in FIGS. 1 to 9, irrespective of the direction of the reaction force applied from the worm wheel 28 to the worm shaft 29, the magnitude of the reaction forces become approximately equal, so that differences in the impact force when the pre-load pad 70 abuts against the inner diameter side side face of the first and second protrusions 97 and 98, due to the differences in directions, can also be reduced. Contrary to this, by adopting the aforementioned construction shown in FIG. 13, then even if for miniaturization, the axial dimensions of the worm shaft 29 are shortened so that the aforementioned ratio $d_{29}/L_{29}$ becomes large, reduction of the impact force can be effectively performed irrespective of the direction of the reaction force.

In the case of the abovementioned examples, the pinion 11 secured to the end portion of the pinion shaft 10 (refer to FIGS. 1 and 46) and the rack 12 (refer to FIG. 46) are directly meshed with each other. However the present invention is not limited to such a construction. For example, the construction of the present examples may be assembled together with a so called Variable Gear Ratio Steering (VGS) mechanism wherein a pin provided on a bottom end portion of the pinion shaft is engaged in an elongate hole of a pinion gear provided on a different body to the pinion shaft so as to be free to move in the lengthwise direction of the elongate hole, and the pinion gear and the rack are meshed, so that the ratio of the displacement amount of the rack with respect to the rotation angle of the steering shaft is changed corresponding to speed.

Figure 15:
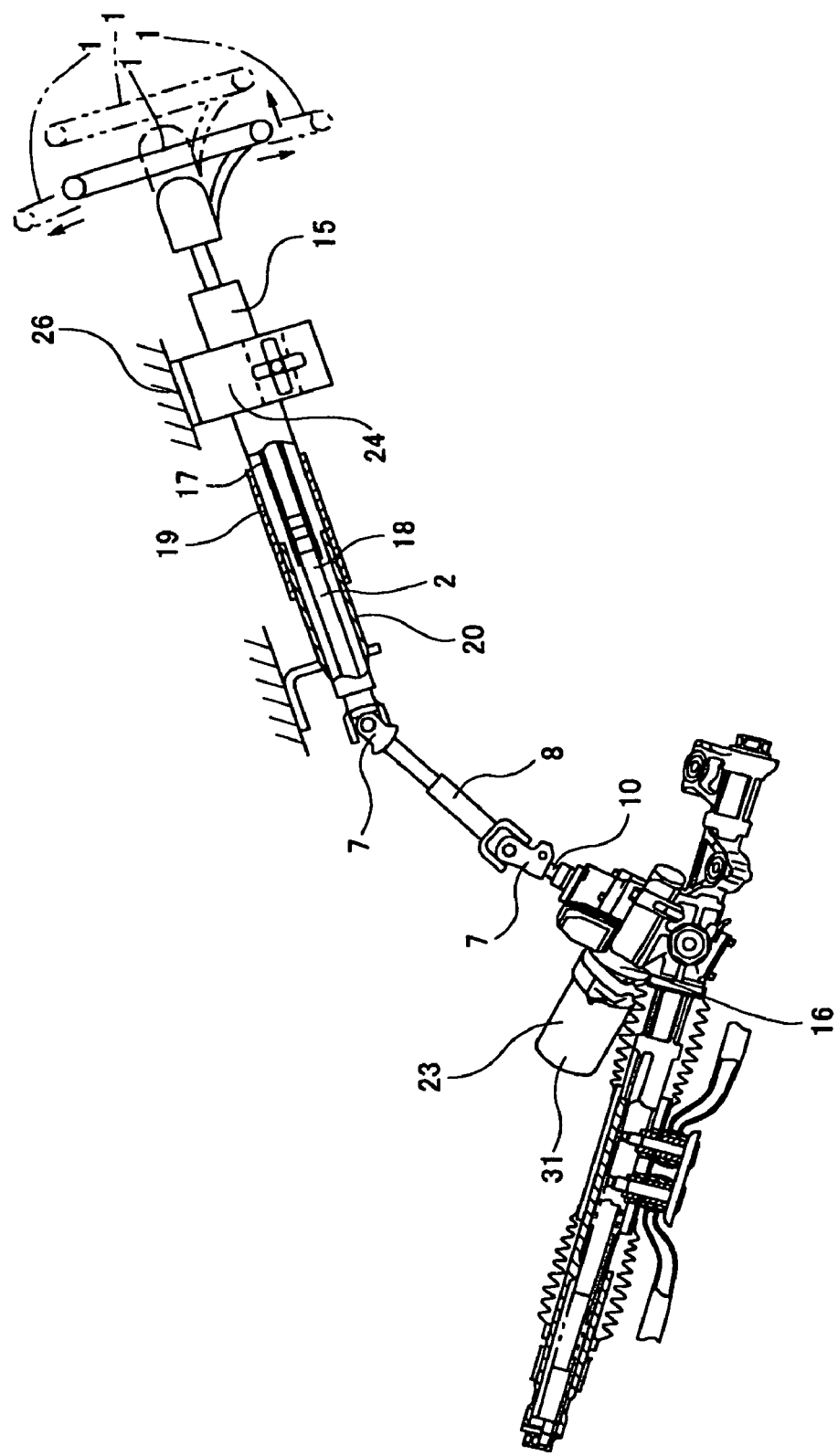
FIG. 15 shows an example of a construction where an electric motor and a worm reduction gear are provided in the vicinity of a pinion.

Moreover, the present invention is not limited to the construction where an electric motor is provided surrounding the steering shaft 2. For example, as shown in FIG. 15, a construction is possible where the electric motor 31 is provided on a portion in the vicinity of the pinion 11 (refer to FIG. 46) which is meshed with the rack 12. In the case of such a construction shown in FIG. 15, the worm wheel constituting the worm reduction gear 16 is secured to the pinion 11 or a part of a member supported on the pinion 11. In the case of such a construction shown in FIG. 15, a torque sensor 3 (refer to FIG. 46) may be provided not surrounding the steering shaft 2, but on a portion in the vicinity of the pinion 11.

Figure 16:
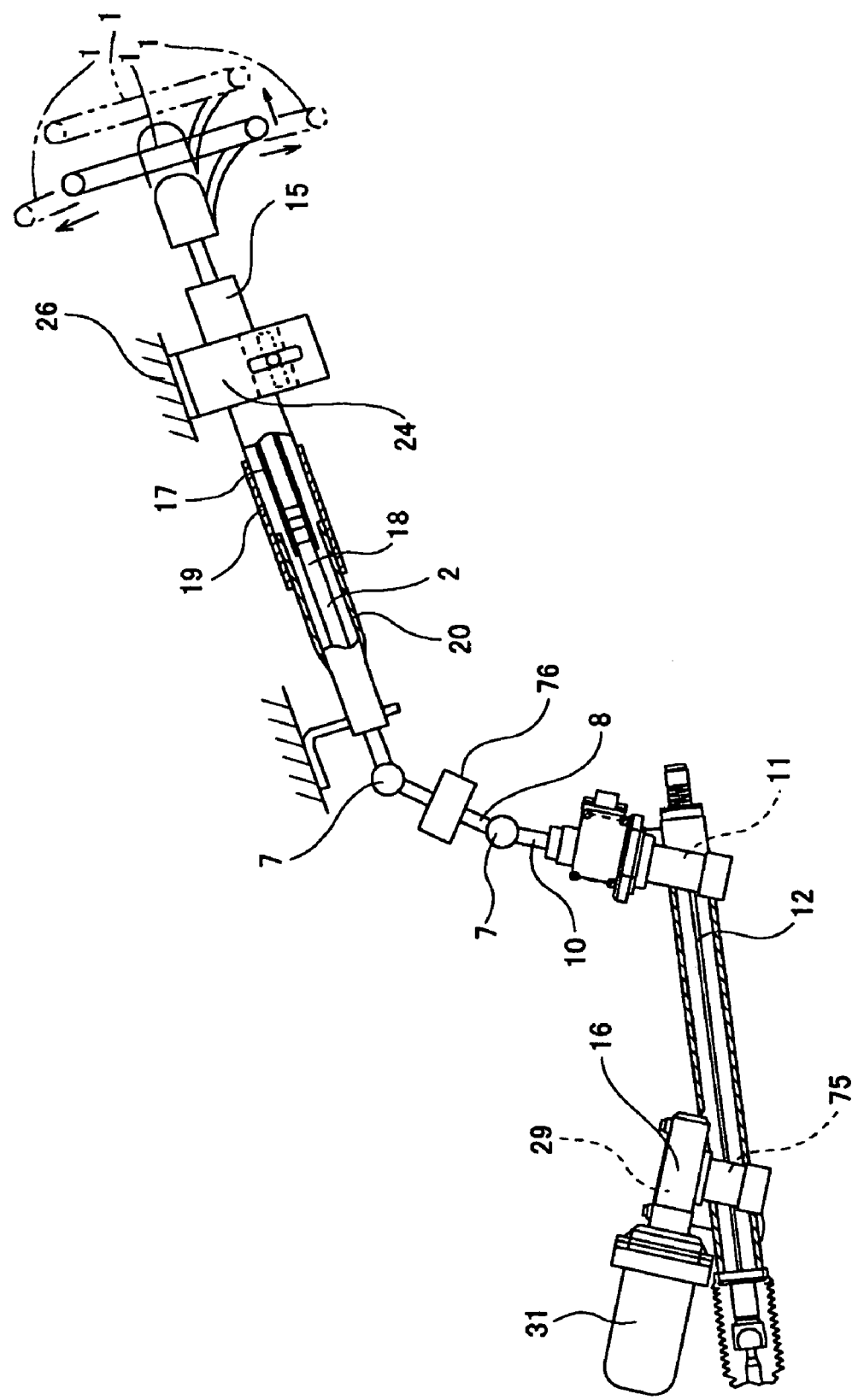
FIG. 16 shows an example of a construction where the electric motor and the worm reduction gear are provided in the vicinity of a sub pinion.

As shown in FIG. 16, the electric motor 31 can also be provided on a part of the rack 12 in the vicinity of a sub pinion 75 which is meshed at a position away from the engaging portion with the pinion 11. In the case of such a construction shown in FIG. 16, a worm wheel secured to the sub pinion 75 is meshed with the worm shaft 29. In the case of such a construction shown in FIG. 16 also, the torque sensor 3 (refer to FIG. 46) can be provided on a portion in the vicinity of the pinion 11. In the construction shown in FIG. 16, a shock absorber 76 is provided in an intermediate portion of the intermediate shaft 8 to prevent vibration which is transmitted from the ground by the vehicle wheels to the pinion 11, from being transmitted to the steering wheel 1. This shock absorber 76 is constructed for example by assembling the inner shaft and the outer shaft in telescopic form, and connecting an elastic member between the end peripheral faces of these two shafts.

In this way, the assist shaft of the present invention, may be any member of; the steering shaft, the pinion or a sub pinion which meshes with the rack at a position separated from the pinion.

Figure 3:
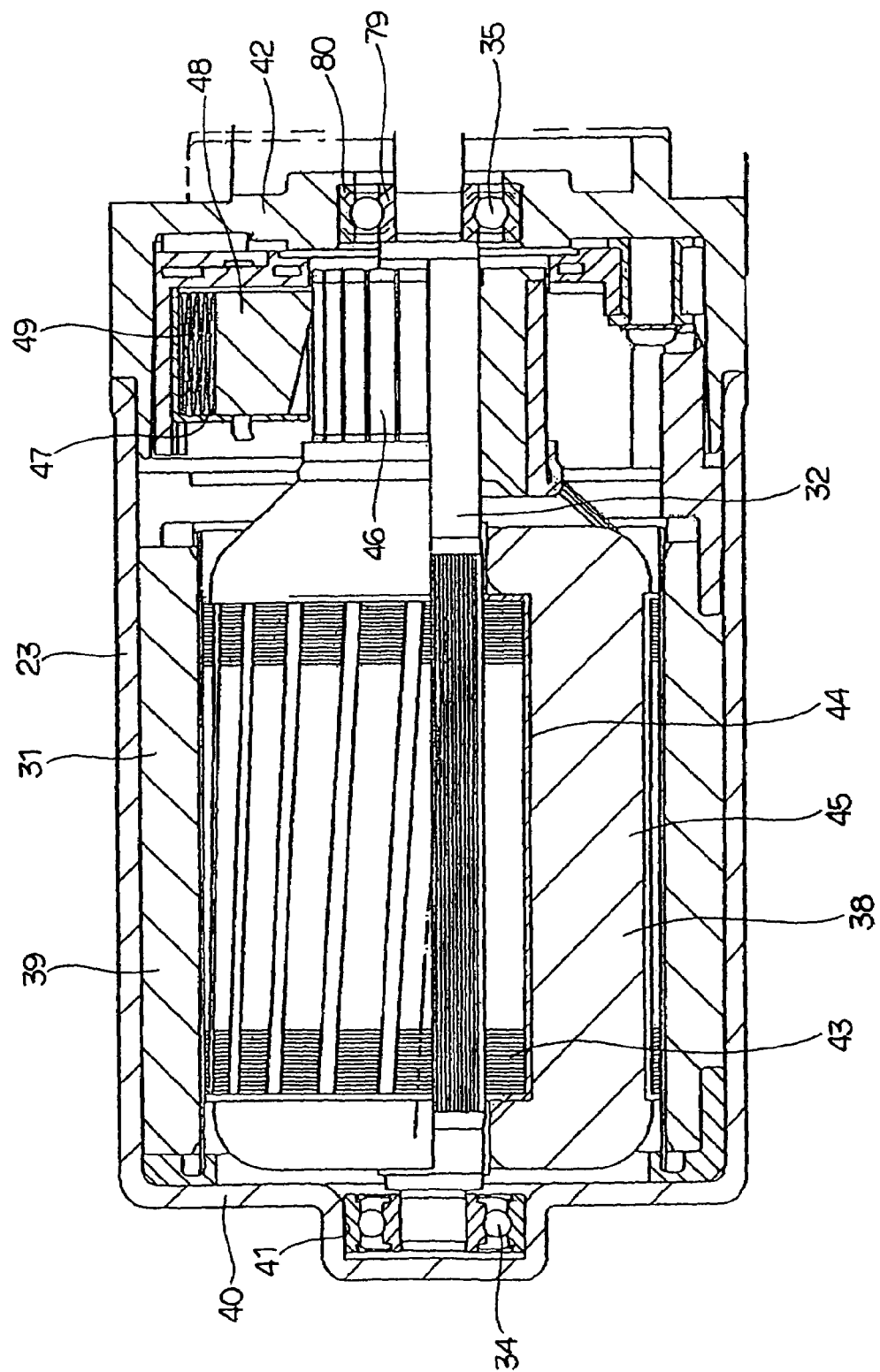
FIG. 3 is an enlarged cross-sectional view of the left half portion of FIG. 2.
Figure 4:
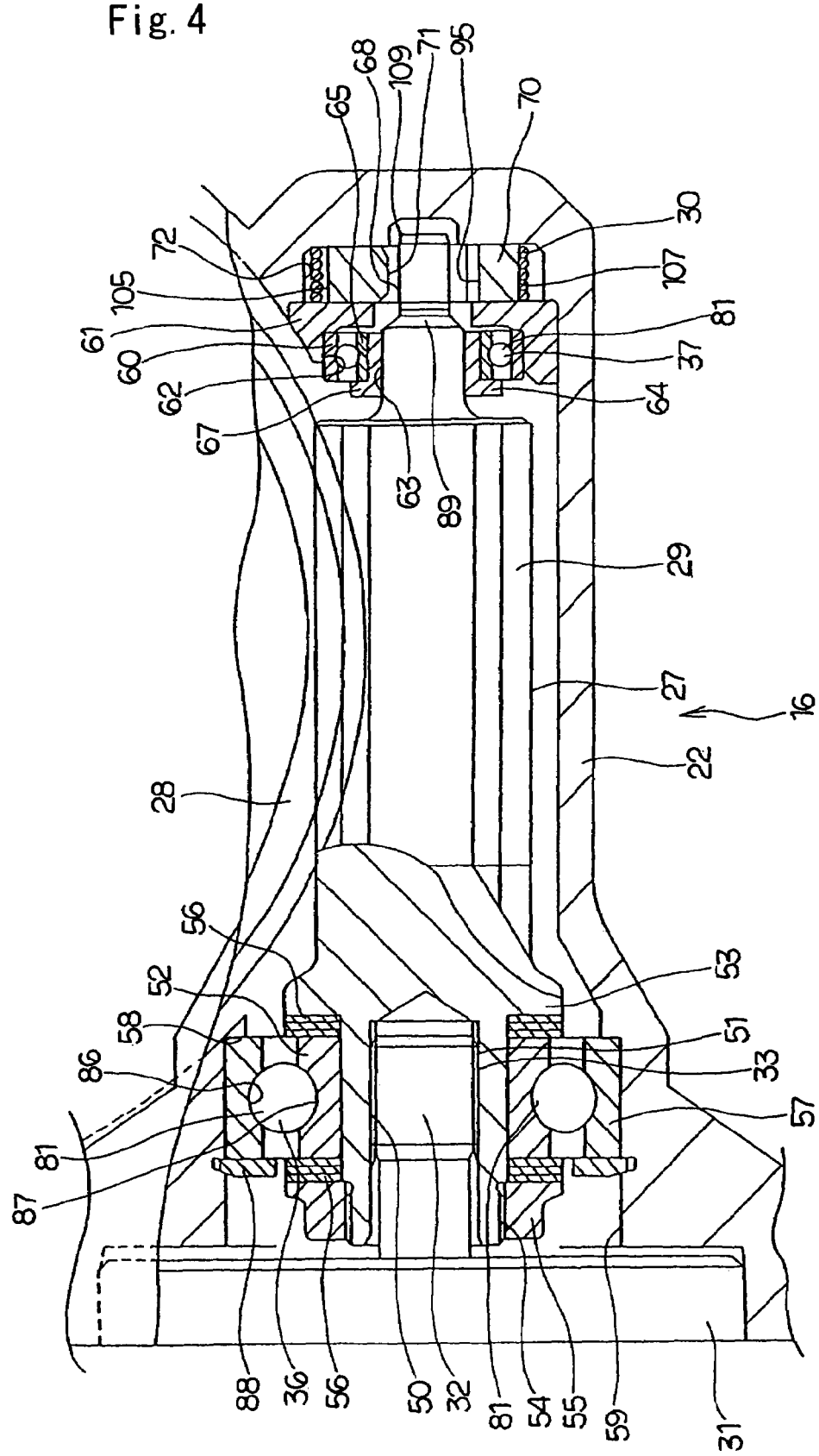
FIG. 4 is an enlarged cross-sectional view of the right half portion of FIG. 2.
Figure 5:
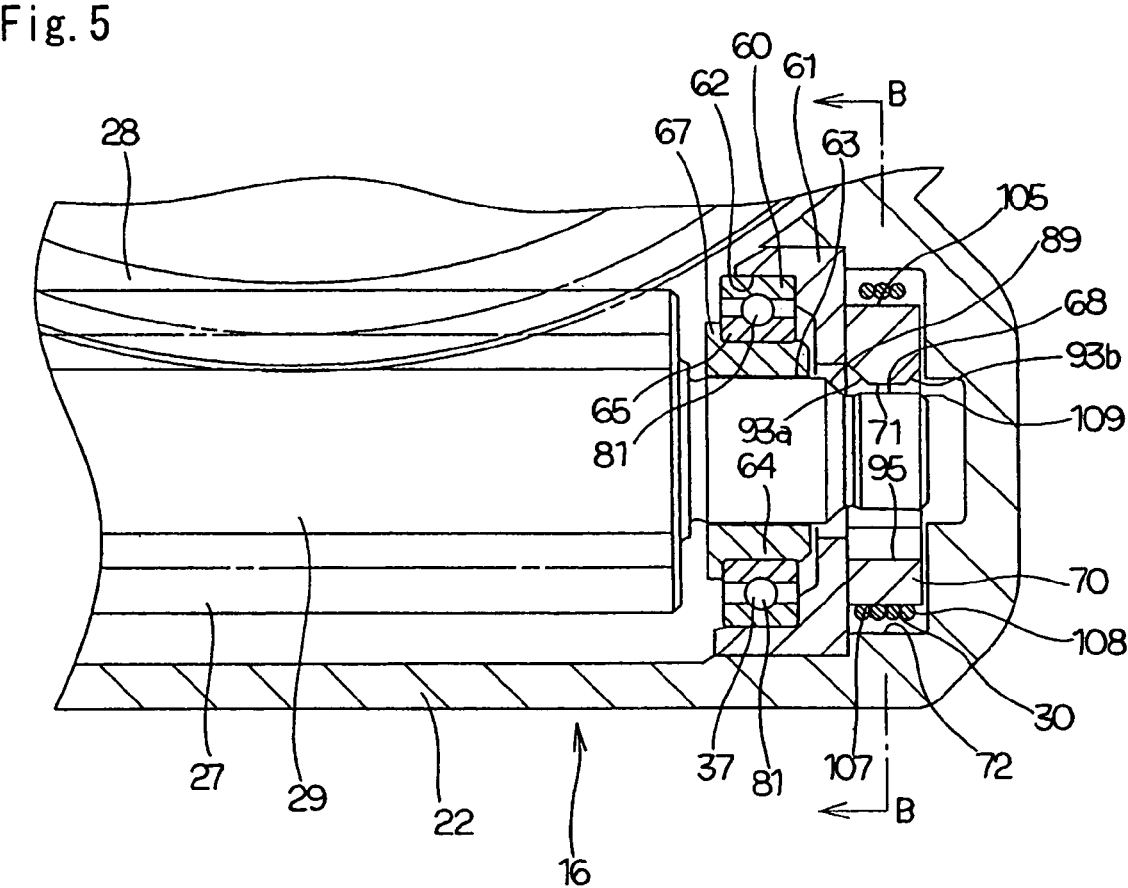
FIG. 5 is an enlarged cross-sectional view of the right half portion of FIG. 4.
Figure 17:
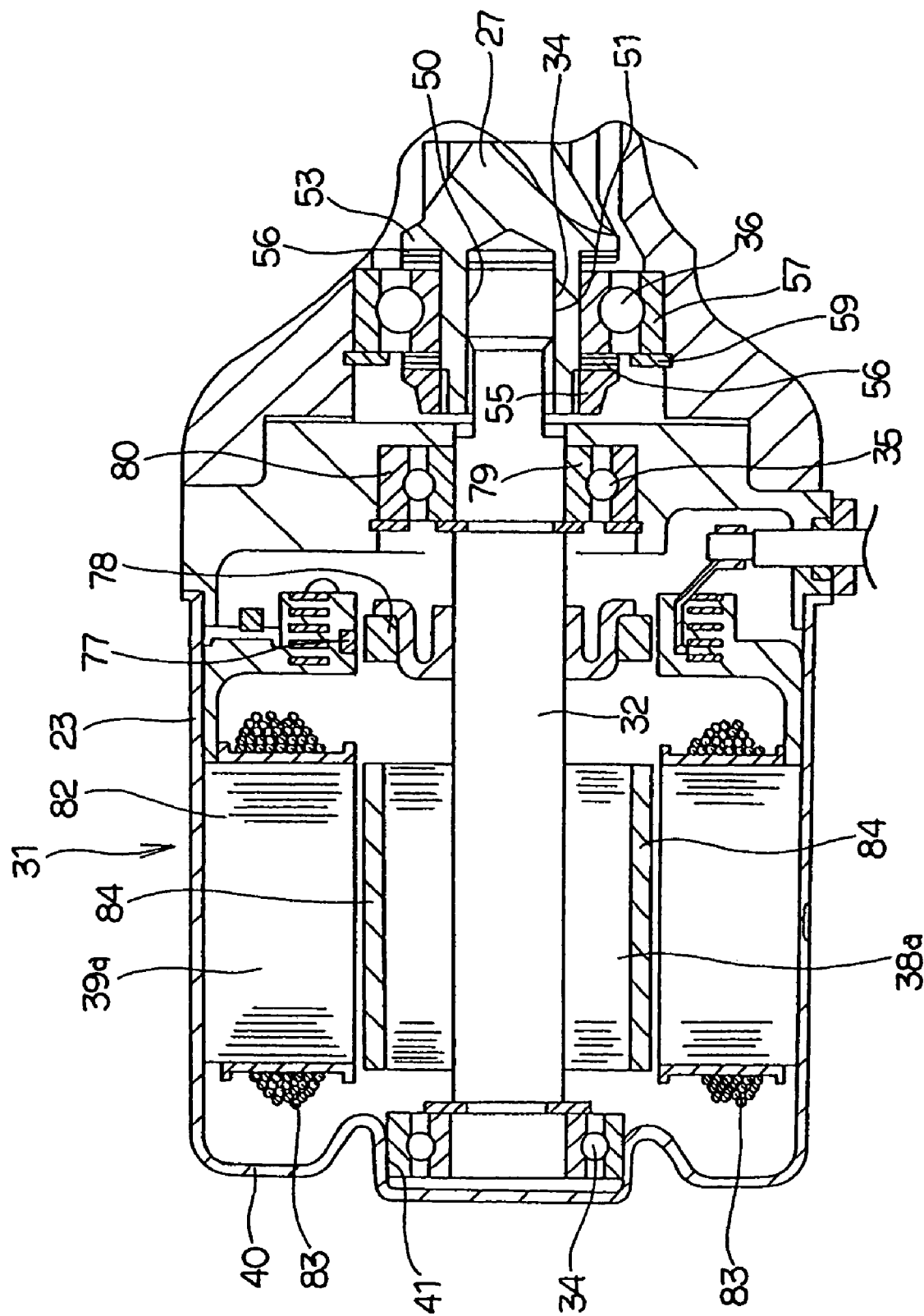
FIG. 17 is a view similar to FIG. 3, showing an example of an electric motor of a brushless construction.
Figure 18:
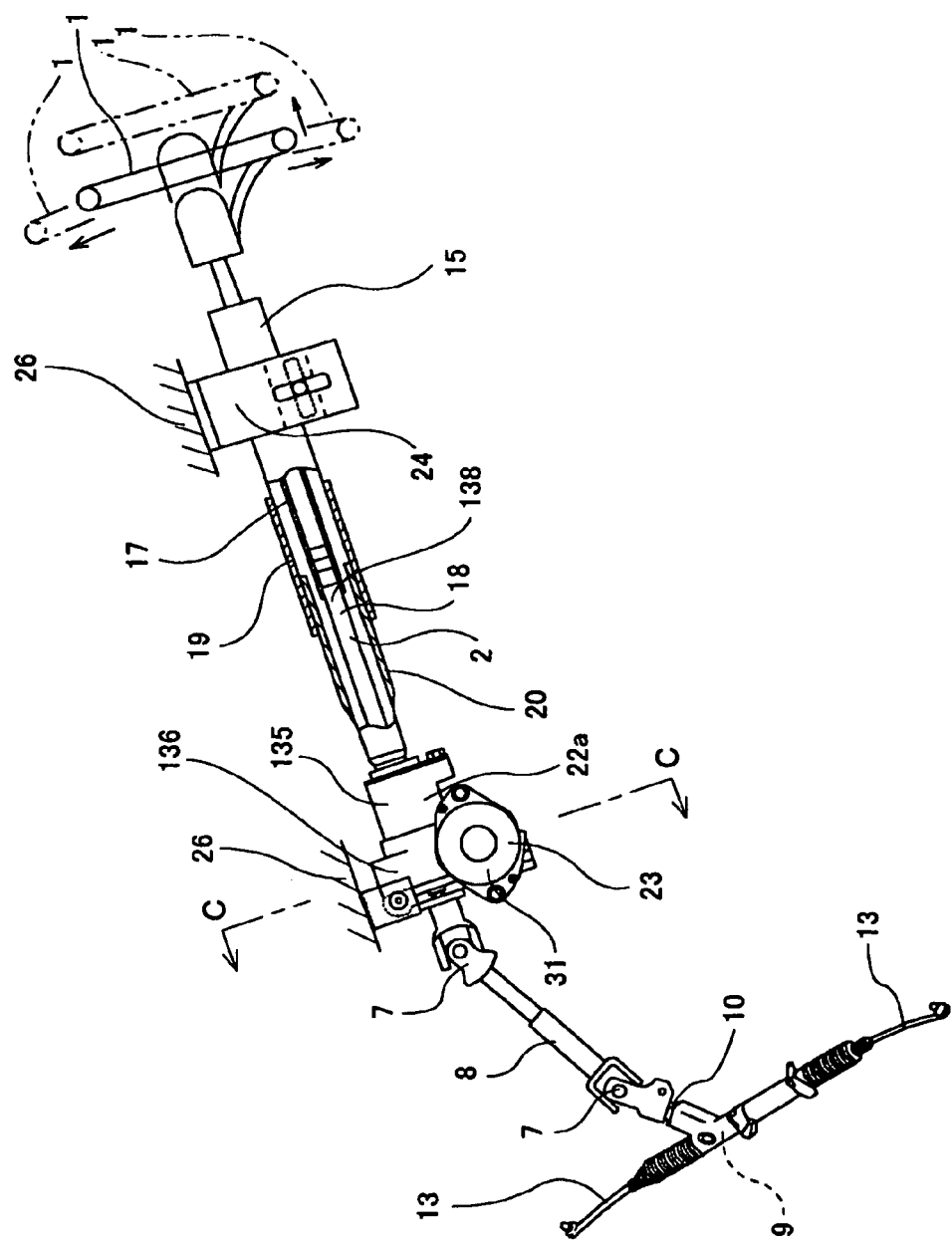
FIG. 18 shows a fifth example of the present invention partially sectioned.

Furthermore, in the case of the abovementioned respective examples, the rotor phase detector for switching the direction of the exciting current supplied to the coil 45, constituting the electric motor 31 is made from a brush 48 and a commutator 46 (refer to FIGS. 2 and 3). However, the present invention is not limited to such a construction, and as shown in FIG. 17, the rotor phase detector may be constructed from a Hall IC 77 and an encoder 78 of a permanent magnet type secured to the rotation shaft 32, and the electric motor 31 may be of a so called brushless construction. Moreover, in the case of the construction shown in FIG. 17, the stator 39a may be made up from a core 82 of a laminated steel plate type secured to the inner peripheral face of a case 23, and a coil 83 wound at a plurality of locations on the core 82, and the rotor 38a may comprise a permanent magnet 84 secured to an intermediate outer peripheral face of the rotation shaft 32. In the case where such a construction is adopted, the magnetism of the stator 39a can also be switched by providing a vector control unit for controlling an increase or decrease in the magnitude of the current flowing to the stator 39a.

In the case of the abovementioned examples, the description has been for where the worm reduction gear is assembled into an electric power steering apparatus. However the worm reduction gear of the present invention is not limited to one employed for such a use, and for example can also be used in combination with an electric linear actuator assembled into various types of mechanical equipment such as an electric bed, an electric table, an electric chair, a lifter and so on. For example, in the case where the worm reduction gear is assembled into this electric linear actuator, the rotation of the electric motor is reduced by the worm reduction gear, and then taken out to the rotation shaft, and an output shaft provided surrounding this rotation shaft is extended and contracted via a ball screw. The present invention can also be applied to a worm reduction gear assembled into such an electric linear actuator.

The worm reduction gear and the electric power steering apparatus of the present invention is constructed and operated as described above. Therefore in a construction where an elastic force is applied to the worm shaft constituting the worm reduction gear, with an elastic member via a separate member, to suppress the generation of the teeth hitting noise in the worm reduction gear, the generation of an abnormal noise due to collision of this separate member with parts which restrict the displacement of this separate member can be suppressed.

EXAMPLE 5

FIGS. 18 to 24 show a fifth example of the present invention. The electric power steering apparatus of this example comprises: a steering shaft 2 which is secured at a rear end portion to a steering wheel 1; a steering column 15 through which the steering shaft 2 passes freely; a worm reduction gear 16a for applying a supplementary torque to the steering shaft 2; a pinion 11 (refer to FIG. 46) provided on the front end portion of the steering shaft 2; a rack 12 (refer to FIG. 46) which is meshed with the pinion 11 or with a member supported on the pinion 11; a torque sensor 3 (refer to FIG. 46); an electric motor 31; and a controller 6 (refer to FIG. 46).

The steering shaft 2 is made by assembling an outer shaft 17 and an inner shaft 18 by a spline connecting section so as to freely transmit a rotation force, and enable axial movement. Moreover, in the case of this example, the front end portion of the outer shaft 17 and the rear end portion of the inner shaft 18 are spline-connected, and connected via synthetic resin. Consequently, for the outer shaft 17 and the inner shaft 18, at the time of a collision this synthetic resin is broken so that the total length can be shortened.

Furthermore, the cylindrical steering column 15 through which the steering shaft 2 passes, is made by assembling an outer column 19 and an inner column 20 in telescopic form, so that in the case where an axial impact is applied, the energy due to this impact is absorbed and the total length shortened, giving a so called collapsible construction. Moreover the front end portion of the inner column 20 is securely connected to the rear end face of a main body 135 which together with a cover 136 constitutes a gear housing 22a. The gear housing 22a is made up by connecting the cover 136 to the front end portion of the main body 135 with bolts or the like (not shown in the figure). The inner shaft 18 passes through the inside of the gear housing 22a, and the front end of the inner shaft 18 protrudes from the front end face of the cover 136.

Regarding the steering column 15, the intermediate portion is supported by a support bracket 24 on one part of a car body 26 such as the lower face of the dash board. Furthermore, between the support bracket 24 and the car body 26 there is provided an engaging section (not shown in the figure) so that in the case where the support bracket 24 is subjected to an impact in the forward direction, the support bracket 24 comes away from the engaging section. The upper end portion of the gear housing 22a also is supported on one part of the car body 26. By providing a tilt mechanism and a telescopic mechanism, adjustment of the front and rear position and the height position of the steering wheel 1 can be freely made. Such a tilt mechanism and telescopic mechanism is heretofore known, and are not a characteristic part of this example, and hence detailed description is omitted.

Figure 19:
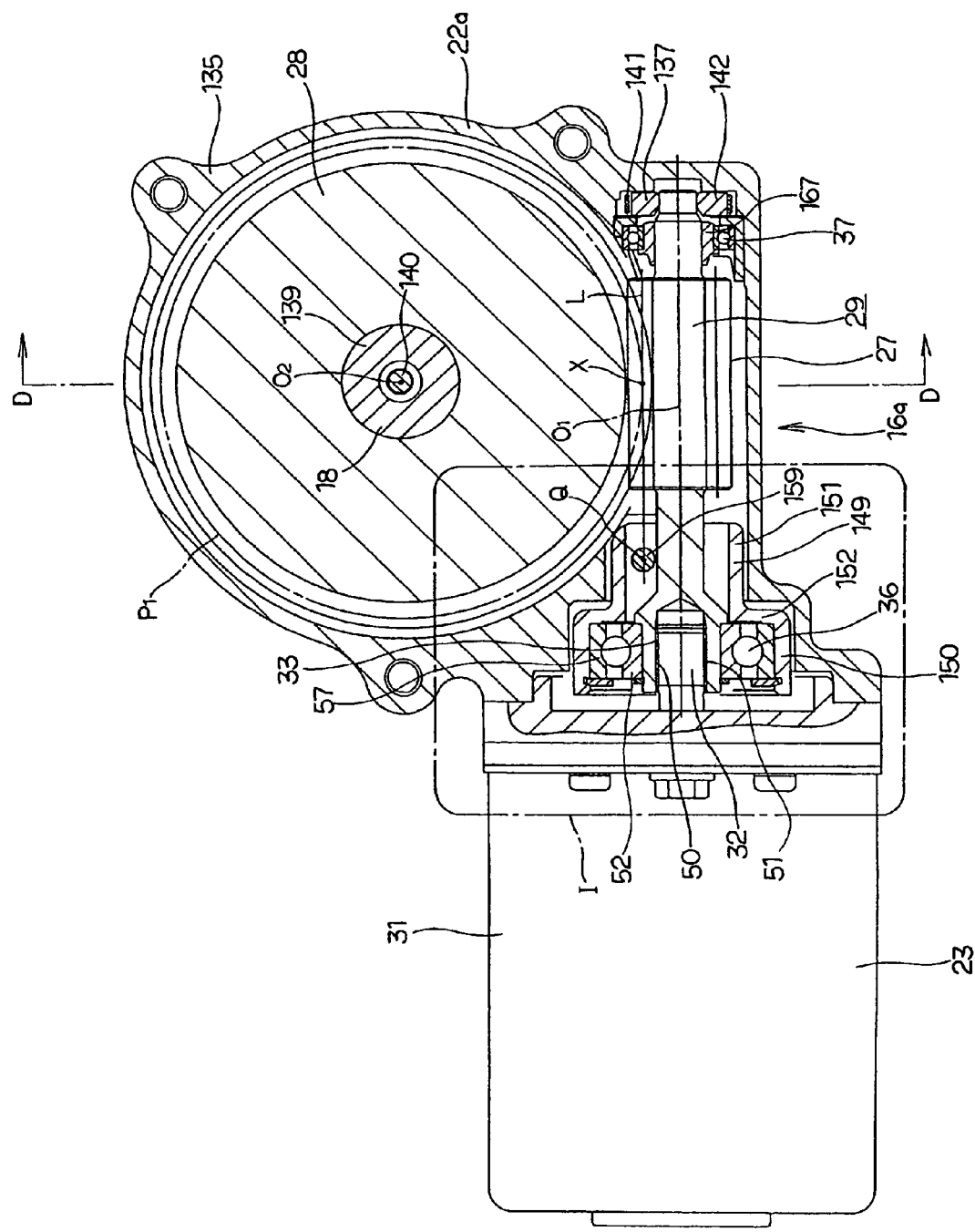
FIG. 19 is a fragmentary cross-sectional view taken along the line C-C of FIG. 18.
Figure 20:
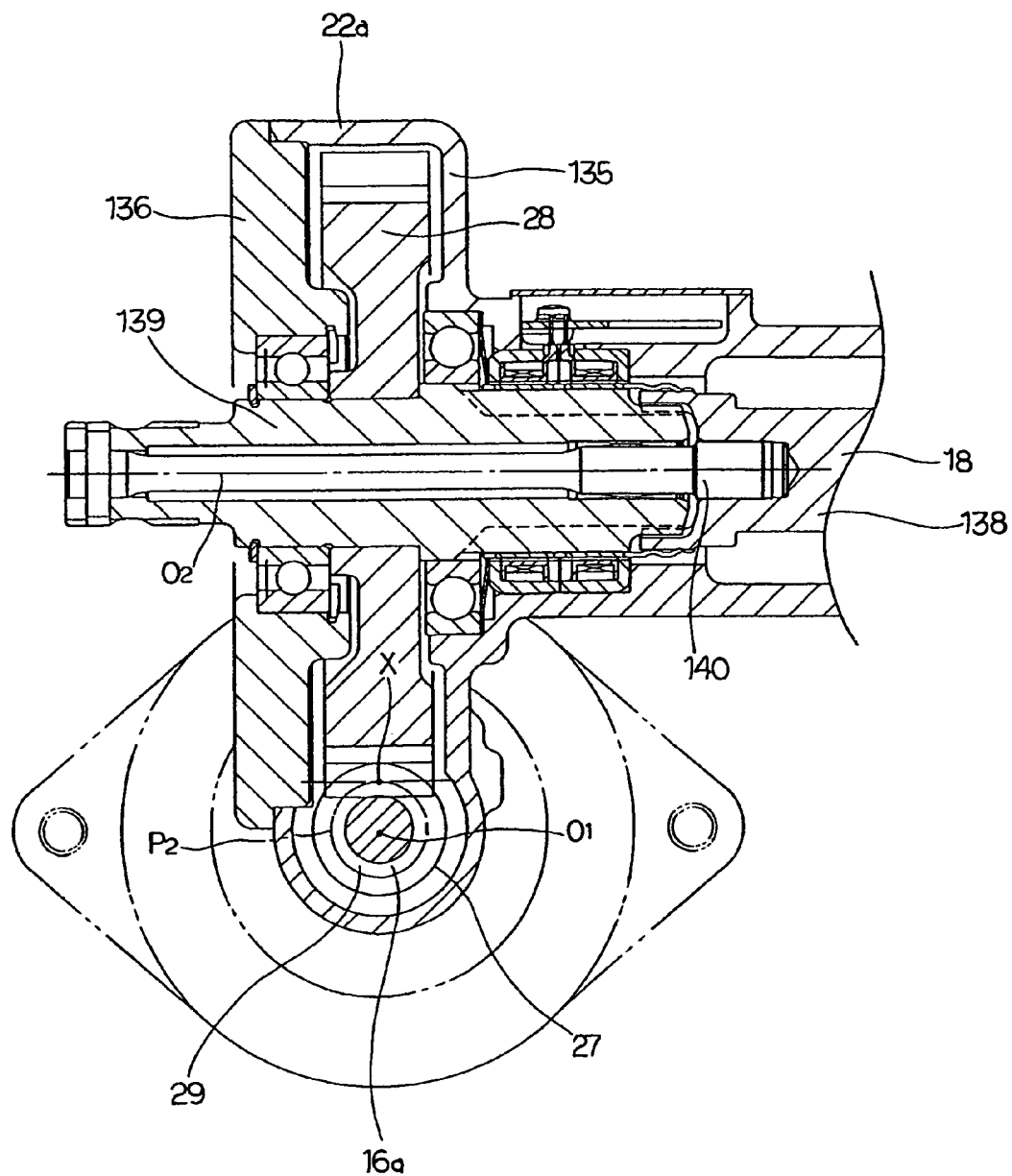
FIG. 20 is a cross-sectional view taken along the line D-D of FIG. 19.
Figure 21:
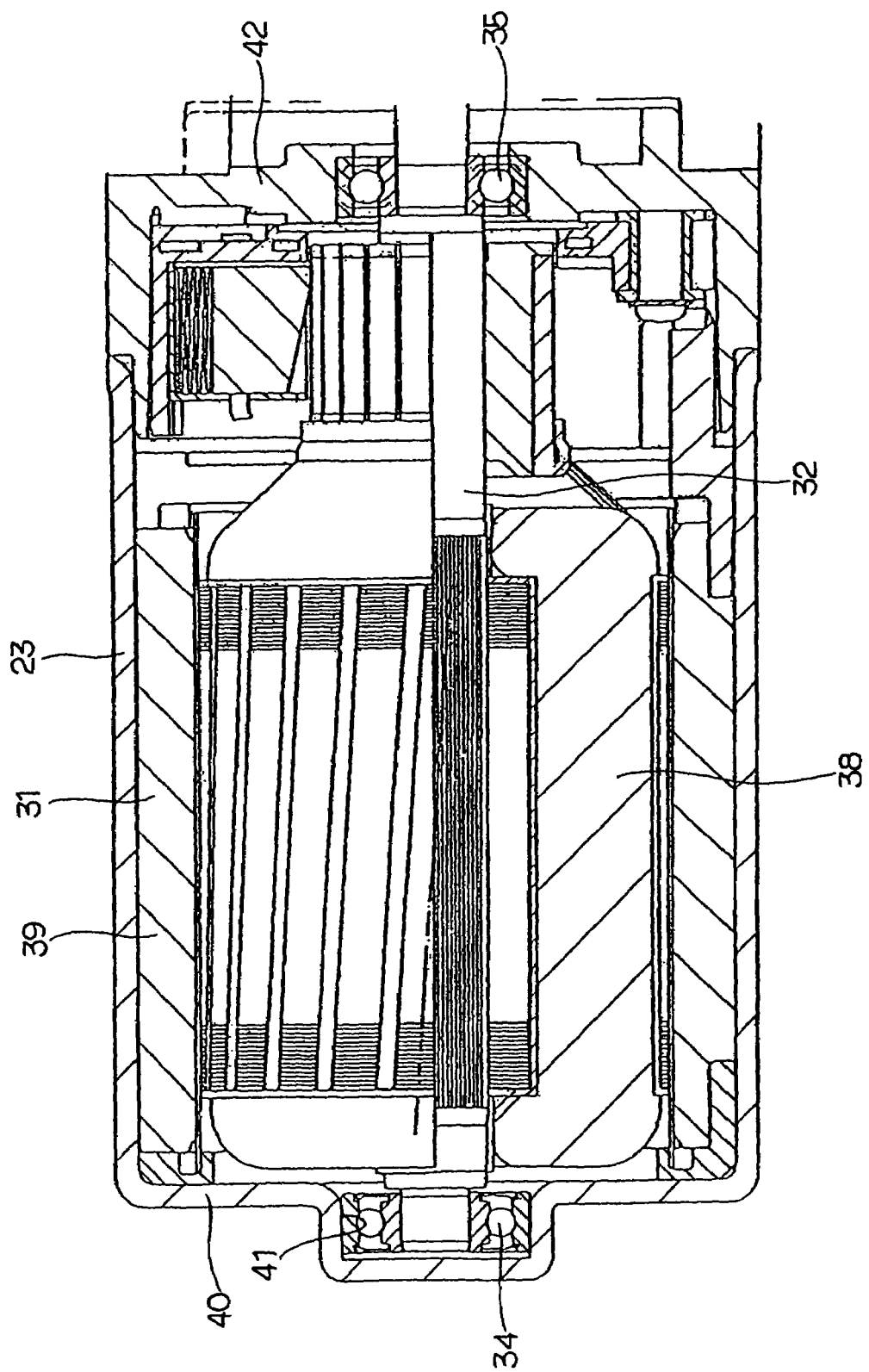
FIG. 21 is a cross-sectional view of the electric motor.
Figure 22:
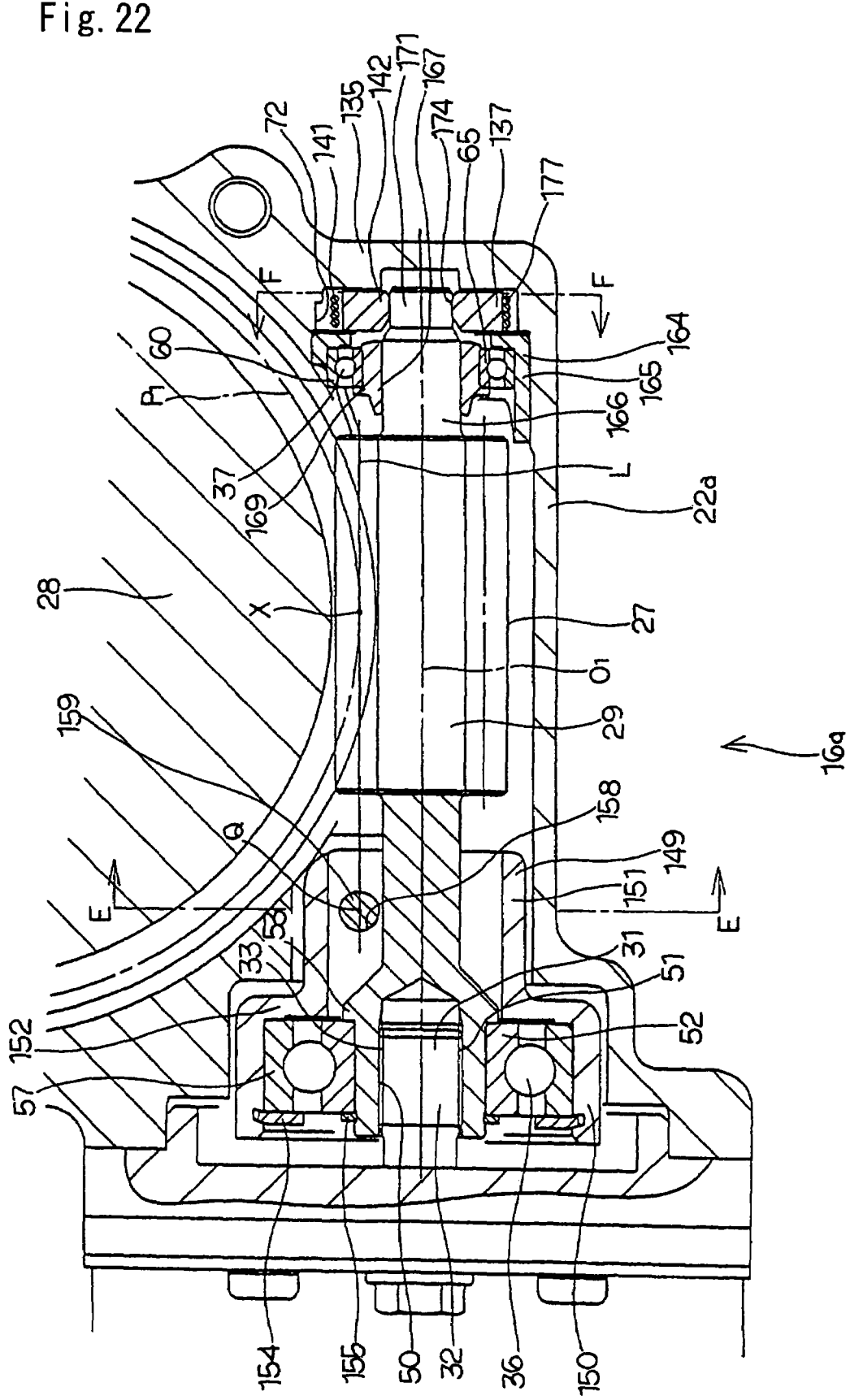
FIG. 22 is an enlarged fragmental view of FIG. 19.

The inner shaft 18 is constructed by connecting a first inner shaft 138 and a second inner shaft 139 by means of a torsion bar 140 (FIGS. 19 and 20). The torsion bar 140 is inserted inside of the second inner shaft 139, and the rear end portion of the torsion bar 140 (the right end in FIG. 20) is connected to the front end portion (the left end in FIG. 20) of the first inner shaft 138, and the front end portion (the left in FIG. 20) of the torsion bar 140 is connected to the front end portion (the left end in FIG. 20) of the second inner shaft 139. The torque sensor 3 detects the direction and magnitude of a torque applied from the steering wheel 1 to the steering shaft 2, from the relative rotation direction and relative rotation amount of the first and second inner shafts 138 and 139, based on twisting of the torsion bar 140, and a signal (detection signal) representing the detection value is sent to the controller 6. Then, the controller 6 sends a drive signal to the electric motor 31 corresponding to the detection signal, to generate an assist torque in a predetermined direction and of a predetermined magnitude.

At the front end portion of the second inner shaft 139, the part which protrudes from the front end face of the cover 136 constituting the gear housing 22a is connected to the rear end portion of an intermediate shaft 8 (FIG. 18) via a universal joint 7. Furthermore, the front end portion of the intermediate shaft 8 is connected to an input shaft 10 (FIG. 18) of a steering gear 9 via another universal joint 7. The pinion 11 is connected to the input shaft 10. Furthermore, the rack 12 is meshed with the pinion 11. In order to prevent vibration applied to the intermediate shaft 8 from the ground via the wheels, from being transmitted to the steering wheel 1, a vibration absorber may be provided in each of the universal joints 7.

The worm reduction gear 16a comprises a worm wheel 28 which can be externally secured freely to one part of the second inner shaft 39, a worm shaft 29, and an elestic force applying device 137. The elestic force applying device 137 comprises a torsion coil spring 141 and a pre-load pad 70.

Moreover, the worm wheel 28 and the worm shaft 29 are provided on the inside of the gear housing 22a, and the worm wheel 28 and a worm 27 provided on an intermediate portion of the worm shaft 29 are meshed together. The electric motor 31 comprises: a case 23 which is securely connected to the gear housing 22a, a stator 39 (FIG. 21) of a permanent magnet type which is provided on the inner peripheral face of the case 23, a rotation shaft 32 provided on the inside of the case 23, and a rotor 38 (FIG. 21) provided on the intermediate portion of the rotation shaft 32 in a condition facing the stator 39.

Between the inner peripheral face of a concavity 41 provided in the central portion of a bottom plate 40 constituting the case 23, and the outer peripheral face of the base end portion of the rotation shaft 32 is provided a first ball bearing 34, which rotatably supports the base end portion (left end portion in FIGS. 19 and 21) of the rotation shaft 32 with respect to the case 23. Between an inner peripheral edge of a partition 42 provided on the inner peripheral face of an intermediate portion of the case 23, and the outer peripheral face of an intermediate portion of the rotation shaft 32 is provided a second ball bearing 35, which rotatably supports the intermediate portion of the rotation shaft 32 with respect to the partition 42.

Furthermore, by means of a spline engaging section 33 which is made up by spline engagement of a female spline 50 provided in the inner peripheral face of the base end portion (left end portion in FIGS. 19 and 22) of the worm shaft 29, and a male spline 51 provided on the tip end portion of the rotation shaft 32 of the electric motor 31, the end portion pairs of the two shafts 29 and 32 are connected. Due to this construction, the worm shaft 29 rotates together with the rotation shaft 32.

A bearing holder 149 is provided inside the gear housing 22a, and the worm shaft 19 is rotatably supported in the bearing holder 149. In the bearing holder 149, a large diameter cylindrical portion 150 and a small diameter cylindrical portion 151 are connected by an circular ring portion 152. Moreover, an outer ring 57 constituting a third ball bearing 36 is internally fitted inside the large diameter cylindrical portion 150. One axial end face (the right end face in FIGS. 19 and 22) of the outer ring 57 is abutted against one face (the left side face in FIGS. 19 and 22) of the circular ring portion 152, and the other axial end face (the left end face in FIGS. 19 and 22) of the outer ring 57 is held by a lock ring 154 which is engaged in an inner peripheral face of the large diameter cylindrical portion 150. Moreover, an inner ring 52 constituting the third ball bearing 36 is externally fitted on the outer peripheral face of the base end portion of the worm shaft 29, to a portion corresponding to the spline connection section 33 in relation to the axial direction. Furthermore, one axial end face (the right end face in FIGS. 19 and 22) of the inner ring 52 is abutted against the side face of a flange 53 provided on the outer peripheral face of the base end portion of the worm shaft 29, and the other axial end face (the left end face in FIGS. 19 and 22) of the inner ring 52 is clamped by means of a lock ring 155 which is engaged in the base end inner peripheral face of the worm shaft 29. For the third ball bearing 36, preferably a ball bearing of the four point contact type is used.

Figure 23:
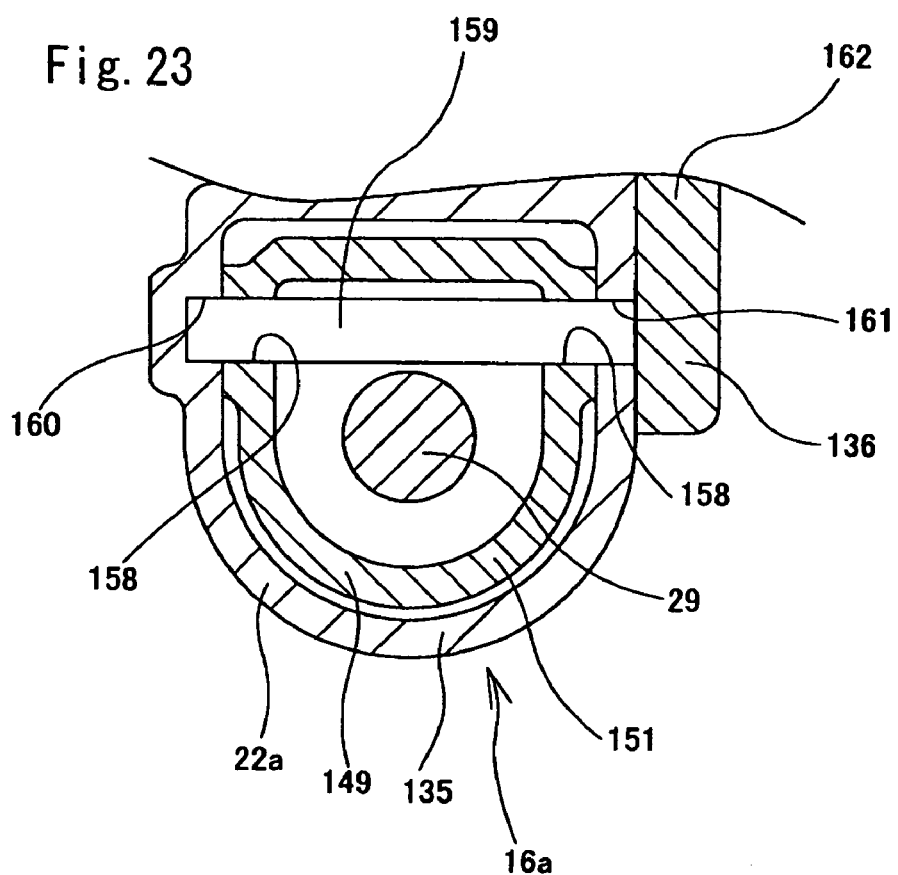
FIG. 23 is a cross-sectional view taken along the line E-E of FIG. 22.

Furthermore, in the case of this example, the bearing holder 149 is supported on the inside of the gear housing 22a so as to allow oscillating displacement. Therefore, a pair of first through holes 158 are formed on a portion of the small diameter cylindrical portion 151 which constitutes the bearing holder 149, at two locations on the radial opposite sides to the worm wheel 28 side (the upper side in FIGS. 19 and 22). Moreover, as shown in FIG. 23, an oscillating shaft 159 is inserted to pass through each of these first through holes 158 on the inside of the bearing holder 149, while avoiding the worm shaft 29, and the portion at both ends of the oscillating shaft 159 is fitted into these first through holes 158 by a clearance fit. Moreover, the portions at both ends of the oscillating shaft 159 which protrude from the first through holes 158 to the outside of the bearing holder 149 are respectively internally fitted by a clearance fit into a concavity 160 and a second through hole 161 provided in the main body 135 constituting the gear housing 22a.

Of the main body 135, the outer peripheral face of the portion provided with the second through hole 161 is over lapped with a wall 162 constituting the cover 136 of the gear housing 22a, which prevents the oscillating shaft 159 from slipping out from the second through hole 161. By means of this construction, the bearing holder 149 is freely supported with respect to the gear housing 22a, so as to be able to oscillate about the center of the oscillating shaft 159. Different to the case of this example, the portions at both ends of the oscillating shaft 159 may be internally secured by a close fit to any of; the first through hole 158, or the concavity 160 and the second through hole 161.

Furthermore, in the case of this example, the axis at a position displaced from the central axis $o_1$ (FIGS. 19, 20 and 22) of the worm shaft 29 to the worm wheel 28 side, and which is parallel with the central axis $o_2$ (FIGS. 19 and 22) of the worm wheel 28, and which passes through the single point Q (FIGS. 19 and 22) on the straight line L parallel with the central axis $o_1$ of the worm shaft 29, and including the intersection point x (FIGS. 19, 20 and 22) of the pitch circles $P_1$ and $P_2$ for the worm 27 of the worm shaft 29 and the worm wheel 28, is made the central axis of the oscillating shaft 159.

On the other hand, the tip end portion (the right end portion in FIGS. 19 and 22) of the worm shaft 29 is rotatably supported by a fourth ball bearing 37 on the inside of the gear housing 22a. Therefore, an outer ring 60 constituting the fourth ball bearing 37 is secured to a second bearing holder 164 which is secured inside of the gear housing 22a. The second bearing holder 164 is an overall annular shape of L-shape in a cross-section, and the outer ring 60 is internally secured on the inside of a cylinder portion 165 provided on one side (the left side in FIGS. 19 and 22) of the second bearing holder 164. Furthermore, on the outer peripheral face at a position situated nearer the tip end of the worm shaft 29, a bush 167 of an approximately cylindrical shape made of an elastic member is loosely externally fitted to the large diameter portion 166 provided on the portion away from the worm 27. Furthermore, the tip end portion of the worm shaft 29 which passes through the inside of the bush 167 protrudes from the one axial end face (the right end face in FIGS. 19 and 22) of the bush 167. On the axial intermediate portion of the bush 167, an inner ring 65 constituting the fourth ball bearing 37 is externally secured. Furthermore, the one axial end face (the left end face in FIGS. 19 and 22) of the inner ring 65 abuts against the inside face of an outwardly directed flange 169 provided on the axial other end portion (the left end portion in FIGS. 19 and 22) of the bush 167, to thereby provide axial positioning of the inner ring 65. A small gap is provided between the inner peripheral face of the bush 167 and the outer peripheral face of the large diameter portion 166, so that it is possible to incline (radially displace) the worm shaft 29 with respect to the bush 167 within a predetermined range.

Figure 24:
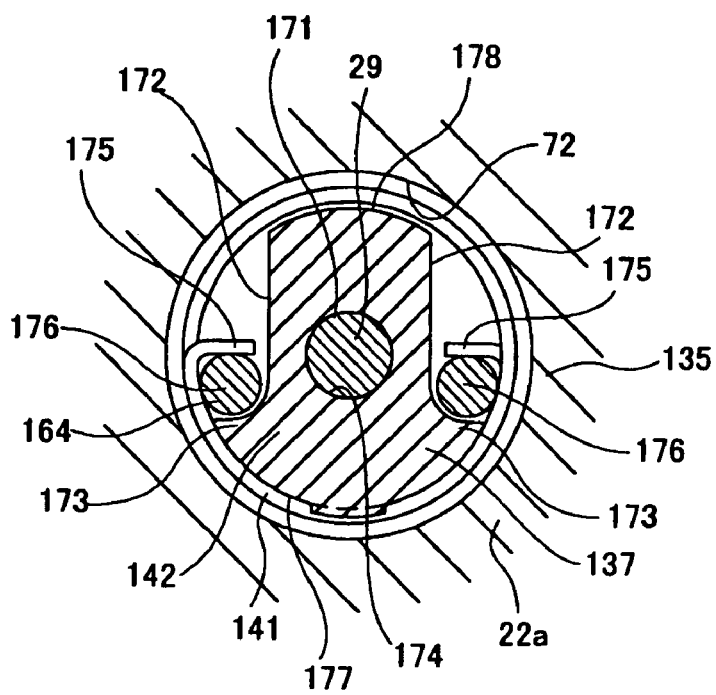
FIG. 24 is a cross-sectional view taken along the line F-F of FIG. 22.

Between the other end face (the right end face in FIGS. 19 and 22) of the second bearing holder 164, and the bottom face of a concavity 72 provided in the gear housing 22a, there is provided a pre-load pad 142 constituting an elestic force applying device 137, and a small diameter portion 171 provided on a tip end portion of the worm shaft 29 is inserted without play into one part of this pre-load pad 142. This pre-load pad 142 as shown in detail in FIG. 24, is made into a shape where one side part at each of two locations on diametrically opposite sides of the outer peripheral face of a cylinder are removed, by injection molding a synthetic resin in which is mixed a solid lubricant material. Furthermore, at each of the two locations on diametrically opposite sides on the outer peripheral face of the pre-load pad 142, a planar section 172 and an arm portion 173 are respectively provided on the half on the worm wheel 28 side (the upper side in FIG. 24), and on the end on the opposite side to the worm wheel 28 (the lower side in FIG. 24). Furthermore, a small diameter portion 171 of the worm shaft 29 is inserted in a through hole 174 formed in a condition passing axially through the center portion of the pre-load pad 142. The inner peripheral face of the through hole 174 has the function as a sliding bearing for supporting the small diameter portion 171. Furthermore, the inner peripheral faces at both ends of the through hole 174 are made tapered surfaces increasing in diameter towards the open end. Such a pre-load pad 142 is supported so as to be moveable within a predetermined range on the inside of the concavity 72 provided in the gear housing 22a.

A torsion coil spring 141 is provided around the pre-load pad 142. Furthermore, a pair of engaging portions 175 provided at two locations on diametrically opposite sides on the two end portions of the torsion coil spring 141 are engaged with one side of a pair of engaging protrusions 176 provided in a condition protruding in the axial direction, at two radially opposite locations on the other end face of the second bearing holder 164. The tip end portions of each of the engaging protrusions 176 are internally fitted to bores (not shown in the figure) provided at two locations on the bottom face of the concavity 72. By such a construction, the position of the engaging protrusions 176 with respect to the gear housing 22a can be restricted. Moreover, by elastically pressing the inner peripheral rim of the torsion coil spring 141 against a first portion cylindrical face 177 of the outer peripheral faces of the pre-load pad 142, which is provided on the opposite side to the worm wheel 28, an elastic force in a direction towards the worm wheel 28, is applied to the tip end portion of the worm shaft 29, via the pre-load pad 142.

That is to say, in a condition before the tip end portion of the worm shaft 29 is inserted into the through hole 174 provided in the pre-load pad 142, the central axis of the through hole 174 is deviated to one side (the upper side in FIGS. 19, 20, 22 and 24) with respect to the central axis of the second bearing holder 164. Therefore, when the tip end portion of the worm shaft 29 is inserted into the inside of the through hole 174 provided in the pre-load pad 142, the diameter of the torsion coil spring 141 is elastically pressed and widened by means of the first portion cylindrical face 177 provided in the pre-load pad 142. Then, the torsion coil spring 141 tends to elastically return in the rewinding direction (the diameter is contracted), so that an elastic force is applied to the tip end portion of the worm shaft 29 from the torsion coil spring 141 in a direction towards the worm wheel 28. Due to this construction, the distance between the second inner shaft 139 to which the worm wheel 28 is externally secured, and the worm shaft 29, is elastically contracted. As a result, the teeth faces of the worm 27 of the worm shaft 29 and the worm wheel 28 are abutted in a pre-loaded condition.

In the case of this example, the radius of curvature of the second portion cylindrical face 178 of the outer peripheral face of the pre-load pad 142, which is provided on the worm wheel 28 side is smaller than the radius of curvature of the first portion cylindrical face 177. In a condition with the torsion coil spring 141 provided around the pre-load pad 142, an axial gap (intermediate space between wires) is provided between the surfaces of the wire elements for each of one return constituting the torsion coil spring 141, and the surfaces of the other wire elements adjacent to the above wire elements.

On the other hand, in order to assemble the worm shaft 29, the third ball bearing 36 and the bearing holder 149 inside of the gear housing 22a, at first the third ball bearing 36 and the bearing holder 149 are assembled around the base end portion of the worm shaft 29. After that, the worm shaft 29, the third ball bearing 36 and the bearing holder 149 are positioned on the inside of the gear housing 22a. Then, in a condition with each of the first through holes 158 provided in the bearing holder 149, the concavity 160 and the second through hole 161 provided at two locations corresponding to each other on one part of the main body 135 constituting the gear housing 22a, matching with each other, the oscillating shaft 159 is inserted and supported in the first and second through holes 158 and 161, and the concavity 160. Then in a condition with the wall 162 constituting the cover 136 of the gear housing 22a overlapping the portion of the main body 135, which is provided with the second through hole 161, the main body 135 and the cover 136 are connected by means of a bolt or the like (not shown in the figure).

In the above manner, in the case of the worm reduction gear of this example and the electric power steering equipped with this, by means of the elestic force applying device 137 comprising the torsion coil spring 141 and the pre-load pad 142, an elastic force in the direction towards the worm wheel 28 is applied to the tip end portion of the worm shaft 29. Therefore, a pre-load can be applied to the meshing portion between the worm wheel 28 and the worm shaft 29 with a low cost construction, and the generation of the teeth hitting noise at the meshing portion can be suppressed. Furthermore, in the case of this example, the oscillating shaft 159 which becomes the oscillating central axis of the worm shaft 29, is provided at a position displaced to the worm wheel 28 side from the central axis $o_1$ of the worm shaft 29, and parallel with the central axis $o_2$ of the worm wheel 28. Therefore, when a drive force of the electric motor 31 is transmitted from the worm shaft 29 to the worm wheel 28, irrespective of the reaction force being applied in the axial direction of the worm shaft 29 from the worm wheel 28 to the worm shaft 29, the moment produced in the worm shaft 29 based on this axial reaction force is small or zero. Therefore, the reaction force in the radial direction applied from the worm wheel 28 to the worm shaft 29 can be kept from fluctuating due to the influence of the aforementioned moment. Consequently, the difference for both rotation directions, in the force necessary for rotating the steering wheel 1, or the return performance of the steering wheel 1, can be suppressed.

In particular, in the case of this example, the axis at a position displaced from the central axis $o_1$ of the worm shaft 29 to the worm wheel 28 side, and which is parallel with the central axis $o_2$ of the worm wheel 28, and which passes through the single point Q on the straight line L parallel with the central axis $o_1$ of the worm shaft 29, and including the intersection point x of the pitch circles $P_1$ and $P_2$ for the worm 27 of the worm shaft 29 and the worm wheel 28, is made the central axis of the oscillating shaft 159. Therefore irrespective of application of the reaction force in the axial direction of the worm shaft 29 from the worm wheel 28 to the worm shaft 29, generation of a moment on the worm shaft 29 based on the reaction force in the axial direction can be eliminated (made zero). Consequently, the difference for both rotation directions, in the force necessary for rotating the steering wheel 1, or the return performance of the steering wheel 1, can be suppressed.

In the case of this example, the bearing holder 149 which supports the third ball bearing 36 is supported so as to be able to oscillate with respect to the gear housing 22a. Therefore, for the third ball bearing 36, instead of one where the oscillating shaft is secured to on part of the outer ring, a conventional bearing in general use can be used, and this third ball bearing 36 can be supported such as to permit oscillating displacement with respect to the gear housing 22a, and cost increases can be suppressed.

Furthermore, in the case of this example, in relation to the axial direction of the worm shaft 29, the oscillating shaft 159 is provided between the third ball bearing 36 of the third and fourth ball bearings 36 and 37 which support the opposite ends of the worm shaft 29, which is on the electric motor 31 side, and the meshing portion of the worm 27 of the worm shaft 29 and the worm wheel 28. Therefore, a large pre-load can be applied to the meshing portion while keeping the oscillating displacement amount of the base end portion on the electric motor 31 side of the worm shaft 29 small, to more effectively suppress the generation of a grating teeth hitting noise at the meshing portion. Different to the case of this example, in the case where the oscillating shaft is provided on the opposite side to the electric motor 31 in relation to the meshing portion, the oscillating displacement of the base end portion of the worm shaft 29 becomes large.

The elestic force applying device 137 is provided on the opposite side to the oscillating shaft 159 in relation to the meshing portion. Therefore, the elastic deformation amount of the torsion coil spring 141 constituting the elestic force applying device 137 can be made large, so that the magnitude of the elastic force applied to the worm shaft 29 can be readily adjusted.

In the case of this example, since the pre-load pad 142 is made of synthetic resin, the tip end portion of the worm shaft 29 can be easily inserted into the inside of the through hole 174 provided in the pre-load pad 142. Furthermore, in the case where the surfaces of the wire elements for each of one return constituting the torsion coil spring 141, and the surfaces of the other wire elements adjacent to the above wire elements are contacted in the axial direction, the occurrence of friction at the contacting portions becomes the cause of inappropriate changing of the elastic force applied to the worm shaft 29 by the torsion coil spring 141. To counter this, in the case of the present example, an axial gap is provided between the surfaces of the wire elements for each of one return, and the other wire elements adjacent to the above wire elements. Therefore a predetermined elastic force can be more stably applied to the worm shaft 29.

EXAMPLE 6

Figure 25:
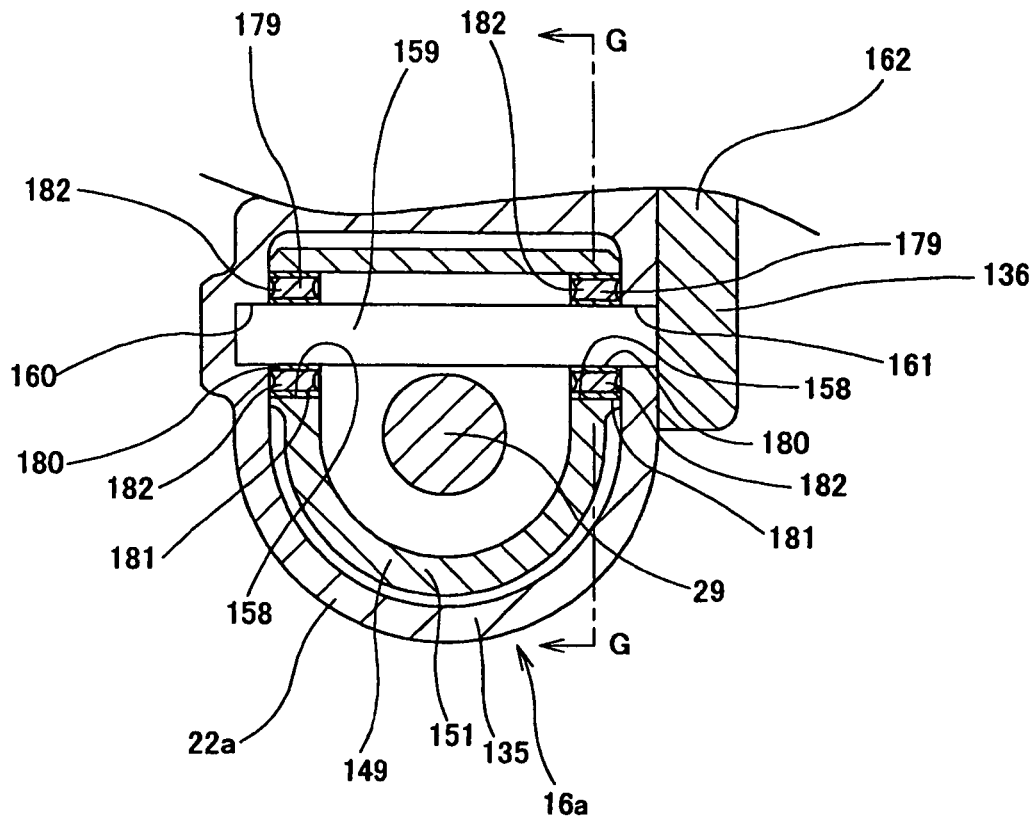
FIG. 25 is a view similar to FIG. 23, showing a sixth example of the present invention.
Figure 26:
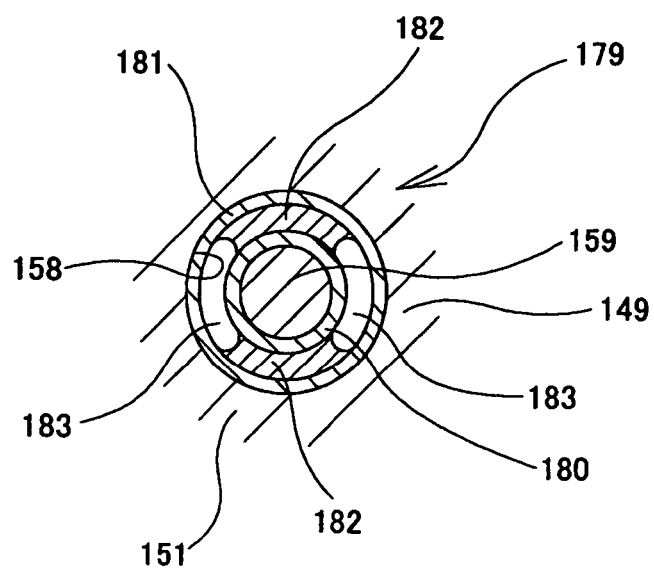
FIG. 26 is a cross-sectional view taken along the line G-G of FIG. 25.

FIGS. 25 and 26 show a sixth example of the present invention. In the case of this example, elastic rings 179 are provided between the outer peripheral faces of both end portions of a oscillating shaft 159 for supporting a bearing holder 149 with respect to a gear housing 22a so as to allow oscillating displacement, and the inner peripheral faces of first through holes 158 provided in the bearing holder 149. These elastic rings 179 are provided between an inner diameter side cylindrical portion 180 and an outer diameter side cylindrical portion 181 both made from metal, and are connected concentric with each other by means of a connection portion 182 made of rubber being an elastic member. That is to say, the connection portions 182 are vulcanized and bonded to the two cylindrical portions 180 and 181 to thereby connect these two cylindrical portions 180 and 181. These connecting portions 182 are provided in a condition separated from each other at two positions on diametrically opposite sides between the two cylindrical portions 180 and 181. More specifically, the connecting portions 182 are provided at two locations (two locations at opposite ends in the up and down direction in FIGS. 25 and 26) of the ends of the intermediate portion, on the worm wheel 28 side (refer to FIGS. 19, 20 and 22) and the opposite side, and opposite ends in relation to the axial direction of the worm shaft 29, which are 90 degrees out of phase with the portions provided with the connecting portions 182 are made space portions 183. Due to this construction, the rigidity of the respective elastic rings 179 in relation to the radial direction of the oscillating shaft 159 is different in the circumferential direction. Moreover, the rigidity of these elastic rings 179 is lower in relation to the axial direction of the worm shaft 29.

According to the above worm reduction gear of this example, generation of the teeth hitting noise at the meshing portion between the worm 27 of the worm shaft 29 and the worm wheel 28 can be suppressed without needlessly increasing the rotational torque of the worm shaft 29. That is to say, when the worm shaft 29 is supported such that axial displacement with respect to the gear housing 22a is impossible, the worm shaft 29 is readily able to rotate when a rotational vibration is input to the worm wheel 28. Furthermore, since a large inertial moment electric motor 31 rotating shaft 32 (refer to FIGS. 19, 21 and 22) is connected to this worm shaft 29, the force transmitted between the teeth of the worm 27 of the worm shaft 29 and the worm wheel 28 increases, based on this rotational vibration of the worm wheel 28. Consequently it is necessary to increase the elastic force applied to the worm shaft 29 by the elestic force applying device 137 (refer to FIG. 19) so that even when this force is applied, the mating teeth do not separate. However if this elastic force becomes excessive the rotational torque of the worm shaft 29 becomes needlessly large. On the other hand, in the case of this example, the elastic rings 179 with part made of an elastic member are provided between the bearing holder 149 and the oscillating shaft 159. Therefore, when a rotational vibration is input to the worm wheel 28, the worm shaft 29 is readily displaced in the axial direction, and rotation of the worm shaft 29 becomes difficult. Therefore, the force transmitted between the teeth faces can be made small. As a result, separation of the teeth faces can be prevented without needlessly increasing the rotational torque of the worm shaft 29, and generation of the teeth hitting noise at the meshing portion can be suppressed. Moreover, transmission of vibration based on collision of the teeth faces, to the gear housing 22a can be made more difficult, and generation of an abnormal noise based on this vibration can be suppressed.

Furthermore, in the case of this example, the rigidity of the respective elastic rings 179 is made different in the circumferential direction, and the rigidity of the elastic rings 179 in relation to the axial direction of the worm shaft 29 is made less. Therefore, the rigidity necessary for the elastic rings 179 overall can be maintained and the worm shaft 29 can be readily displaced in the axial direction in relation to the gear housing 22a. Consequently, an increase in the rotation torque of the worm shaft 29 can be more effectively suppressed. Other construction and operation is the same as for the case of the fifth example illustrated in FIGS. 18 to 24, and hence the same parts are denoted by the same reference symbols and repeated description is omitted.

EXAMPLE 7

Figure 27:
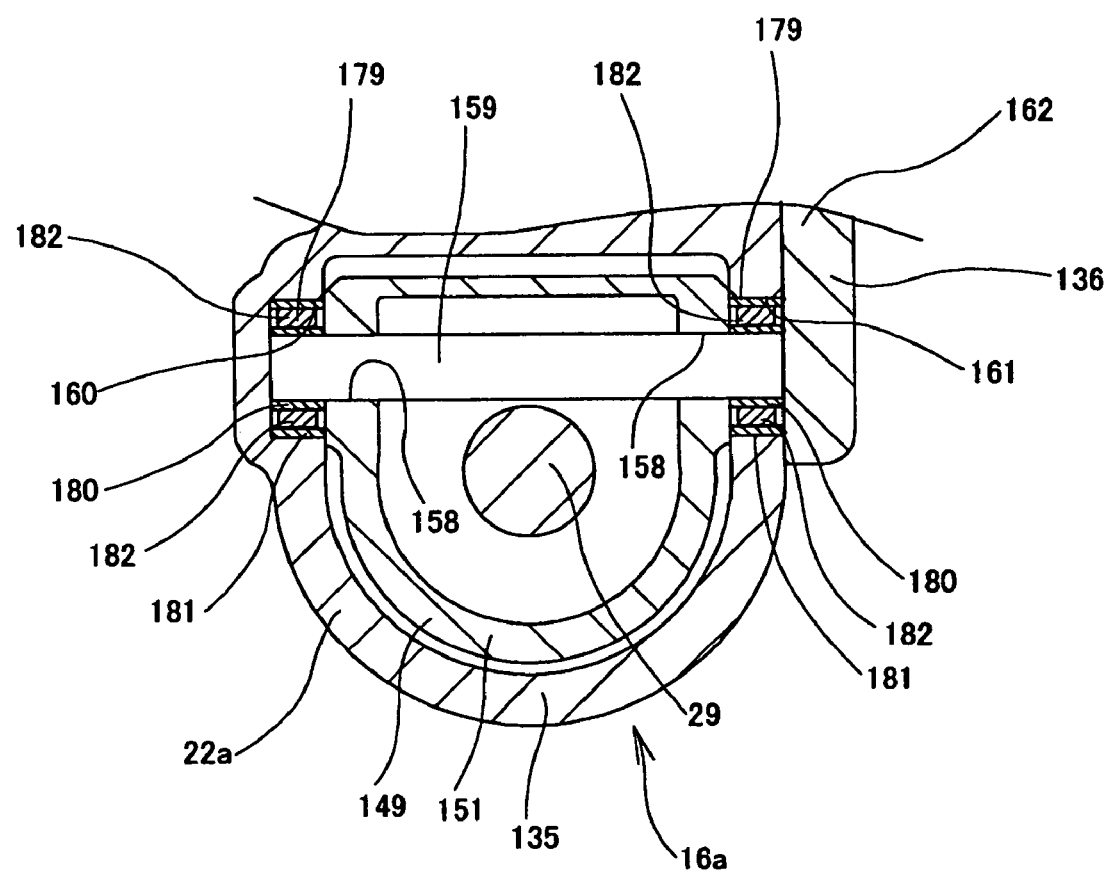
FIG. 27 is a view similar to FIG. 25, showing a seventh example of the present invention.

FIG. 27 shows a seventh example of the present invention. In the case of this example, the elastic rings 179 used in the sixth example shown in FIGS. 25 and 26 are provided between the inner peripheral face of a concavity 160 and a second through hole 161 provided in the gear housing 22a, and an outer peripheral face of the opposite ends of the oscillating shaft 159. Other construction and operation is the same as for the sixth example. In the construction of the sixth and seventh examples shown in FIG. 25 to 27, as the elastic member constituting the connection portion 182 of the elastic ring 179, an elastomer, a synthetic resin or the like, other than rubber may be used. Furthermore, it is also possible to make the overall elastic ring 179 from an elastomer such as synthetic resin.

EXAMPLE 8

Figure 28:
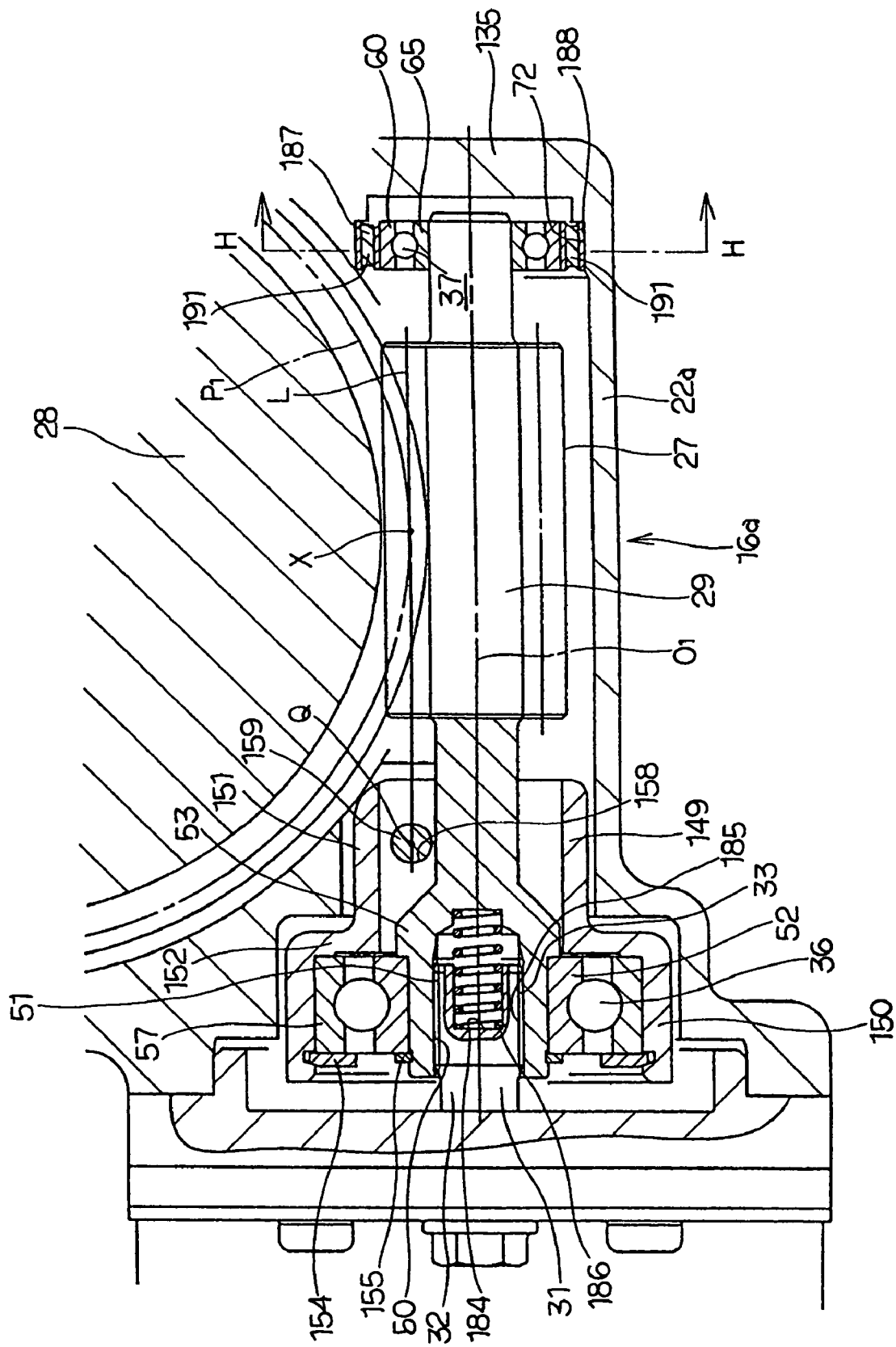
FIG. 28 is a view similar to FIG. 22, showing an eighth example of the present invention.
Figure 29:
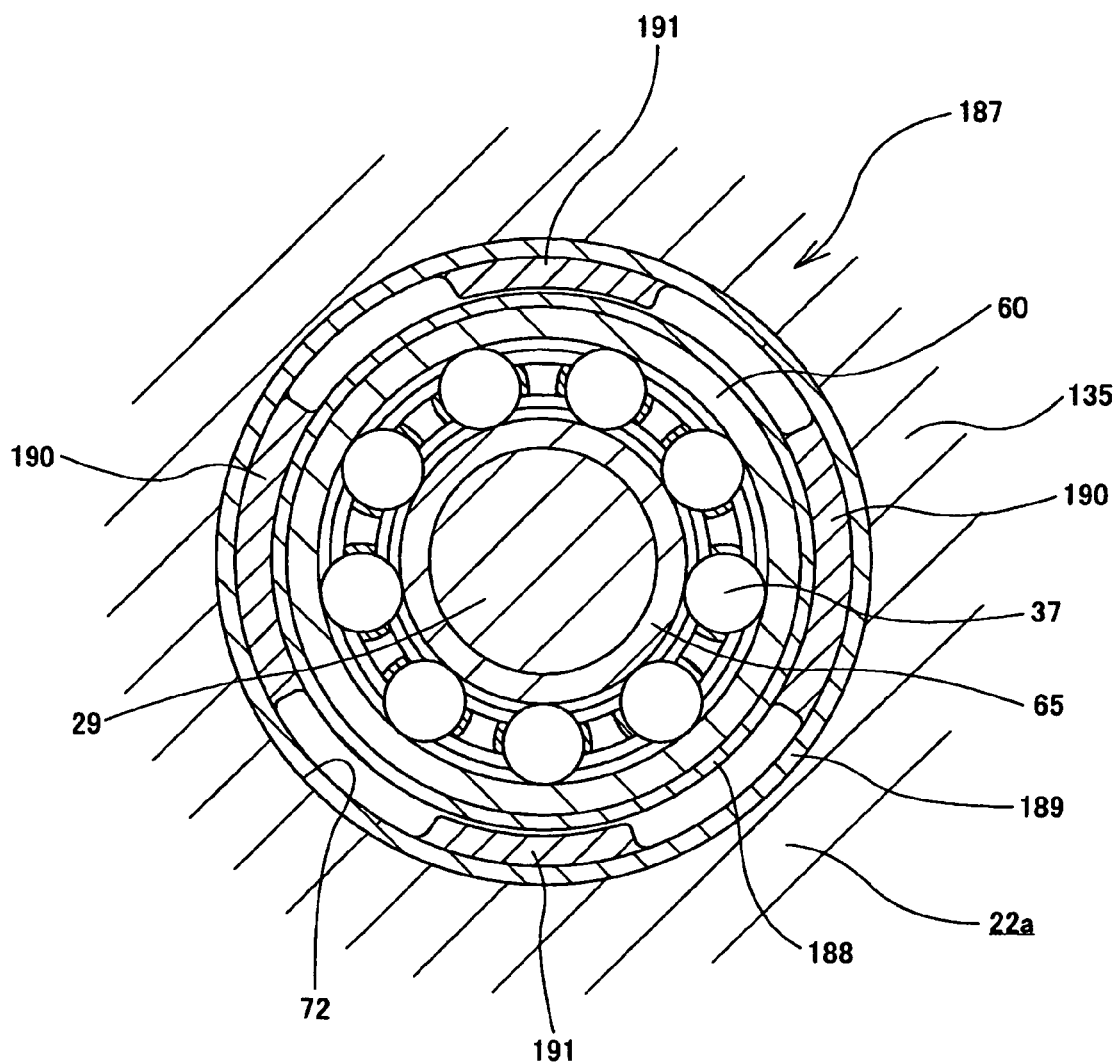
FIG. 29 is a cross-sectional view taken along the line H-H of FIG. 28.

FIGS. 28 and 29 shown an eighth example of the present invention. In the case of this example, a coil spring 186 serving as an elestic force applying device is provided between the rotation shaft 32 of the electric motor 31 and the worm shaft 29 in the construction of the fifth example shown in FIGS. 18 to 24. That is to say, in the case of this example, a concavity 184 is provided in one end face (the right end face in FIG. 28) of the rotation shaft 32, and between the bottom face of the concavity 184 and the bottom face of a spline hole 185 provided in the base end face (the left end face in FIG. 28) of the worm shaft 29 is provided the coil spring 186. Then, by means of this coil spring 186, an elastic force is applied to the worm shaft 29 in a direction to separate this from the rotation shaft 32. Also in the case of this example, as with the aforementioned case of the fifth to seventh examples, the oscillating shaft 159 which becomes the oscillating center of the worm shaft 29, is provided at a position displaced from the central axis $o_1$ of the worm shaft 29 towards the worm wheel 28 side (the upper side in FIG. 28). Due to this construction, the worm shaft 29 is elastically oscillated about the oscillating shaft 159 towards the worm wheel 28 side.

Moreover, in the case of this example, the outer peripheral face of the tip end portion of the worm shaft 29 is a simple cylindrical surface without a step, and the tip end portion is positioned on the inside of a concavity 72 provided in the gear housing 22a. Furthermore, between the inner peripheral face of the concavity 72 and the outer peripheral face of the tip end portion of the worm shaft 29, there is provided an elastic ring 187 corresponding to the second elastic ring, and a fourth ball bearing 37. An inner ring 65 of the fourth ball bearing 27 is externally fitted and secured to the tip end portion of the worm shaft 29, and thereby provided around the tip end portion.

Furthermore, regarding the elastic ring 187, as shown in detail in FIG. 29, an inner diameter side cylindrical portion 188 and an outer diameter side cylindrical portion 189 both made of metal are connected to each other concentrically by means of connection portions 190 made of an elastic member such as an elastomer like rubber. Furthermore, each of these connecting portions 190 are provided in a condition separated from each other at two locations on diametrically opposite sides of the intermediate portion of the two cylindrical portions 188 and 189. More specifically, in the intermediate portions therebetween, the respective connecting portions 190 are provided only at two locations on opposite ends of the direction (left and right direction in FIG. 29) which is 90 degrees out of phase in relation to the oscillating displacement direction (the up and down direction in FIG. 29) of the worm shaft 29. Due to this construction, the rigidity of the elastic ring 187 becomes lower in relation to the oscillating displacement direction of the worm shaft 29, and becomes higher in relation to the direction 90 degrees to the oscillating displacement direction.

Moreover, in the case of this example, at the portions in between the inner diameter side and outer diameter side cylindrical portions 188 and 189, stopper portions 191 of a partial arcuate shape in cross-section and made of an elastic member such as an elastomer like rubber, are provided at two locations on the inner peripheral surface of the outer diameter side cylindrical portion 189, on opposite ends in the direction of the oscillating displacement direction of the worm shaft 29. A small gap is provided between the inner peripheral surface of the respective stopper portions 191 and the outer peripheral surface of the inner diameter side cylindrical portions 188. Regarding each of these stopper portions 191, in the case where the worm shaft 29 becomes inclined with an excessive oscillating displacement, the stopper portion 191 contacts against the outer peripheral face of the inner diameter side cylindrical portion 188, and hence the excessive oscillating displacement of the worm shaft 29 is prevented. Such an elastic ring 187 can be provided between the worm shaft 29 and the gear housing 22a by externally securing the inner diameter side cylindrical portion 188 onto an outer ring constituting the fourth ball bearing 37, and internally securing the outer diameter side cylindrical portion 189 into the concavity 72 provided in the gear housing 22a.

In the case of the examples constructed as described above, since the coil spring 186 is provided between the one end face of the rotation shaft 32 of the electric motor 31, and the base end face of the worm shaft 29, a pre-load based on the elastic force of the coil spring 186 can be applied to the third ball bearing 36 via the lock ring 155 engaged with the base end portion of the worm shaft 29. Therefore, while suppressing the abnormal noise, a deep-grooved ball bearing having a comparatively large axial clearance can be used for the third ball bearing 36, and hence costs can be reduced.

Moreover, in the case of this example, by providing the elastic ring 187 between the fourth ball bearing 37 which supports the tip end portion of the worm shaft 29, and the gear housing 22a, oscillating displacement of the worm shaft 29 with respect to the gear housing 22a is made possible. Therefore, generation of an abnormal noise due to collision between the tip end portion of the worm shaft 29 and the fourth ball bearing 37 can be prevented, without losing the effect of suppressing the generation of the teeth hitting noise at the meshing portion between the worm 27 of the worm shaft 29 and the worm wheel 28.

Moreover, in the case of this example, the rigidity of the elastic ring 187 provided between the fourth ball bearing 37 and the gear housing 22a is reduced for the part related to the oscillating displacement direction of the worm shaft 29, and is increased for the part related to the direction which is 90 degrees out of phase to the oscillating displacement direction. Therefore, oscillating displacement of the worm shaft 29 towards the worm wheel 28 side can be more readily performed while preventing displacement of the worm shaft in an unintended direction, and generation of the teeth hitting noise at the meshing portion can be more effectively suppressed.

Furthermore, in the case of this example, since a stopper portion 191 for restricting the oscillating displacement of the worm shaft 29 is provided on the elastic ring 187, excessive oscillating displacement of the worm shaft 29 can be prevented. Other construction and operation is the same as for the case of the fifth example illustrated in FIGS. 18 to 24, and hence the same parts are denoted by the same reference symbols and repeated description is omitted.

EXAMPLE 9

Figure 30:
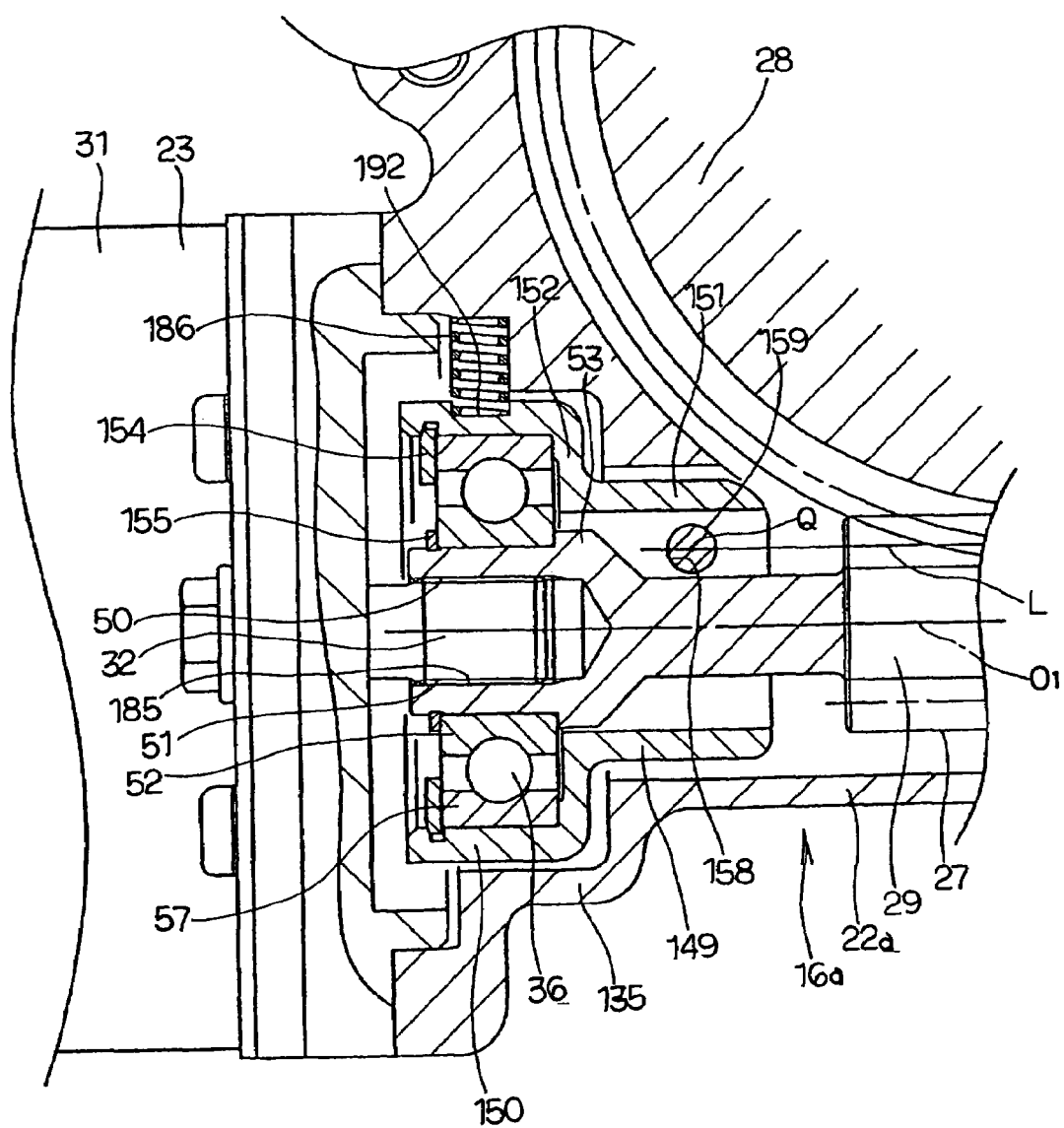
FIG. 30 is an enlarged cross-sectional view of a ninth example of the present invention corresponding to part I of FIG. 19.

FIG. 30 shows a ninth example of the present invention. In the case of this example, a coil spring 186 serving as an elestic force applying device is provided between the bearing holder 149 and the gear housing 22a in the construction of the eighth example shown in FIGS. 28 and 29. That is to say, in the case of this example, the coil spring 186 is provided between the inner face of the gear housing 22a, and the bottom of a concavity 192 provided in the outer peripheral face of the large diameter cylindrical portion 150 constituting the bearing holder 149. Furthermore, by means of the coil spring 186, an elastic force is applied in the radial direction to the base end portion of the worm shaft 29. The coil spring 186 is provided at a position displaced further to the base end side of the worm shaft 29 than the oscillating shaft 159 which becomes the oscillating center of the worm shaft 29, in relation to the axial direction of the worm shaft 29. Due to this construction, the worm shaft 29 is elastically oscillated about the oscillating shaft 159 towards the worm wheel 28 side.

In the case of this example, a pre-load can be applied to the meshing portion without increasing the overall length of the portion created by connecting the worm shaft 29 to the rotation shaft 32 of the electric motor 31. Other construction and operation is the same as for the case of the eighth example illustrated in FIGS. 28 and 29, and hence the same parts are denoted by the same reference symbols and repeated description is omitted

EXAMPLE 10

Figure 31:
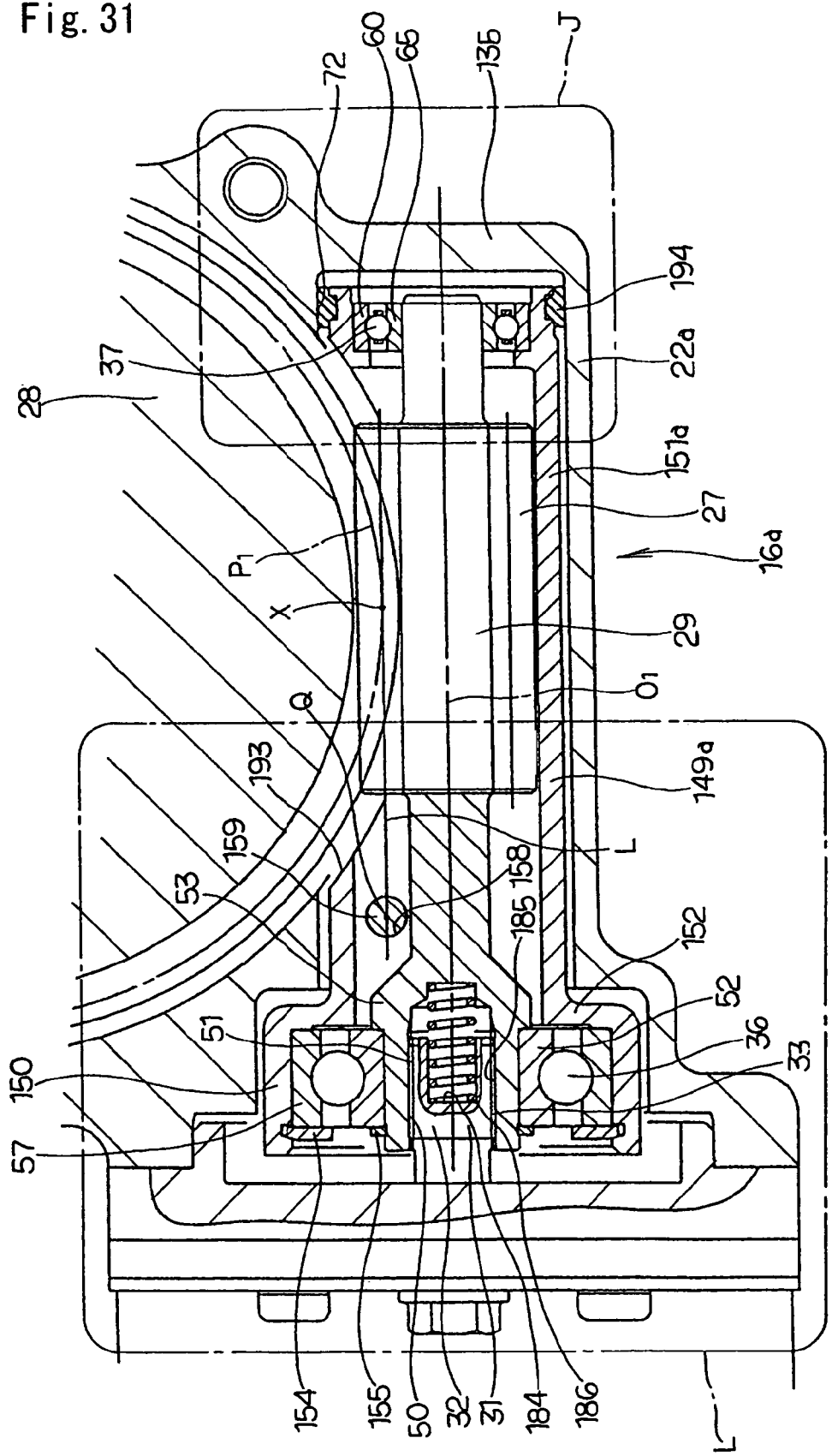
FIG. 31 is a view similar to FIG. 22, showing a tenth example of the present invention.

FIG. 31 shows a tenth example of the present invention. In the case of this example, the third and fourth ball bearings 36 and 37 provided for supporting the opposite ends of the worm shaft 29 in the construction of the eighth example shown in FIGS. 28 and 29 are supported by a bearing holder 149a. Therefore, in the case of this example, the overall length of a small diameter cylindrical portion 151a constituting the bearing holder 149a is increased, and a through hole 193 is formed in one part around the circumferential direction at the axial intermediate portion of the small diameter cylindrical portion 151a. Furthermore, the worm shaft 29 is provided on the inside of the bearing holder 149a, and a third ball bearing 36 is provided between the outer peripheral face of the base end portion of the worm shaft 29 and the inner peripheral face of a large diameter cylindrical portion 150 constituting the bearing holder 149a, and a fourth ball bearing 37 is provided between the outer peripheral face of the tip end portion of the worm shaft 29 and the inner peripheral face of the tip end portion of the small diameter cylindrical portion 151a. An elastic ring 194 (corresponding to the elastic member) made of an elastic member such as an elastomer like rubber is provided between the outer peripheral face of the tip end portion of the small diameter cylindrical portion 151a and the inner peripheral face of a concavity 72 provided in the gear housing 22a. Moreover, the portion at one part of the worm 27 of the worm shaft 29, which is exposed to the outside of the small diameter cylindrical portion 151a from the through hole 193 provided in the small diameter cylindrical portion 151a, is meshed with the worm wheel 28.

In the case of this example, as with the case of the eighth example shown in FIGS. 28 and 29, generation of an abnormal noise due to collision between the tip end portion of the worm shaft 29 and the fourth ball bearing 37 can be prevented, without losing the effect of suppressing the generation of the teeth hitting noise at the meshing portion between the worm 27 of the worm shaft 29 and the worm wheel 28. Moreover, excessive oscillating displacement of the worm shaft 29 can be prevented. Other construction and operation is the same as for the case of the eighth example illustrated in FIGS. 28 to 29, and hence the same parts are denoted by the same reference symbols and repeated description is omitted.

EXAMPLE 11

Figure 32:
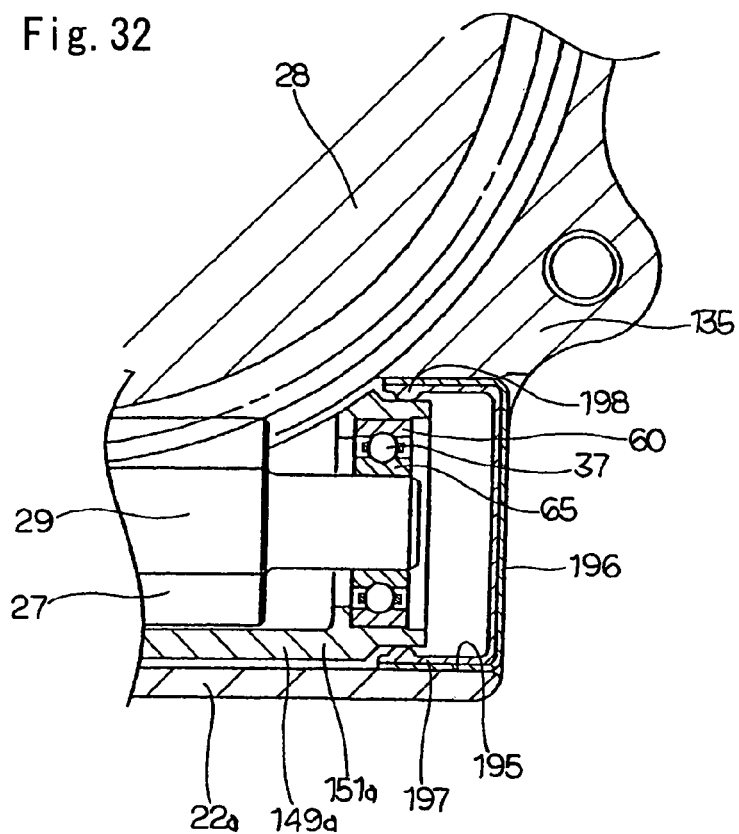
FIG. 32 is an enlarged cross-sectional view of an eleventh example of the present invention corresponding to part J of FIG. 31.

FIG. 32 shows an eleventh example of the present invention. In the case of this example, at the portion facing the tip end face of the worm shaft 29 in one part of the gear housing 22a, in the construction of the tenth example shown in FIG. 31, a through hole 195 which passes through the inside and outside faces of the gear housing 22a is formed. A bottomed cylindrical cap 196 made of an elastic member such as an elastomer like rubber or a synthetic resin is internally fitted into the through hole 195. Furthermore, the tip end portion of the small diameter cylindrical portion 151a constituting the bearing holder 149a is internally supported on a protruding portion 198 provided on the inner peripheral face of the tip end portion of a cylindrical portion 197 constituting the cap 196. In the this example, the cap 196 corresponds to the elastic member. Other construction and operation is the same as for the case of the tenth example illustrated in FIG. 31, and hence repeated description is omitted.

EXAMPLE 12

Figure 33:
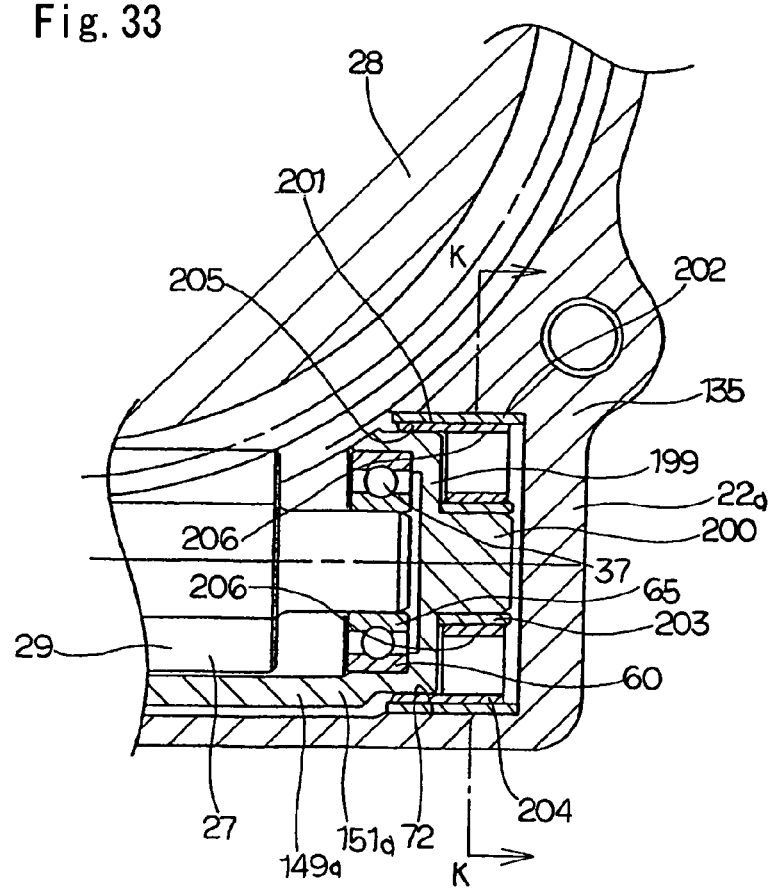
FIG. 33 is a view similar to FIG. 32, showing a twelfth example of the present invention.
Figure 34:
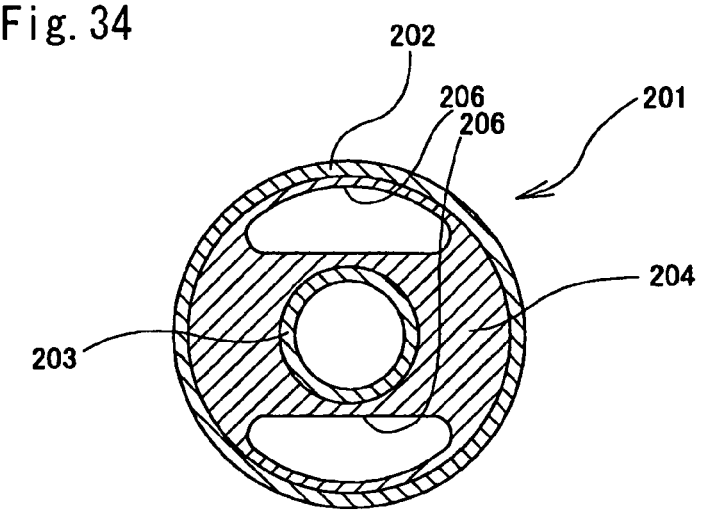
FIG. 34 is a cross-sectional view taken along the line K-K of FIG. 33 showing just an elastic ring demounted.

FIGS. 33 and 34 show a twelfth example of the present invention. In the case of this example, in the construction of the tenth example shown in FIG. 31, a plate 199 which covers the tip end opening of the small diameter cylindrical portion 151a of the bearing holder 149a is provided, and a shaft portion 200 protruding axially is provided on the tip end face central portion of the plate 199. Furthermore, an elastic ring 201 corresponding to a second elastic ring is provided between the outer peripheral face of the shaft portion 200 and the inner peripheral face of a concavity 72 provided in the gear housing 22a. This elastic ring 201, as shown in detail in FIG. 34, has an outer diameter side cylindrical portion 202 and an inner diameter side cylindrical portion 203 both made of metal connected to each other concentrically by means of a connecting portion 204 made of an elastic member such as an elastomer like rubber. Furthermore, an axial half portion (the left half portion in FIG. 33) of the outer diameter side cylindrical portion 202 protrudes axially further than the axial end face (the left end face in FIG. 33) of the inner diameter side cylindrical portion 203, and the overall length of the outer diameter side cylindrical portion 202 is greater than the overall length of the inner diameter side cylindrical portion 203. On the outer peripheral rim of the axial one end face (the left end face in FIG. 33) of the connecting portion 204 is provided a protruding portion 205 which protrudes in the axial direction, and this protruding portion 205 is connected to the inner peripheral face at the axial half portion of the outer diameter side cylindrical portion 202.

Moreover, through holes 206 which pass through in the axial direction are provided in part of the connecting portion 204, at two locations on diametrically opposite sides located at both end portions in the oscillating displacement direction (the up down direction in FIGS. 16 and 17) of the worm shaft 29. By means of this construction, the rigidity of the elastic ring 201 is reduced for the part related to the oscillating displacement direction of the worm shaft 29, and is increased for the part related to the direction which is 90 degrees out of phase to the oscillating displacement direction. This elastic ring 201 is provided between the gear housing 22a and the shaft portion 200, with the outer diameter side cylindrical portion 202 internally secured to the concavity 72 provided in the gear housing 22*a*, and the inner diameter side cylindrical portion 203 externally secured to the shaft portion 200 provided on the tip end face of the bearing holder 149*a*. The inner peripheral face of the protruding portion 205 provided on the connecting portion 204 is opposed to the outer peripheral face of the tip end portion of the small diameter cylindrical portion 151*a* constituting the bearing holder 149*a* via a small gap. In this example, the protruding portion 205 corresponds to the stopper portion for restricting oscillating displacement of the worm shaft 29.

In the case of this example, the portion of low rigidity of the elastic ring 201, and the protruding portion 205 serving the function of a stopper portion for preventing excessive oscillating displacement of the worm shaft 29 are displaced from each other in the axial direction of the elastic ring 201 Other construction and operation is the same as for the case of the tenth example illustrated in FIG. 31, and hence the same parts are denoted by the same reference symbols and repeated description is omitted.

EXAMPLE 13

Figure 35:
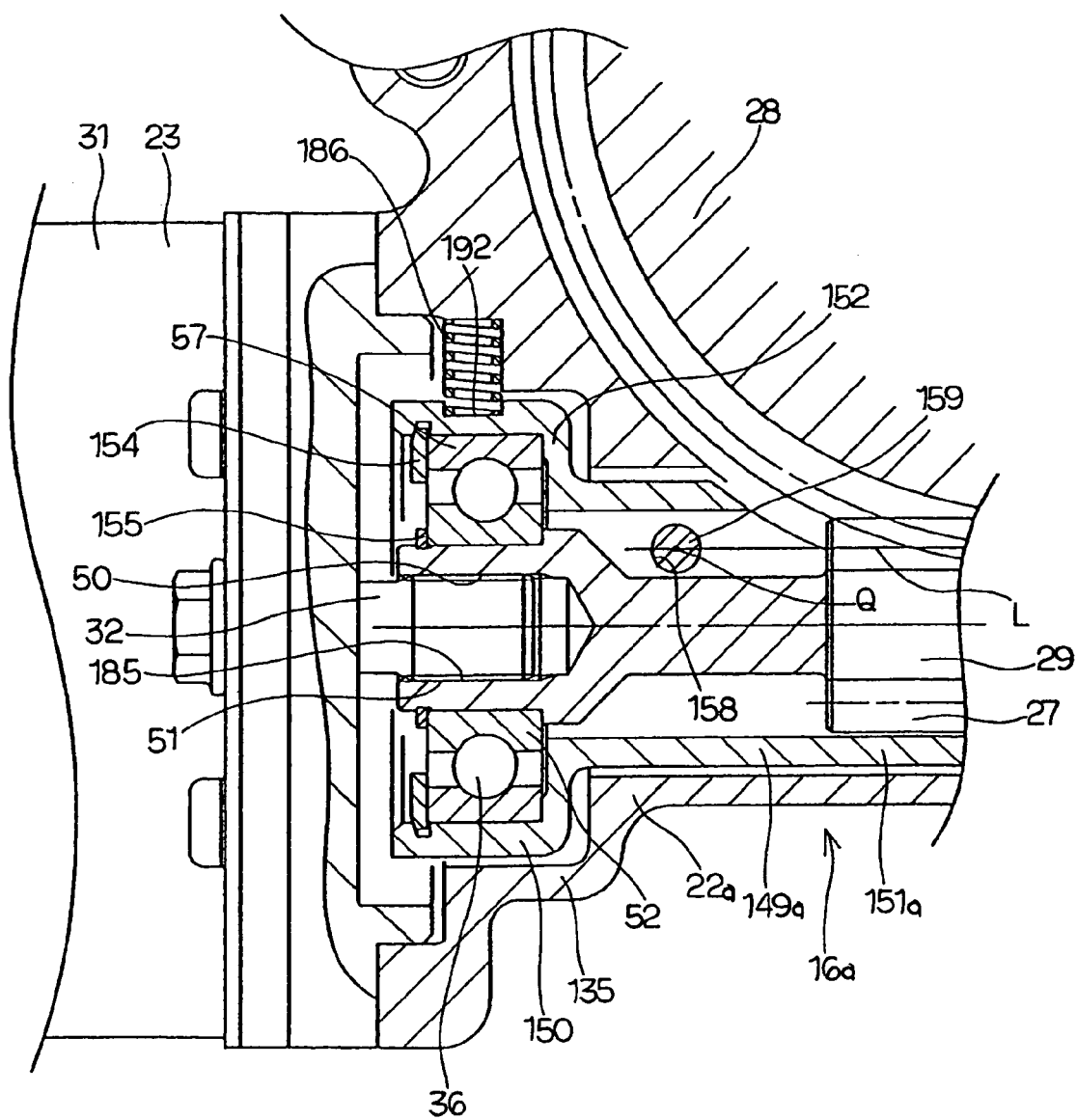
FIG. 35 is an enlarged cross-sectional view of a thirteenth example of the present invention corresponding to part L of FIG. 31.

FIG. 35 shows a thirteenth example of the present invention. In the case of this example, this has a construction where the construction of the ninth example shown in FIG. 30 and the construction of the tenth example 10 shown in FIG. 31 are combined. That is to say, in the case of this example, in the construction of the tenth example shown in FIG. 31, between the outer peripheral face of the large diameter cylindrical portion 150 constituting the bearing holder 149*a* which supports the third ball bearing 36 and the fourth ball bearing 37 (refer to FIG. 31), and the inner peripheral face of the gear housing 22*a*, a coil spring 186 is provided in a radial direction of the bearing holder 149*a*. Other construction and operation is the same as for the case of the ninth example illustrated in FIG. 30 and the tenth example illustrated in FIG. 31, and hence the same parts are denoted by the same reference symbols and repeated description is omitted.

EXAMPLE 14

Figure 36:
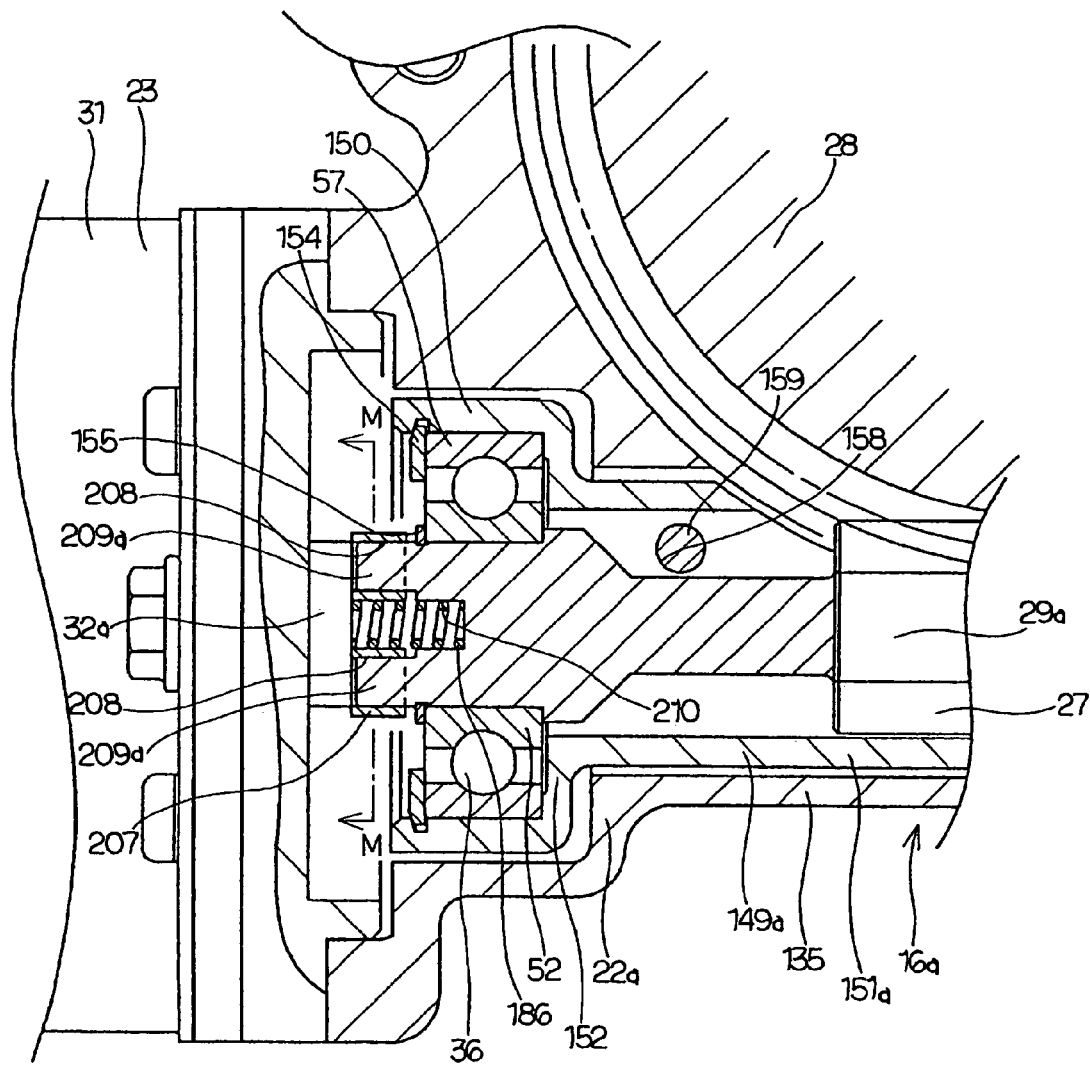
FIG. 36 is a view similar to FIG. 35, showing a fourteenth example of the present invention.
Figure 37:
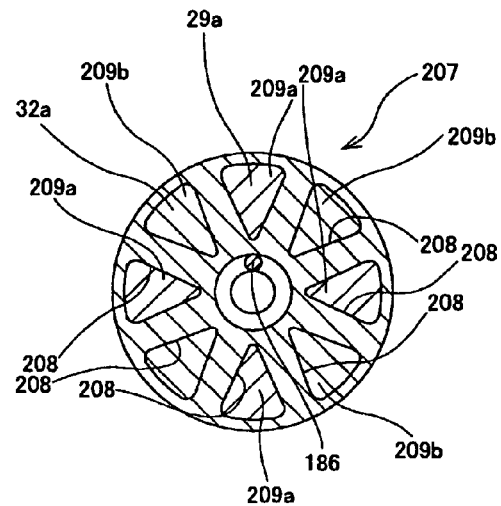
FIG. 37 is a cross-sectional view taken along the line M-M of FIG. 36.

Next, FIGS. 36 and 37 show a fourteenth example of the present invention. In the case of this example, in the construction of the tenth example shown in FIG. 31, one end portion (the right end portion in FIG. 36) of a rotation shaft 32*a* of the electric motor 31, and the base end portion (the left end portion in FIG. 36) of a worm shaft 29*a* are connected in a condition with mutual relative rotation prevented, via a connecting ring 207 made of an elastic material. This connecting ring 207, as shown in detail in FIG. 37 is made in a cylindrical shape from an elastic member such as an elastomer like rubber, and through holes 208 of an approximately triangular shape in cross-section are formed passing through in the axial direction at a plurality of places (eight places in the case shown in the figure) at even spacing around the circumferential direction.

At a plurality of locations (four locations in the case of the example shown in the figure) around the circumferential direction of the portion towards the outer diameter of the base end face (the left end face in FIG. 36) of the worm shaft 29*a*, and the portion towards the outer diameter of the one end face (the right end face in FIG. 36) of the rotation shaft 32*a*, at positions matching with each alternate through hole 208 provided in the connecting ring 207, there is provided protrusions 209*a* and 209*b* which each protrude in the axial direction. Each of these protrusions 209*a* and 209*b* are freely internally fitted without play into each of the through holes 208 provided in the connecting ring 207. Furthermore, each of the protrusions 209*a* provided on the worm shaft 29*a*, and each of the protrusions 209*b* provided on the rotation shaft 32*a* are internally fitted without play in alternate shifts, in relation to the circumferential direction, from the axial direction opposite sides of the connecting ring 207 into the respective through holes 208, so that the worm shaft 29*a* and the rotation shaft 32*a* are connected via the connecting ring 207. Moreover, in the case of this example, a coil spring 186 is provided between the bottom face of the concavity 210 provided in the base end central portion of the worm shaft 29*a*, and the central portion of the one end face of the rotation shaft 32*a*, and exerts an elastic force on the worm shaft 29*a* in a direction to separate from the rotation shaft 32*a*.

In the case of this example, the worm shaft 29*a* and the rotation shaft 32*a* are connected via the connecting ring 207. Therefore, transmission of rotational vibration between the rotation shaft 32*a* and the worm shaft 29*a* can be inhibited. Other construction and operation is the same as for the case of the tenth example illustrated in FIG. 31, and hence the same parts are denoted by the same reference symbols and repeated description is omitted.

While omitted from the figure, a difference to the case of this example is that at the formation location of the through holes 208 provided in the connecting ring 207, instead of the through holes 208, there may be alternately provided around the circumferential direction a plurality of first and second concavities for each. In this case, the bottom portions of these first and second concavities are made on opposites sides with respect to the axial direction of the connecting ring 207. Furthermore, the protrusions 209*a* provided on the base end face of the worm shaft 29, and the protrusions 209*b* provided on the one end face of the rotation shaft 32*a* are internally fitted into each of the first and second respective concavities, so that the worm shaft 29*a* and the rotation shaft 32*a* are connected via the connecting ring 207.

In the abovementioned fifth through fourteenth examples, grease may be filled between the gear housing 22*a* and the bearing holder 149, 149*a* which supports at least one of the ball bearings 36 (or 37) of the third and fourth ball bearings 36 and 37 which rotatably support the opposite end portions of the worm shafts 29, 29*a*. In the case where such a construction is adopted, when transmitting the drive force between the worm shaft 29, 29*a*, and the worm wheel 28, if a tendency occurs for separation of the worm shaft 29, 29*a* from the worm wheel 28 based on the reaction force applied from the worm wheel 28 to the worm shaft 29, 29*a*, oscillating displacement of the bearing holder 149, 149*a* can be inhibited. When the drive force increases, the reaction force increases, and a tendency occurs for the speed of separation of the worm shaft 29, 29*a* from the worm wheel 28 to increase. In this case, the viscous resistance of the grease also increases. Therefore oscillating displacement of the bearing holder can be suppressed, and separation of the teeth faces of the worm 20 of the worm shaft 29, 29*a* and the worm wheel 28 can be readily prevented.

In the above mentioned fifth through fourteenth examples, the bearing holder 149, 149*a* which supports at least one of the ball bearings 36 (or 37) of the third and fourth ball bearings 36 and 37 which rotatably support the opposite end portions of the worm shaft 29, 29*a*, may be made of magnesium alloy. In the case where such a construction is adopted, vibration generated in the worm shaft 29, 29*a* due to collision of the teeth faces of the worm 20 of the worm shaft 29, 29a and the worm wheel 28 can be readily absorbed by the bearing holder 149, 149a. Therefore transmission of this vibration to the gear housing 22a can be inhibited.

In the above case, the pinion 11 secured to the end portion of the pinion shaft 10 (refer to FIGS. 5 and 46) and the rack 10 (refer to FIG. 46) are directly meshed with each other. However the present invention is not limited to such a construction. For example, the construction of the aforementioned fifth through fourteenth examples may be assembled together with a so called Variable Gear Ratio Steering (VGS) mechanism wherein a pin provided on a bottom end portion of the pinion shaft is engaged in an elongate hole of a pinion gear provided on a different body to the pinion shaft so as to be free to move in the lengthwise direction of the elongate hole, and the pinion gear and the rack are meshed, so that the ratio of the displacement amount of the rack with respect to the rotation angle of the steering shaft is changed corresponding to speed.

Figure 38:
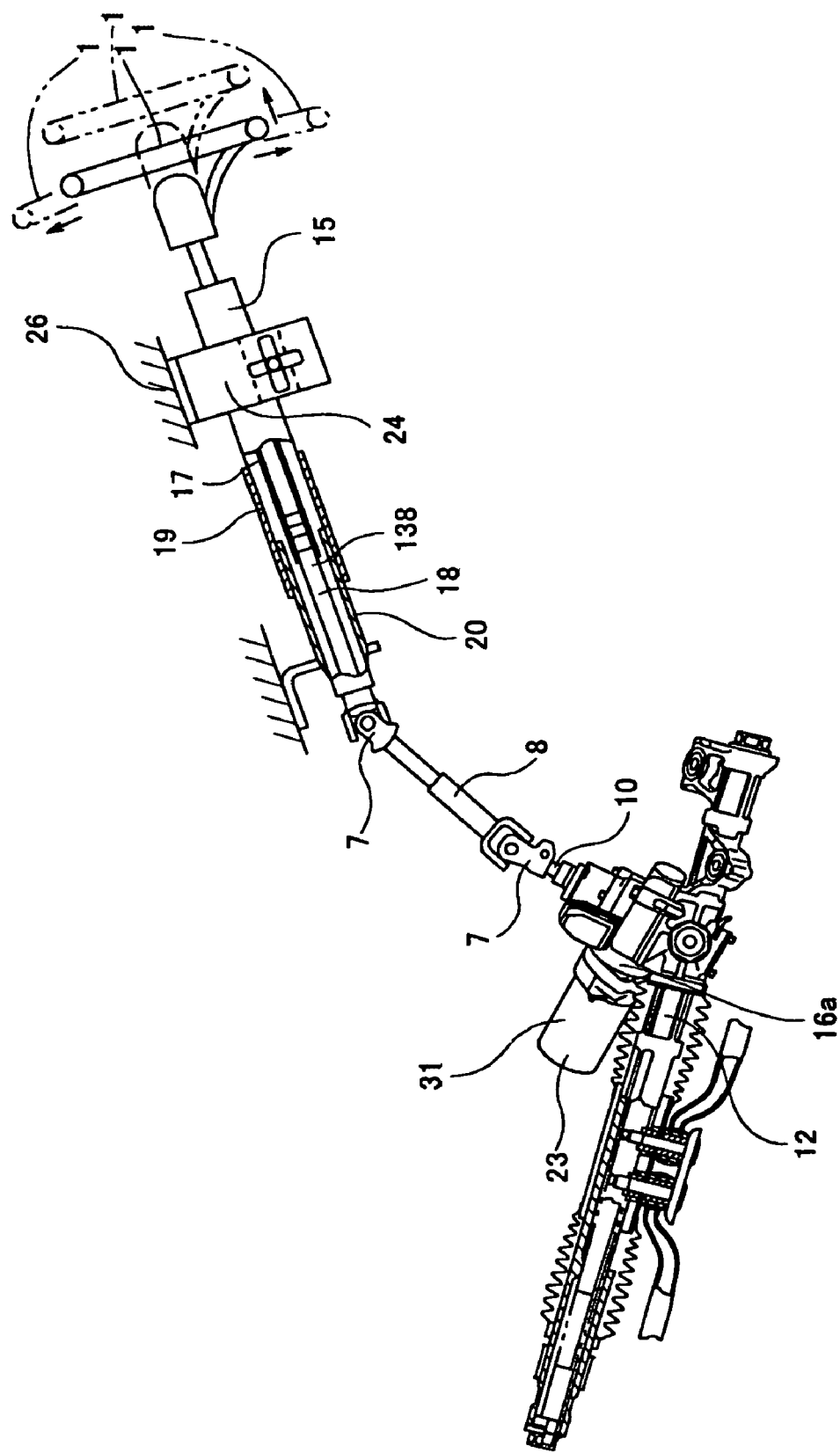
FIG. 38 shows an example of a construction where the electric motor is provided in the vicinity of the pinion.

Moreover, the present invention is not limited to the construction where the electric motor 31 is provided surrounding the steering shaft 2. For example, as shown in FIG. 38, a construction is possible where the electric motor 31 is provided on a portion in the vicinity of the pinion 11 (refer to FIGS. 5 and 46) which is meshed with the rack 12. In the case of such a construction shown in FIG. 38, the worm wheel constituting the worm reduction gear 16a is secured to the pinion 11 or a part of a member supported on the pinion 11. In the case of such a construction shown in FIG. 38, a torque sensor 3 (refer to FIG. 46) may be provided not surrounding the steering shaft 2, but on a portion in the vicinity of the pinion 11. Also in the case of the construction shown in FIG. 38, the present invention can be implemented.

Figure 39:
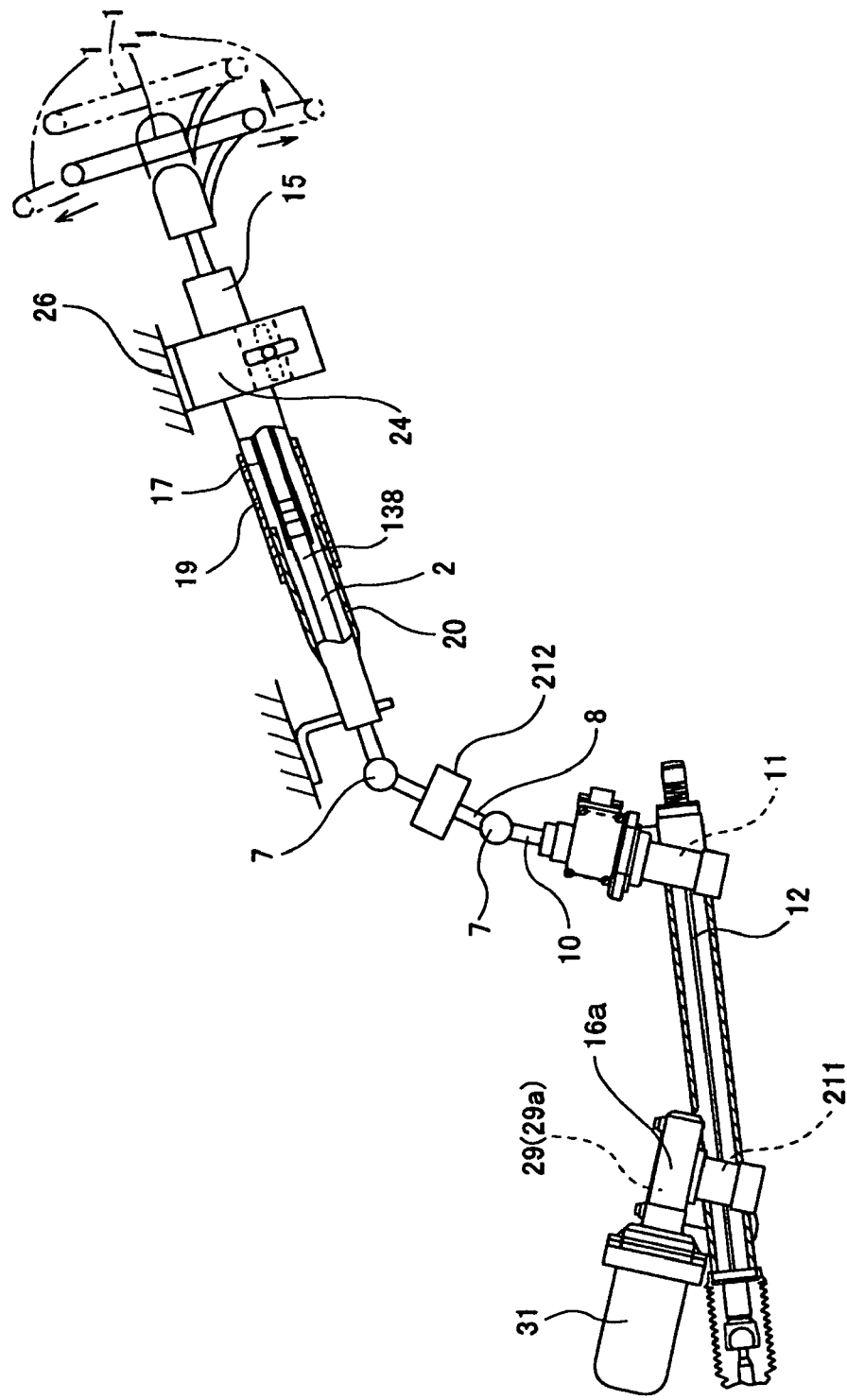
FIG. 39 shows an example of a construction where the electric motor is provided in the vicinity of the sub pinion.
Figure 40:
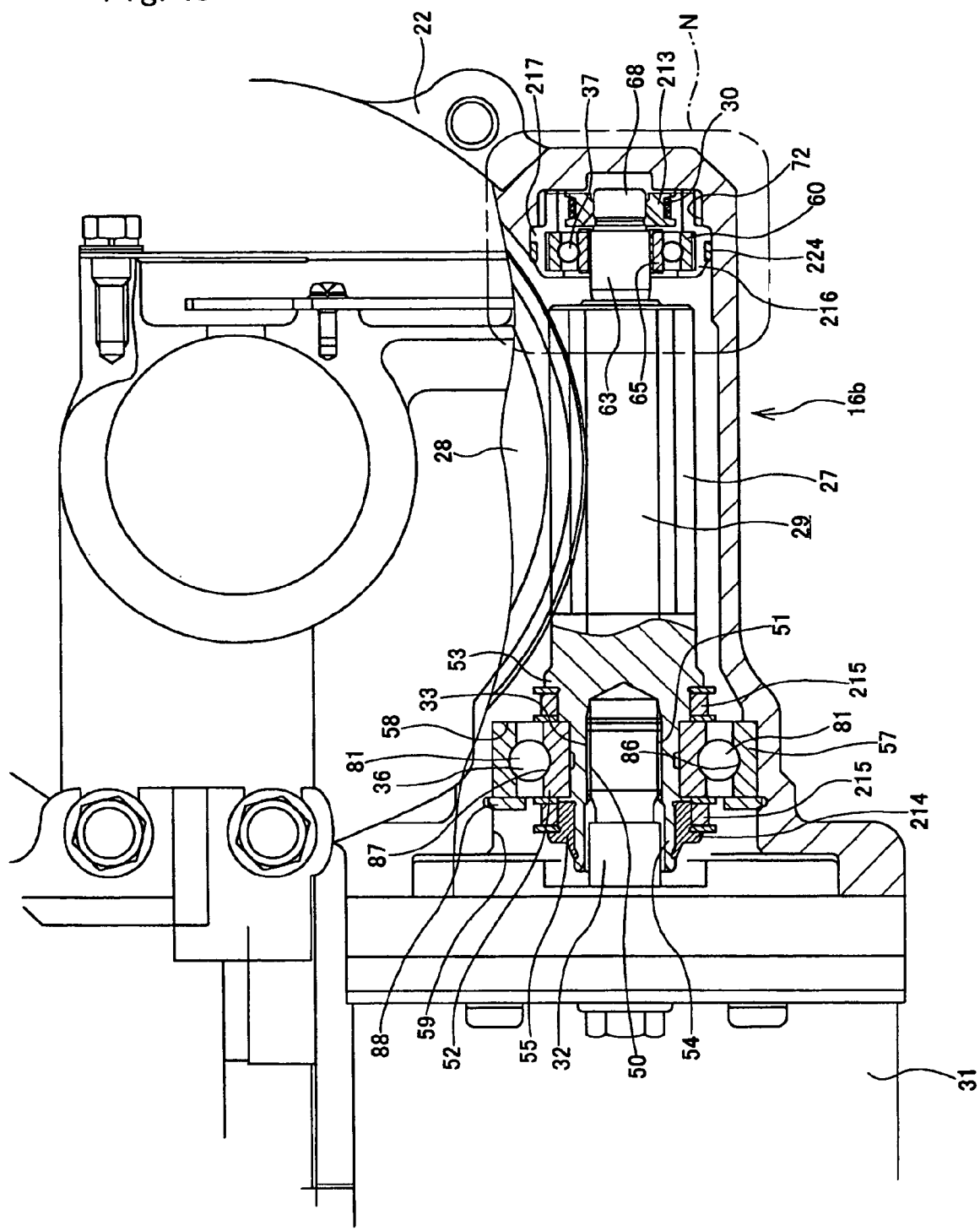
FIG. 40 shows a fifteenth example of the present invention corresponding to cross-section A-A of FIG. 1.
Figure 41:
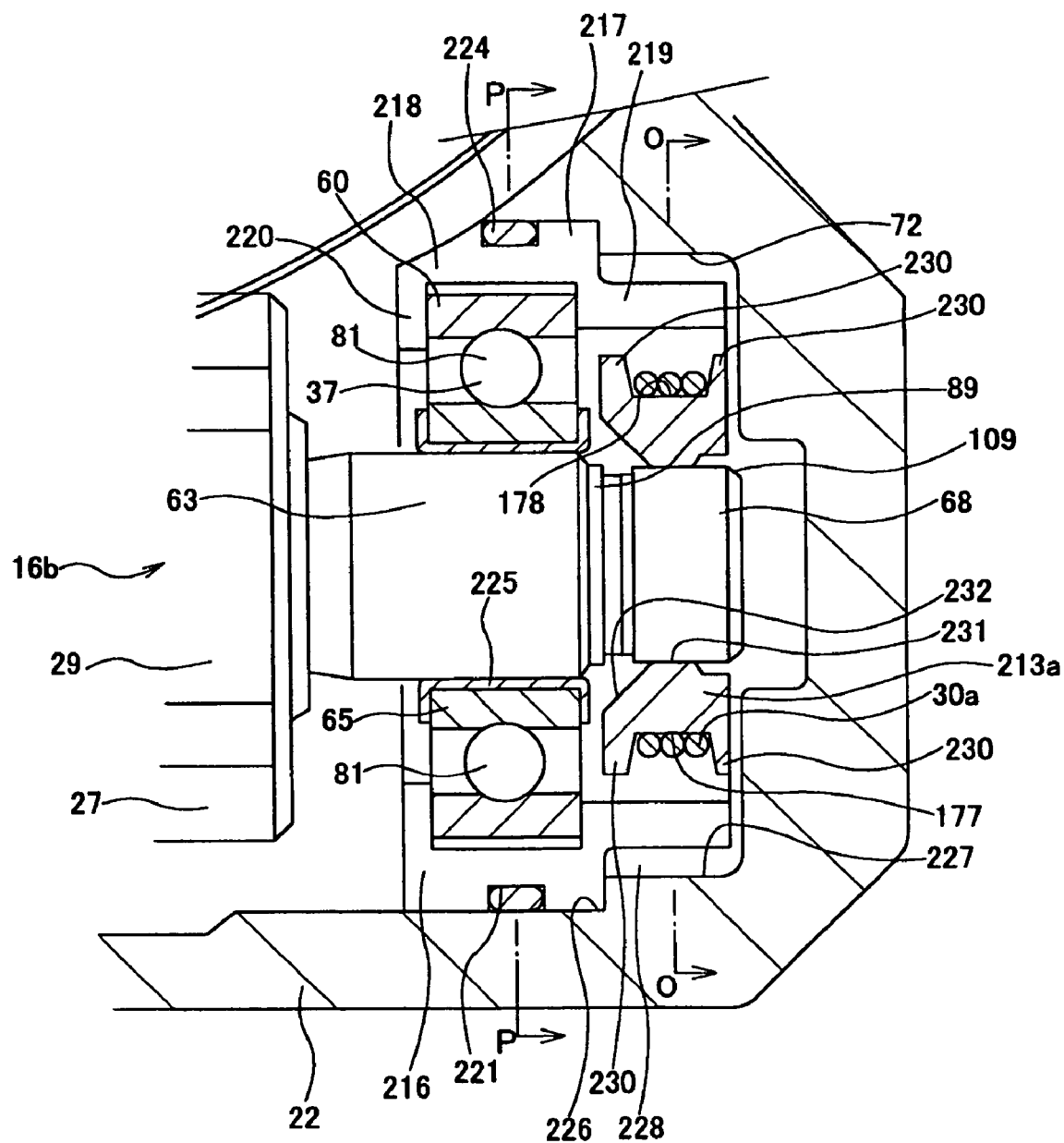
FIG. 41 is an enlarged cross-sectional view of a part N of FIG. 40.
Figure 42:
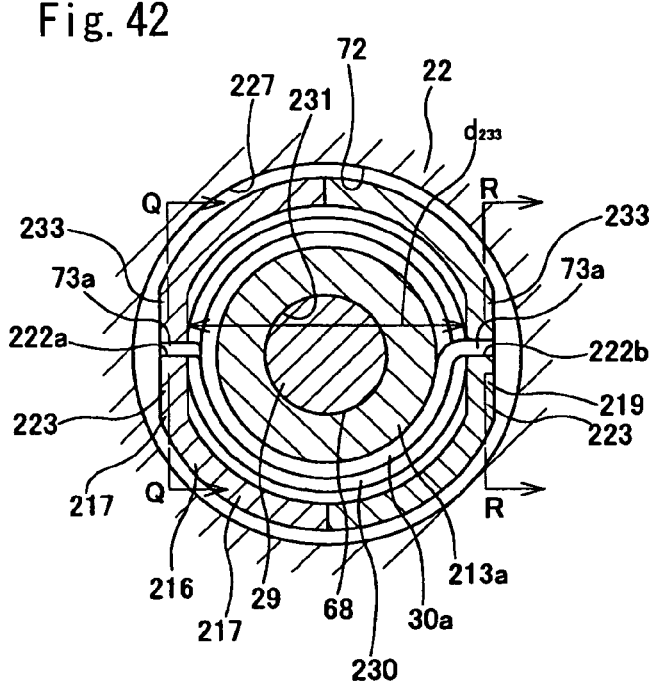
FIG. 42 is a cross-sectional view taken along the line O-O of FIG. 41.

Moreover, as shown in FIG. 39, the electric motor 31 can also be provided on a part of the rack 12 in the vicinity of a sub pinion 211 which is meshed at a position away from the engaging portion with the pinion 11. In the case of the construction shown in FIG. 39, a worm wheel secured to the sub pinion 211 is meshed with the worm shaft 29 (29a). In the construction shown in FIG. 39 also, the torque sensor 3 (refer to FIG. 46) can be provided on a portion in the vicinity of the pinion 11. In the construction shown in FIG. 39, a shock absorber 212 is provided in an intermediate portion of the intermediate shaft 8 to prevent vibration which is transmitted from the ground by the vehicle wheels to the pinion 11, from being transmitted to the steering wheel 1. This shock absorber 212 is constructed for example by assembling the inner shaft and the outer shaft in telescopic form, and connecting an elastic member between the end peripheral faces of these two shafts. Also in the case of the construction shown in FIG. 39, the present invention can be implemented.

EXAMPLE 15

Next, FIGS. 40 to 45 show a fifteenth example of the present invention. The electric power steering apparatus of this example comprises: a steering shaft 2 (refer to FIGS. 1 and 46) being an assist shaft which is secured at a rear end portion to a steering wheel 1; a steering column 15 (refer to FIGS. 1 and 46) through which the steering shaft 2 passes freely; a worm reduction gear 16b for applying a supplementary torque to the steering shaft 2; a pinion 11 (refer to FIG. 46) provided on the front end portion of the steering shaft 2; a rack 12 (refer to FIG. 46) which is meshed with the pinion 11 or with a member supported on the pinion 11; a torque sensor 3 (refer to FIG. 46); an electric motor 31; and a controller 6 (refer to FIG. 46).

The worm reduction gear 16b comprises a worm wheel 28 which can be externally secured freely to one part of an inner shaft 18 (refer to FIG. 1) constituting the steering shaft 2, a worm shaft 29, a torsion coil spring 30a, and a pre-load pad 213a.

The torque sensor 3 is provided surrounding the intermediate portion of the steering shaft 2, and detects the direction and magnitude of a torque applied to the steering shaft 2 from the steering wheel 1, and sends a signal (detection signal) representing the detection value to the controller 6. Then the controller 6 sends a drive signal to the electric motor 31 corresponding to this detection signal, so that an auxiliary torque is produced of a predetermined magnitude in a predetermined direction.

The worm wheel 28 and the worm shaft 29 are provided on the inside of the gear housing 22, and the worm wheel 28 and a worm 27 provided on an intermediate portion of the worm shaft 29 are meshed together. Furthermore, by means of a spline connection section 33 which is made up by spline engagement of a female spline 50 provided in the inner peripheral face of the base end portion (left in FIG. 40) of the worm shaft 29, and a male spline 51 provided on the tip end portion of a rotation shaft 32 constituting the electric motor 31, the end portion pairs of the two shafts 29 and 32 are connected. Due to this construction, the worm shaft 29 rotates together with the rotation shaft 32.

The base end portion of the worm shaft 29 on the inside of the gear housing 22 is rotatably supported by the third ball bearing 36 serving as a first bearing. Moreover, an inner ring 52 constituting the third ball bearing 36 is externally fitted on the outer peripheral face of the base end portion of the worm shaft 29, to a portion axially corresponding to the spline connection section 33. Furthermore, the axial central position of the spline connection section 33, and the axial central position of the third ball bearing 36 are made to approximately coincide. A small gap is provided between the inner peripheral face of the inner ring 52 and the outer peripheral face of the worm shaft 29, so that it is possible to incline the worm shaft 29 with respect to the third ball bearing 36 within a predetermined range. Moreover, between the axial opposite end faces of the inner ring 52 and the side face of a flange 214 provided on the outer peripheral face of a nut 55 which is threadedly secured to a threaded portion 54 provided on the base end portion of the worm shaft 29, and the side face of a flange 53 provided on the outer peripheral face of the base end portion of the worm shaft 29, there is respectively provided elastic rings 215. Between the side faces of the flanges 53 and 214, the inner ring 52 is elastically sandwiched. By means of this construction, the worm shaft 29 is supported so as to be able to elastically displace with respect to the third ball bearing 36, within a predetermined range in the axial direction. Preferably, a ball bearing of a four point contact type is used for the third ball bearing 36.

On the other hand, the tip end portion (the right end portion in FIGS. 40 and 41) of the worm shaft 29 is rotatably supported on the inside of the gear housing 22 by the fourth ball bearing 37 serving as a second bearing. Therefore, in the case of this example, a bearing holder 216 being the buffer member is internally secured in the concavity 72 provided in the gear housing 22. This bearing holder 216 as shown in detail in FIGS. 41 to 45, is made from a pair of bearing holder elements 217 each made of a synthetic resin which are assembled to together as one, and a large diameter cylindrical portion 218 and a small diameter cylindrical portion 219 are connected to each other concentrically. On two locations on diametrically opposite sides of the inner peripheral face of the large diameter cylindrical portion 218, is provided a pair of planar portions 234 (FIG. 43) parallel with each other. Furthermore, on the inner peripheral face of the end portion (the left end portion in FIGS. 40, 41, the rear end in FIG. 44) of the large diameter cylindrical portion 218, on the opposite side to the small diameter cylindrical portion 219, and at a position 90 degrees out of phase with the respective planar portions 234, a pair of inwardly directed flanges 220a, 220b are respectively formed in a condition protruding inwards. Moreover, a space between the inside face of these inwardly directed flanges 220a, 220b, and the inside face (the left side face in FIGS. 40 and 41) of the small diameter cylindrical portion 219, is substantially the same as the axial length of the outer ring 60 constituting the fourth ball bearing 37. The inner diameter of the portion away from the respective planar portions 234 on the inner peripheral face of the large diameter cylindrical portion 218 is made larger than the outer diameter of the outer ring 60. On the other hand, the space $d_{234}$ between the two planar portions 234 is substantially the same as the outer diameter of the outer ring 60. By means of this construction, in a condition with the outer ring 60 internally fitted and supported on the large diameter cylindrical portion 218, displacement of the outer ring 60 in the axial direction is prevented. On the other hand, displacement of the outer ring 60 is possible in the radial direction within a predetermined range (until the outer peripheral face of the outer ring 60 abuts against the inner peripheral face of the large diameter cylindrical portion 218) only in a direction along the planar portions 234. That is to say, displacement in the left and right direction in FIGS. 43 and 44 of the outer ring 60 is prevented. Moreover, an engaging groove 221 is formed around the whole circumference in the axial intermediate portion of the outer peripheral face of the large diameter cylindrical portion 218. Such a bearing holder 216 has a shape obtained by dividing the bearing holder 216 into two parts by a virtual plane containing the central axis, and is made up by abutting together the circumferential opposite end faces of the pair of bearing holder elements 217.

Moreover, in order to construct the small diameter cylindrical portion 219, planar portions 233 which are parallel with the planar portions 234 are respectively provided at the circumferential central portions of semi-cylindrical portions 223 provided on the bearing holder elements 217. Furthermore, on the intermediate portion of these planar portions 233, notches 222a and 222b (FIGS. 42, 44 and 45) passing through in the radial direction are formed in a condition each with one end opening to the end face of the planar portions 233. These notches 222a and 222b are for engaging opposite end portions of a torsion coil spring 30a as described later, and as shown in detail in FIGS. 45(a) and (b), have a different shape to each other. That is to say, the notches 222a and 222b differ to each other in the length from the tip end face of the planar portions 233 to the back end. In the back end of the respective notches 222a and 222b is provided bend portions 235 which bend in the same direction. In a condition with the bearing holder elements 217 assembled to constitute the bearing holder 216, these notches 222a and 222b exist at two locations on approximately diametrically opposite sides of the bearing holder 216.

Figure 43:
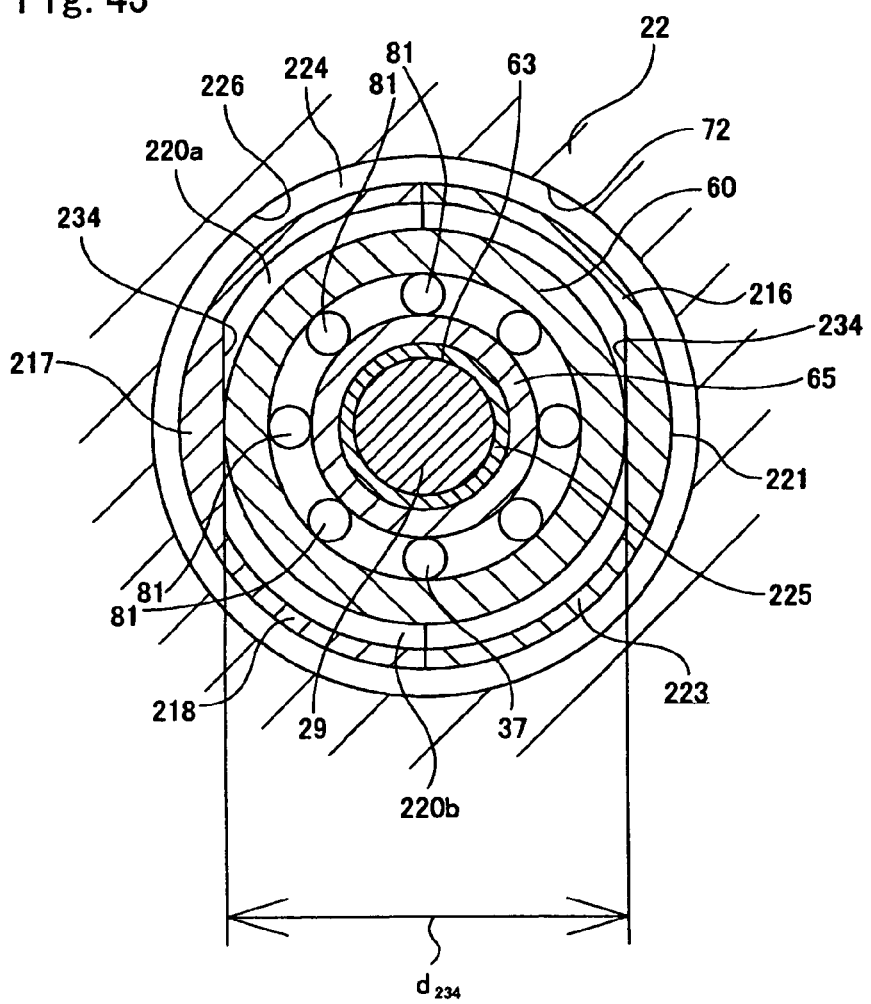
FIG. 43 is a cross-sectional view taken along the line P-P of FIG. 43.

Furthermore, as shown in FIG. 43, in a condition with the fourth ball bearing 37 assembled, the circumferential opposite end faces of the pair of bearing holder elements 217 are abutted together so that all of the portions of the axial opposite side faces and the outer peripheral face of the outer ring 60 constituting the fourth ball bearing 37 are covered by the large diameter cylindrical portion 218 of the bearing holder 216, the inwardly directed flanges 220a and 220b, and the small diameter cylindrical portion 219 (FIG. 41), to thereby give the bearing holder 216. Moreover in this condition, an elastic ring 224 made of an elastomer like rubber is engaged in the engaging groove 221. On the inner diameter side of the inner ring 65 constituting the fourth ball bearing 37 is internally fitted a bush 225 for allowing sliding in the axial direction of the worm shaft 29.

Figure 44:
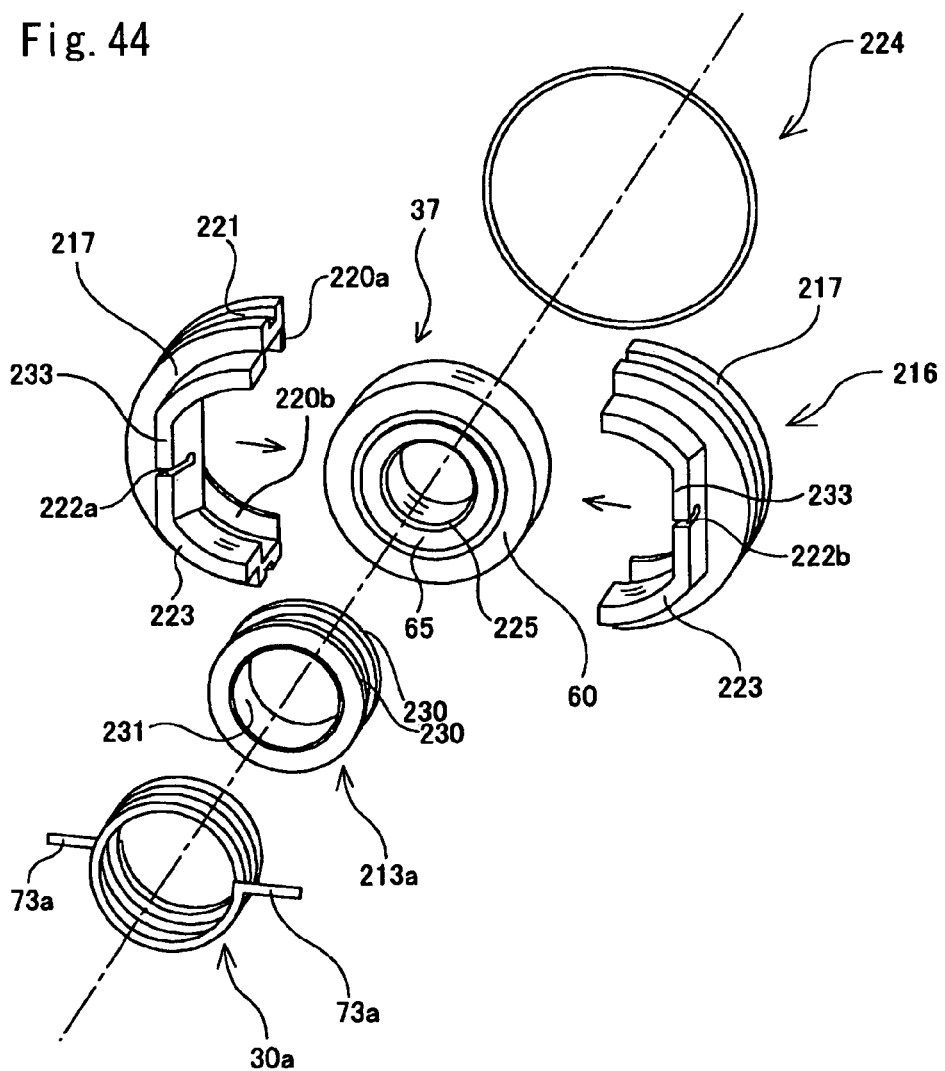
FIG. 44 is a perspective view of a condition immediately before combining the bearing holder element, the fourth bearing, and the elastic ring.
Figure 45:
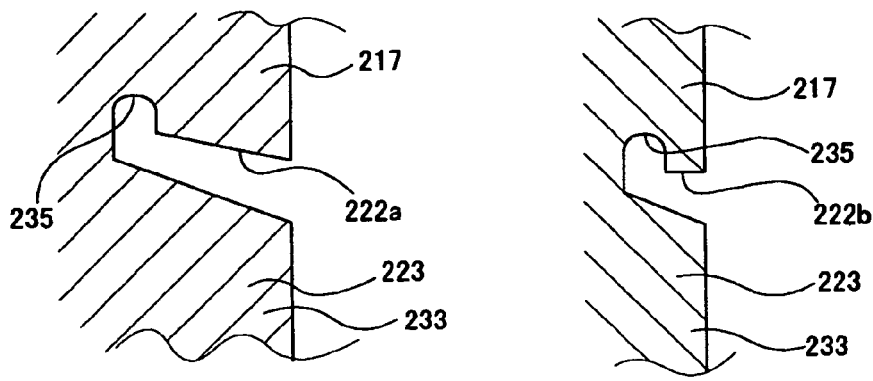
FIG. 45($a$) is a cross-sectional view taken along the line Q-Q of FIG. 42, and FIG. 45($b$) is a cross-sectional view taken along the line R-R of FIG. 42.

On the inside of the small diameter cylindrical portion 219 constituting the bearing holder 216 is arranged a preload pad 213a. The pre-load pad 213a, as shown in detail in FIG. 44 is made in a substantially cylindrical shape by injection molding a synthetic resin which is mixed with a solid lubricant. Engaging protrusions 230 are respectively formed around the whole perimeter in the both end portions of the pre-load pad 213a in a condition protruding to the outer diameter side. Furthermore, the small diameter portion 68 provided on the tip end portion of the worm shaft 29 is freely inserted without play into a through hole 231 formed in a condition passing axially through the center portion of the pre-load pad 213a. The inner peripheral face of the through hole 231 has a function as a sliding bearing for supporting the small diameter portion 68. Furthermore, on the inner peripheral face of the through hole 231 on the worm shaft 29 base end side is provided a taper face 231 which increases in diameter towards the open end.

Furthermore, in a condition with the main section (the coil section) of the torsion coil spring 30a being the elastic body, externally fitted around the pre-load pad 213a, the pre-load pad 213a is positioned on the inside of the small diameter cylindrical portion 219 constituting the bearing holder 216. Here the space $d_{233}$ between the portions facing the planar portions 233, on the inner peripheral face of the small diameter cylindrical portion 219, is made slightly larger than the outer diameter of the engaging protrusions 230 provided on the pre-load pad 213a. In this condition, the pre-load pad 213a is able to displace on the inside of the small diameter cylindrical portion 219, until the outer peripheral rim of the protrusions 230 abuts against the inner peripheral face of the small diameter cylindrical portion 219. Furthermore, the pair of engaging portions 73a on the opposite end portions of the torsion coil spring 30a, provided in a condition bent radially outwards at two locations on diametrically opposite sides, are engaged in the pair of notches 222a and 222b formed in the planar portions 233 constituting the small diameter cylindrical portion 219. In a condition with the torsion coil spring 30a engaged with the respective notches 222a and 222b, the central position of the main portion of the torsion coil spring 30a is deviated to one end side (the upper end side in FIG. 42, 44) in the circumferential direction of the respective bearing holders 217. The bend portions 235 provided in the respective notches 222a and 222b have a function for preventing the respective engaging portions 73a and 73b from slipping out from the respective notches 222a and 222b.

Moreover, in a condition with the bearing holder 216, the fourth ball bearing 37, the pre-load pad 213a and the torsion coil spring 30a all assembled together in this manner, the bearing holder 216 is internally secured in the concavity 72 (FIGS. 40 and 41) provided in the gear housing 22. That is to say, the large diameter cylindrical portion 218 of the bearing holder 216 is internally secured in a large diameter cylindrical portion 226 on the open end side constituting the concavity 72, and the elastic ring 224 is elastically compressed between the inner peripheral face of the large diameter cylindrical portion 226 of the concavity 72, and the bottom face of the engaging groove 221. Furthermore, an approximately annular shape small gap 228 is formed between the inner peripheral face of a small diameter cylindrical portion 227 on the bottom face side constituting the concavity 72, and the outer peripheral face of the small diameter cylindrical portion 219 of the bearing holder 216. In this condition, the outer peripheral face and at part of both axial side faces of the fourth ball bearing 37 are covered by the bearing holder 216 to restrict axial displacement of the fourth ball bearing 37 with respect to the bearing holder 216, and axial displacement in the radial direction of the fourth ball bearing 37 with respect to the bearing holder 216 within a predetermined range along the planar portions 234 is permitted.

In this manner, a large diameter portion 63 provided on the portion near the tip end portion of the worm shaft 29 is loosely inserted on the inside of the bush 225 which is internally fitted to the fourth ball bearing 37 which is supported in the gear housing 22 via the bearing holder 216. Furthermore axial displacement of the large diameter portion 63 with respect to the bush 225 is possible. Together with this, a small diameter portion 68 provided on the tip end portion of the worm shaft 29 is inserted without play into the through hole 231 provided in the pre-load pad 213*a*. By means of this construction, an elastic force is applied to the tip end portion of the worm shaft 29, in a direction towards the worm wheel 28 from the torsion coil spring 30*a* via the pre-load pad 70. That is to say, in a condition before the tip end portion of the worm shaft 29 is inserted into the through hole 231 provided in the pre-load pad 213*a*, the central axis of the through hole 231 is deviated to one side (the upper side in FIGS. 40 to 42) with respect to the central axis of the holder 216 and the concavity 72. Then, accompanying insertion of the tip end portion of the worm shaft 29 into the inside of the through hole 231, the diameter of the torsion coil spring 30*a* is elastically pressed and widened by means of the outer peripheral face of the pre-load pad 213*a*. Then, the torsion coil spring 30*a* tends to elastically return in the winding direction (the diameter is contracted), so that an elastic force is applied to the tip end portion of the worm shaft 29 from the torsion coil spring 30*a* in a direction towards the worm wheel 28 via the pre-load pad 213*a*. Due to this construction, the distance between the central axes of the inner shaft 18 to which the worm wheel 28 is externally secured, and the worm shaft 29, is elastically contracted. As a result, the teeth faces of the worm 27 of the worm shaft 29 and the worm wheel 28 are abutted together in a pre-loaded condition.

Moreover in the case of this example, the face directions (the direction parallel with the paper in FIGS. 40 and 41) of the matching faces of the circumferentially opposite ends of the bearing holder elements 217 constituting the bearing holder 216, are aligned with the direction wherein the elastic force is applied by the torsion coil spring 30*a* to the worm shaft 29. Different to this example, the circumferentially opposite end faces of the bearing holder elements 217 are not abutted together, and a gap may be formed between these opposite end faces. Moreover in the case of this construction, the virtual plane passing through the gap portion preferably coincides with the direction of applying the elastic force.

In the above manner, in the case of the worm reduction gear of this example and the electric power steering apparatus equipped with this, by means of the torsion coil spring 30*a*, an elastic force in the direction towards the worm wheel 28 is applied to the tip end portion of the worm shaft 29 via the pre-load pad 213*a*. Therefore, a pre-load can be applied to the meshing portion between the worm wheel 28 and the worm 27 of the worm shaft 29 with a low cost construction, and the generation of the teeth hitting noise at the meshing portion can be suppressed. Furthermore, in the case of this example, the pre-load applied to the meshing portion is readily maintained at a stable value over a limited narrow range, irrespective of the force applied from the worm wheel 28 to the worm shaft 29 in the axial direction. Therefore the generation of the teeth hitting noise at the meshing portion can be effectively suppressed.

That is to say, in the case of this example, axial displacement of the worm shaft 29 with respect to the pre-load pad 213*a* for applying an elastic force to the worm shaft 29, and the fourth ball bearing 37 for supporting the tip end portion of the worm shaft 29 is permitted. Therefore, even when a large reaction force is applied from the worm wheel 28 to the worm shaft 29 in the axial direction at the time of operating the electric motor 31, the pre-load pad 213*a* and the fourth ball bearing 37 are not pressed strongly against other members in the axial direction of the worm shaft 29 by the reaction force. Consequently, by applying an elastic force to the worm shaft 29 with the torsion coil spring 30*a* via the pre-load pad 213*a*, the pre-load applied to the meshing portion of the worm wheel 28 and the worm 27 of the worm shaft 29 can be prevented from fluctuating due to the effect of the reaction force. As a result, the pre-load can be readily maintained at a stable value over a limited narrow range for a long period of time, and generation of the teeth hitting noise at the meshing portion can be effectively suppressed.

Furthermore, since the bearing holder 216 which restricts displacement of the fourth ball bearing 37 is made from synthetic resin, the frictional force acting between the fourth ball bearing 37 and the bearing holder 216 can be reduced, and the fourth ball bearing 37 can be readily displaced in the radial direction. Therefore, generation of the teeth hitting noise at the meshing portion can be more effectively suppressed. Moreover, the outer peripheral face and part of both axial side faces of the fourth ball bearing 37 are covered by the bearing holder 216, and axial displacement of the fourth ball bearing 37 with respect to the bearing holder 216 is restricted. Therefore, play in the fourth ball bearing 37 can be readily suppressed without pressing the worm shaft against the fourth ball bearing 37 in the axial direction.

In the case of this example, axial displacement of the fourth ball bearing 37 with respect to the bearing holder 216 is prevented, and radial displacement of the fourth ball bearing 37 in a predetermined direction with respect to the bearing holder 216 is permitted. Therefore, in the case where the worm shaft 29 is oscillating-displaced while relatively displacing the worm shaft 29 and the fourth ball bearing 37 in the axial direction, sliding friction between the outer peripheral face of the worm shaft 29 and the inner peripheral face of the inner ring 65 of the fourth ball bearing 37 can be readily reduced, and the oscillating displacement can be readily performed in a smooth manner. As a result, overall frictional losses can be reduced, and an appropriate pre-load can be readily applied to the meshing portion.

Moreover, in the case of this example, since the coil spring 224 is provided between the bearing holder 216 and the gear housing 22, play in the bearing holder 216 with respect to the gear housing 22 can be readily suppressed. Therefore dimensional control of each part can be readily performed, and meshing at the meshing portion can be readily maintained in an appropriate condition. Moreover, when assembling the bearing holder 216 into the gear housing 22, the elastic ring 224 can be elastically compressed between the inner peripheral face of the concavity 72 of the gear housing 22, and the bottom face of the engaging groove 221 of the bearing holder 216. Therefore the operation of assembling the bearing holder 216 can be performed while preventing falling out of the bearing holder 216 from the concavity 72, and hence the assembly of the bearing holder 216 can be readily performed.

Moreover in the case of this example, the bearing holder 216 is made up from a pair of bearing holder elements 217 having a shape obtained by dividing the bearing holder 216 in two by a virtual plane containing the central axis of the bearing holder 216. Therefore the fabrication operation of the bearing holder elements 217 for obtaining the bearing holder 216 is simplified, and the operation for assembling the fourth ball bearing 37 inside the bearing holder 216 is more readily performed. Moreover, the face directions of the matching faces of the circumferentially opposite ends of the bearing holder elements 217, are aligned with the direction wherein the elastic force is applied by the torsion coil spring 30a to the worm shaft 29. Therefore in the case where the worm shaft 29 is oscillating displaced, it is difficult for the radial displacement of the fourth ball bearing 37 to be obstructed by the bearing holder 216, so that the oscillating displacement of the worm shaft 29 can be more readily performed.

Furthermore, in the case of this example, the engaging protrusions 230 protruding to the outer diameter side are provided on the outer peripheral face on both axial sides of the pre-load pad 213a. Therefore the torsion coil spring 30a can be kept from falling off from the outer peripheral face of the pre-load pad 213, and displacement of the torsion coil spring 30a in relation to the axial direction of the pre-load pad 213 can be restrained. Other construction and operation is the same as for the case of the first example shown in FIGS. 1 to 9, and hence the same parts are denoted by the same reference symbols and repeated description is omitted.

A difference to the case of this example is that the bearing holder 216 is constructed as a single member, rather than being constructed by abutting together bearing holders 217 being separate members, and a notch is provided along the entire length in the axial direction in one part around the circumferential direction of this single member. In this case of this configuration, the diameter of the bearing holder 216 can be elastically widely expanded, so that the operation of assembling the fourth bearing 37 into the bearing holder 216 to restrict axial displacement of the fourth bearing 37 can be readily performed. Moreover, dimensional errors and assembly errors in parts provided surrounding the bearing holder 216 can be readily absorbed by the bearing holder 216. Furthermore, even if the temperature in the vicinity varies, dimensional changes are absorbed by the notched part provided in the bearing holder 216, and dimensional changes other than at the notch of the bearing holder 216 can be suppressed.

Furthermore, the elastic member may be provided between the bearing holder 216 and the fourth ball bearing 37. In the case of this construction, play in fourth ball bearing 37 with respect to bearing holder 216, can be readily suppressed. Therefore dimensional control of each part can be readily performed, and meshing at the meshing portion can be readily maintained in an appropriate condition. Moreover, the operation of assembling the fourth ball bearing 37 into the bearing holder 216 can be performed while compressing the elastic member between the bearing holder 216 and the fourth ball bearing 37. Therefore at the time of the assembling operation, the fourth ball bearing 37 can be kept from falling out from inside the bearing holder 216, and hence the assembly operation for the fourth ball bearing 37 can be readily performed.

In the case of the abovementioned fifteenth example, the case is described for where the pinion secured to the end of the pinion shaft 10 (refer to FIGS. 1 and 46) and the rack 12 (refer to FIG. 46) are directly meshed with each other. However the present invention is not limited to such a construction. For example, the construction of the present examples may be assembled together with a so called Variable Gear Ratio Steering (VGS) mechanism wherein a pin provided on a bottom end of the pinion shaft is engaged in an elongate hole of a pinion gear provided on a different body to the pinion shaft so as to be free to move in the lengthwise direction of the elongate hole, and the pinion gear and the rack are meshed, so that the ratio of the displacement amount of the rack with respect to the rotation angle of the steering shaft is changed corresponding to speed.

Moreover, the present invention is not limited to the construction where an electric motor is provided surrounding the steering shaft 2. For example, the present invention can also be implemented with a construction where, as shown in FIG. 15, the electric motor 31 is provided on a portion in the vicinity of the pinion 11 (refer to FIG. 46) which is meshed with the rack 12. In the case of such a construction shown in FIG. 15, the worm wheel constituting the worm reduction gear 16 is secured to the pinion 11 or a part of a member supported on the pinion 11. In the case of such a construction shown in FIG. 15, a torque sensor 3 (refer to FIG. 46) may be provided not surrounding the steering shaft 2, but on a portion in the vicinity of the pinion 11.

Moreover the present invention can also be implemented with the construction shown before in FIG. 16, where the electric motor 31 is provided on a part of the rack 12 in the vicinity of a sub pinion 75 which is meshed at a position away from the engaging portion with the pinion 11. In the case of the construction shown in FIG. 16, a worm wheel secured to the sub pinion 75 is meshed with the worm shaft 29. In the construction shown in FIG. 16 also, the torque sensor 3 (refer to FIG. 46) can be provided on a portion in the vicinity of the pinion 11. In the construction shown in FIG. 46, a shock absorber 76 is provided in a central portion of the intermediate shaft 8 to prevent vibration which is transmitted from the ground by the vehicle wheels to the pinion 11, from being transmitted to the steering wheel 1. This shock absorber 76 is constructed for example by assembling the inner shaft and the outer shaft in telescopic form, and connecting an elastic member between the end peripheral faces of these two shafts.

In this way, the assist shaft of the present invention, may be any member of; the steering shaft, the pinion or a sub pinion which meshes with the rack at a position separated from the pinion.

Furthermore, the present invention is not limited to the construction where the rotor phase detector for switching the direction of the energizing current supplied to the coil 45, constituting the electric motor 31 is made from a brush 48 and a commutator 46 (refer to FIGS. 2 and 3). For example as shown in FIG. 17, the rotor phase detector may be constructed from a Hall IC 77 and an encoder 78 of a permanent magnet type secured to the rotation shaft 32, and the electric motor 31 may be of a so called brushless construction. Moreover, in the case of the aforementioned construction shown in FIG. 17, the stator 39a may be made up from a core 82 of a laminated steel plate type secured to the outer peripheral face of a case 23, and a coil 83 wound at a plurality of locations on the core 82, and the rotor 38 may comprise a permanent magnet 84 secured to a central outer peripheral face of the rotation shaft 32. In the case where such a construction is adopted, the magnetism of the stator 39*a* can also be switched by providing a vector control unit for controlling an increase or decrease in the magnitude of the current flowing to the stator 39*a*.

Furthermore, in the case of the abovementioned fifteenth example, the description has been for where the worm reduction gear is assembled into an electric power steering apparatus. However the worm reduction gear of the present invention is not limited to one employed for such a use, and for example can also be used in combination with an electric linear actuator assembled into various types of mechanical equipment such as an electric bed, an electric table, an electric chair, a lifter and so on. For example, in the case where the worm reduction gear is assembled into this electric linear actuator, the output of the electric motor is reduced by the worm reduction gear, and then taken out to the rotation shaft, and an output shaft provided surrounding this rotation shaft is extended and contracted via a ball screw. The present invention can also be applied to a worm reduction gear assembled into such an electric linear actuator.

The invention claimed is:

1. A worm reduction gear comprising a worm wheel, a worm shaft and an elastic body, wherein the elastic body applies an elastic force to the worm shaft in a direction towards the worm wheel via a pre-load pad, and the worm wheel is fixed freely to an assist shaft, and opposite ends of the worm shaft are supported on the inside of a gear housing by a pair of bearings, and a worm provided in an intermediate portion of the worm shaft meshes with the worm wheel, and displacement of the pre-load pad in relation to a predetermined direction, is restricted by a guide face provided on the gear housing or on a member fixed to the gear housing, the pre-load pad having a substantially non-circular inner peripheral face resulting in that a clearance between the pre-load and the guide face is either eliminated or reduced by elastic deformation of the pre-load pad itself based on an elastic force of the elastic body.

2. A worm reduction gear according to claim 1, wherein a direction of possible displacement of the pre-load pad along the guide face is inclined with respect to a virtual plane containing the central axis of the worm shaft and meshing portion between the worm provided on the worm shaft and the worm wheel.

3. An electric power steering apparatus comprising: a steering shaft provided at a rear end portion thereof with a steering wheel; a pinion provided on a front end side of the steering shaft, a rack meshed with the pinion or with a member supported on the pinion; a worm reduction gear according to claim 1; an electric motor for rotatably driving the worm shaft; a torque sensor for detecting the direction and magnitude of a torque applied to the steering shaft or pinion; and a controller for controlling a drive status of the electric motor based on a signal input from the torque sensor, and the assist shaft is a member being the steering shaft, the pinion, or a sub-pinion meshing with the rack at a position separated from the pinion.

4. An electric power steering apparatus comprising: a steering shaft provided at a rear end portion thereof with a steering wheel; a pinion provided on a front end side of the steering shaft, a rack meshed with the pinion or with a member supported on the pinion; a worm reduction gear according to claim 2; an electric motor for rotatably driving the worm shaft; a torque sensor for detecting the direction and magnitude of a torque applied to the steering shaft or pinion; and a controller for controlling a drive status of the electric motor based on a signal input from the torque sensor, and the assist shaft is a member being the steering shaft, the pinion, or a sub-pinion meshing with the rack at a position separated from the pinion.

5. A worm reduction gear comprising a worm wheel, a worm shaft and an elastic body, wherein the elastic body applies an elastic force to the worm shaft in a direction towards the worm wheel via a pre-load pad, and the worm wheel is fixed freely to an assist shaft, and opposite ends of the worm shaft are supported on the inside of a gear housing by a pair of bearings, and a worm provided in an intermediate portion of the worm shaft meshes with the worm wheel, and displacement of the pre-load pad in relation to a predetermined direction, is restricted by a guide face provided on one of the gear housing and a member fixed to the gear housing, the pre-load pad having an inner peripheral face defining a recess portion for facilitating deformation thereof, a clearance between the pre-load pad and the guide face being at least reduced by elastic deformation of the pre-load pad based on an elastic force of the elastic body.

* * * * *